United States Patent [19]
Kishigami et al.

[11] Patent Number: 5,986,720
[45] Date of Patent: Nov. 16, 1999

[54] MOBILE TELEVISION RECEIVER

[75] Inventors: Takaaki Kishigami, Kawasaki; Masahiro Mimura; Makoto Hasegawa, both of Tokyo; Masahiko Nakamura, Ebina; Yoshinori Takagi, Tokyo; Masanobu Kanaya, Sagamihara, all of Japan

[73] Assignee: Matsushita Electric Industrial Co., Ltd., Osaka, Japan

[21] Appl. No.: 08/845,442

[22] Filed: Apr. 25, 1997

[51] Int. Cl.[6] .............................. H04N 5/44; H04N 5/455
[52] U.S. Cl. ...................... 348/725; 348/726; 340/461; 358/160; 358/183; 358/188
[58] Field of Search ................................ 348/724, 725, 348/726, 727, 731, 837, 838, 607, 608, 541, 544, 545, 737, 556, 728; 340/461; 358/183, 191, 160, 188

[56] References Cited

U.S. PATENT DOCUMENTS

| | | | |
|---|---|---|---|
| 4,038,689 | 7/1977 | Rzeszewski et al. | 358/191 |
| 4,249,213 | 2/1981 | Imaide et al. | 358/183 |
| 4,984,082 | 1/1991 | Okamura | 358/183 |
| 5,018,015 | 5/1991 | Sunada et al. | 358/188 |
| 5,105,273 | 4/1992 | Hyakutake | 358/160 |
| 5,289,167 | 2/1994 | Kurosawa et al. | 340/461 |
| 5,467,142 | 11/1995 | Ichinokawa | 348/556 |
| 5,497,205 | 3/1996 | Yang et al. | 348/737 |
| 5,550,596 | 8/1996 | Strolle et al. | 348/607 |
| 5,703,662 | 12/1997 | Yoon | 348/727 |
| 5,777,693 | 7/1998 | Kishigami et al. | 348/731 |

FOREIGN PATENT DOCUMENTS

| | | |
|---|---|---|
| 3205965 | 9/1991 | Japan . |
| 3280674 | 12/1991 | Japan . |
| 5328240 | 12/1993 | Japan . |

*Primary Examiner*—Bryan Tung
*Assistant Examiner*—Tung Vo
*Attorney, Agent, or Firm*—Pollock, Vande Sande & Amernick

[57] ABSTRACT

A mobile television receiver includes a TV tuner demodulating an incoming TV signal into a first video signal. A first horizontal sync signal is separated from the first video signal. Detection is made as to a quality of an image represented by the first video signal. A second horizontal sync signal is generated. Detection is made as to a difference between a phase of the first horizontal sync signal and a phase of the second horizontal sync signal. The phase of the second horizontal sync signal is controlled in response to the detected phase difference between the first horizontal sync signal and the second horizontal sync signal so that the second horizontal sync signal will be locked in phase and frequency to the first horizontal sync signal. A memory unit stores the first video signal in response to a memory control signal, and outputs the stored first video signal as a second video signal. The memory control signal is generated in response to the detected image quality. The second video signal is displayed in response to the second horizontal sync signal.

39 Claims, 46 Drawing Sheets

MOBILE TELEVISION RECEIVER

BACKGROUND OF THE INVENTION

1. Field of the Invention

This invention relates to a mobile television receiver or a vehicular television receiver.

2. Description of the Related Art

Some automotive vehicles are equipped with television receivers and related antennas. During the travel of such a vehicle, a received television signal tends to undergo fading. In some cases, fading disturbs images recovered from the received television signal. Usually, a space diversity reception system is effective to suppress such a disturbance in recovered images.

It is known to temporarily store a television signal in a memory frame by frame for the following purpose. In the case where a good receiving condition is replaced by a poor receiving condition, a display screen continues to indicate a frame represented by a television signal available in the good receiving condition rather than frames represented by a television signal available in the poor receiving condition.

Japanese published unexamined patent application 3-205965 discloses a television receiver with a diversity unit. The television receiver of Japanese application 3-205965 is designed to obtain a stable receiving image by providing a synchronizing signal generator for executing quickly phase leading-in of a synchronizing signal at the time of switching an antenna and at the time of switching a receiving channel. In the television receiver of Japanese application 3-205965, the diversity unit switches antennas for obtaining an optimal signal in receiving signals, and outputs an optimum receiving signal and antenna switching information. In addition, a television tuner outputs receiving channel switching information when a receiving channel is switched. Furthermore, a synchronizing signal generator separates a synchronizing signal from a video signal, and outputs a stable synchronizing signal in phase with a desired period part. The synchronizing signal generator increases an operating speed for correctly adjusting the phase of the synchronizing signal in the case where the antenna switching information or the receiving channel switching information is outputted. In such a way, it is possible to obtain an image whose horizontal and vertical synchronizations are stable.

Japanese published unexamined patent application 3-280674 discloses an on-vehicle television receiver designed to improve the quality of an indicated image. In the on-vehicle television receiver of Japanese application 3-280674, the generation of a ghost disturbance is detected. When the generation of a ghost disturbance is detected, an image available before the occurrence of the disturbance is indicated. Specifically, the on-vehicle television receiver of Japanese application 3-280674 includes a synchronizing signal separation circuit for separating a horizontal synchronizing signal from a received video signal, and a ghost fluctuation detection circuit for comparing a phase of the horizontal synchronizing signal with a phase of a reference signal to detect a phase error therebetween and to generate a ghost fluctuation signal representing a fluctuation in a time base of the horizontal synchronizing signal. A control circuit outputs a display control signal to a memory when the ghost fluctuation signal reaches a prescribed threshold level. In the case where the display control signal is outputted to the memory, a video signal which occurs before the outputting of the display control signal is read out from the memory before being fed to a display and being indicated thereon.

Japanese published unexamined patent application 5-328240 discloses a mobile body television receiver. Operation of the mobile body television receiver of Japanese application 5-328240 can be changed between a usual reception mode and a frame feed mode. During the usual reception mode of operation, a received TV signal is indicated on a display as it is. During the frame feed mode of operation, a signal corresponding to one field is repetitively indicated on a display. The mobile body television receiver of Japanese application 5-328240 includes a system control circuit which selects the frame feed mode of operation when a mean value of an electric field strength reaches a prescribed value or when a changing speed of the electric field strength reaches a prescribed speed. During the frame feed mode of operation, a 1-field-corresponding portion of the received TV signal is stored into a memory, and is then repetitively read out from the memory before being indicated on the display. The received TV signal stored in the memory is periodically updated at a frequency lower than the field frequency so that the received TV signal which is indicated on the display is thinned out during the frame feed mode of operation.

SUMMARY OF THE INVENTION

It is an object of this invention to provide an improved mobile television receiver.

A first aspect of this invention provides a mobile television receiver comprising a TV tuner demodulating an incoming TV signal into a first video signal; first means for separating a first horizontal sync signal from the first video signal generated by the TV tuner; second means for detecting a quality of an image represented by the first video signal generated by the TV tuner; third means for generating a second horizontal sync signal, for detecting a difference between a phase of the first horizontal sync signal generated by the first means and a phase of the second horizontal sync signal, and for controlling the phase of the second horizontal sync signal in response to the detected phase difference between the first horizontal sync signal and the second horizontal sync signal to lock the second horizontal sync signal in phase and frequency to the first horizontal sync signal; a memory unit for storing the first video signal generated by the TV tuner in response to a memory control signal, and for outputting the stored first video signal as a second video signal; fourth means for generating the memory control signal in response to the image quality detected by the second means, and for feeding the memory control signal to the memory unit; and fifth means for displaying the second video signal outputted from the memory unit in response to the second horizontal sync signal generated by the third means.

A second aspect of this invention provides a mobile television receiver comprising a TV tuner demodulating an incoming TV signal into a first video signal; first means for separating a first horizontal sync signal from the first video signal generated by the TV tuner; second means for detecting a quality of an image represented by the first video signal generated by the TV tuner for every field related to the first video signal; third means for calculating a mean quality among the image qualities detected by the second means during a plurality of successive fields; fourth means for comparing the image quality detected by the second means with the mean quality calculated by the third means, for deciding that the image quality detected by the second means is good when the image quality detected by the second means is equal to or greater than the mean quality calculated by the third means, and for deciding that the image quality detected by the second means is poor when the image quality detected by the second means is smaller than the mean quality calculated by the third means; fifth means for generating a second horizontal sync signal, for detecting a difference between a phase of the first horizontal sync signal generated by the first means and a phase of the second horizontal sync signal, and for controlling the phase of the second horizontal sync signal in response to the detected phase difference between the first horizontal sync signal and the second horizontal sync signal to lock the second horizontal sync signal in phase and frequency to the first horizontal sync signal; sixth means for deciding whether or not the phase difference detected by the fifth means is in a predetermined range; a memory unit changeable between a normal mode of operation and a still-image mode of operation, the memory unit periodically storing the first video signal generated by the TV tuner and periodically outputting the stored first video signal as a second video signal when being in the normal mode of operation, the memory unit stopping periodically storing the first video signal generated by the TV tuner but executing periodically outputting the last stored first video signal as the second video signal when being in the still-image mode of operation; seventh means for changing the memory unit from the still-image mode of operation to the normal mode of operation when the fourth means decides that the image quality is good and the sixth means decides that the phase difference is in the predetermined range, and for changing the memory unit from the normal mode of operation to the still-image mode of operation when the fourth means decides that the image quality is poor; and eighth means for displaying the second video signal outputted from the memory unit in response to the second horizontal sync signal generated by the fifth means.

A third aspect of this invention is based on the second aspect thereof, and provides a mobile television receiver wherein the memory unit comprises an A/D converter for converting the first video signal into a corresponding digital video signal; memories for storing the digital video signal generated by the A/D converter, and for outputting the stored digital video signal; and a D/A converter for converting the digital video signal outputted from the memories into the second video signal.

A fourth aspect of this invention is based on the second aspect thereof, and provides a mobile television receiver wherein the third means comprises means for weighting the image qualities detected by the second means during the plurality of successive fields, and means for generating the mean quality from the weighting-resultant image qualities.

A fifth aspect of this invention is based on the second aspect thereof, and provides a mobile television receiver further comprising ninth means for counting successive fields during which the memory unit is in the still-image mode of operation; tenth means for generating an offset value in response to a number of the successive fields counted by the ninth means; and eleventh means for changing the mean quality calculated by the third means in response to the offset value generated by the tenth means.

A sixth aspect of this invention is based on the second aspect thereof, and provides a mobile television receiver further comprising ninth means for comparing the image quality detected by the second means with a predetermined reference image quality to decide whether or not a strength of the incoming IV signal is smaller than a reference strength; tenth means for counting fields during which the ninth means decides that the strength of the incoming TV signal is smaller than the reference strength; and eleventh means for forcing the memory unit into the normal mode of operation in cases where a number of the fields counted by the tenth means during a given number of successive fields exceeds a predetermined number.

A seventh aspect of this invention is based on the second aspect thereof, and provides a mobile television receiver wherein the second means comprises an A/D converter for converting the first video signal into a digital signal during a presence of an equalizing pulse in the first video signal; averaging means for periodically generating a mean value among a given number of samples of the digital signal generated by the A/D converter; differential means for generating a difference between a current mean value and an immediately-preceding means value generated by the averaging means; binarizing means for comparing the difference generated by the differential means with a predetermined value, and for generating a binary signal in response to a result of the comparing; and an adder for accumulating the binary signal generated by the binarizing means, wherein a result of the accumulating represents the detected image quality.

An eighth aspect of this invention is based on the second aspect thereof, and provides a mobile television receiver wherein the second means comprises an A/D converter for converting the first video signal into a digital signal during a presence of an equalizing pulse in the first video signal; averaging means for periodically generating a mean value among a given number of samples of the digital signal generated by the A/D converter; differential means for generating a difference between a current mean value and an immediately-preceding means value generated by the averaging means; binarizing means for comparing an absolute value of the difference generated by the differential means with a predetermined value, and for generating a binary signal in response to a result of the comparing; and an adder for accumulating the binary signal generated by the binarizing means, wherein a result of the accumulating represents the detected image quality.

A ninth aspect of this invention is based on the second aspect thereof, and provides a mobile television receiver further comprising ninth means for counting pulses in the first horizontal sync signal separated by the first means; tenth means for forcing the memory unit in the still-image mode of operation in cases where a number of the pulses counted by the ninth means during one field exceeds a predetermined number; and eleventh means for forcing the memory unit in the normal mode of operation in cases where the number of the pulses counted by the ninth means during one field does not exceed the predetermined number and the fourth means decides that the image quality detected by the second means is good.

A tenth aspect of this invention is based on the ninth aspect thereof, and provides a mobile television receiver further comprising twelfth means for counting successive fields during which the memory unit is in the still-image mode of operation; thirteenth means for generating an offset value in response to a number of the successive fields counted by the twelfth means; and fourteenth means for changing the predetermined number used by the tenth means in response to the offset value generated by the thirteenth means.

An eleventh aspect of this invention is based on the ninth aspect thereof, and provides a mobile television receiver further comprising twelfth means for changing the memory unit from the still-image mode of operation to the normal mode of operation in cases where the fourth means decides that the image quality detected by the second means is good and the sixth means decides that the phase difference detected by the fifth means is in the predetermined range, and the number of the pulses counted by the ninth means during one field does not exceed the predetermined number; and thirteenth means for changing the memory unit from the normal mode of operation to the still-image mode of operation when the fourth means decides that the image quality detected by the second means is poor or the number of the pulses counted by the ninth means during one field exceeds the predetermined number.

A twelfth aspect of this invention provides a mobile television receiver comprising a TV tuner demodulating an incoming TV signal into a first video signal; first means for separating a first horizontal sync signal from the first video signal generated by the TV tuner; second means for detecting a quality of an image represented by the first video signal generated by the TV tuner at a given timing in every field related to the first video signal; third means for comparing the image quality detected by the second means with a predetermined threshold quality, for deciding that the image quality detected by the second means is good when the image quality detected by the second means is equal to or greater than the predetermined threshold quality, and for deciding that the image quality detected by the second means is poor when the image quality detected by the second means is smaller than the predetermined threshold quality; fourth means for generating a second horizontal sync signal; fifth means for detecting a difference between a phase of the first horizontal sync signal generated by the first means and a phase of the second horizontal sync signal generated by the fourth means, sixth means for changing the phase of the second horizontal sync signal by a predetermined phase control amount in response to the phase difference detected by the fifth means to lock the second horizontal sync signal in phase and frequency to the first horizontal sync signal; seventh means for deciding whether or not the phase difference detected by the fifth means is in a predetermined range; eighth means for deciding whether or not the phase of the first horizontal sync signal and the phase of the second horizontal sync signal are different during a given number of successive fields; ninth means for controlling the sixth means in response to the first horizontal sync signal to equalize the phase of the second horizontal sync signal to the phase of the first horizontal sync signal in cases where the eighth means decides that the phase of the first horizontal sync signal and the phase of the second horizontal sync signal are different during the given number of successive fields; a memory unit changeable between a normal mode of operation and a still-image mode of operation, the memory unit periodically storing the first video signal generated by the TV tuner and periodically outputting the stored first video signal as a second video signal when being in the normal mode of operation, the memory unit stopping periodically storing the first video signal generated by the TV tuner but executing periodically outputting the last stored first video signal as the second video signal when being in the still-image mode of operation; tenth means for changing the memory unit from the normal mode of operation to the still-image mode of operation when the third means changes to decide that the image quality is poor, for changing the memory unit from the still-image mode of operation to the normal mode of operation when the third means changes to decide that the image quality is good in cases where the seventh means decides that the phase difference is in the predetermined range, and for holding the memory unit in the still-image mode of operation when the third means changes to decide that the image quality is good in cases where the seventh means decides that the phase difference is not in the predetermined range; and eleventh means for displaying the second video signal outputted from the memory unit in response to the second horizontal sync signal controlled by the sixth means.

A thirteenth aspect of this invention is based on the twelfth aspect thereof, and provides a mobile television receiver further comprising twelfth means for separating a first vertical sync signal from the first video signal generated by the TV tuner; thirteenth means for generating a second vertical sync signal, for detecting a difference between a phase of the first vertical sync signal generated by the twelfth means and a phase of the second vertical sync signal, and for controlling the phase of the second vertical sync signal in response to the detected phase difference between the first vertical sync signal and the second vertical sync signal to lock the second vertical sync signal in phase and frequency to the first vertical sync signal; fourteenth means for deciding whether or not the phase of the first vertical sync signal and the phase of the second vertical sync signal are different during a given number of successive fields; fifteenth means for controlling the thirteenth means in response to the first vertical sync signal to equalize the phase of the second vertical sync signal to the phase of the first vertical sync signal in cases where the fourteenth means decides that the phase of the first vertical sync signal and the phase of the second vertical sync signal are different during the given number of successive fields; and sixteenth means for controlling the eleventh means in response to the second vertical sync signal generated by the thirteenth means.

A fourteenth aspect of this invention is based on the thirteenth aspect thereof, and provides a mobile television receiver further comprising seventeenth means for controlling the memory unit in response to the second vertical sync signal generated by the thirteenth means.

A fifteenth aspect of this invention is based on the thirteenth aspect thereof, and provides a mobile television receiver further comprising seventeenth means for controlling the second means in response to the second vertical sync signal generated by the thirteenth means.

A sixteenth aspect of this invention is based on the twelfth aspect thereof, and provides a mobile television receiver wherein the tenth means comprises means for controlling the sixth means in response to the first horizontal sync signal to equalize the phase of the second horizontal sync signal to the phase of the first horizontal sync signal and then changing the memory unit from the still-image mode of operation to the normal mode of operation when the third means changes to decide that the image quality is good in cases where the seventh means decides that the phase difference is not in the predetermined range.

A seventeenth aspect of this invention is based on the twelfth aspect thereof, and provides a mobile television receiver further comprising twelfth means for counting successive fields during which the memory unit is in the sill-image mode of operation; and thirteenth means for holding the memory unit in the still-image mode of operation as long as a number of the fields counted by the twelfth means does not exceed a predetermined limit number.

An eighteenth aspect of this invention is based on the twelfth aspect thereof, and provides a mobile television receiver further comprising twelfth means for counting successive fields during which the memory unit is in the sill-image mode of operation; and thirteenth means for changing the memory unit from the still-image mode of operation to the normal mode of operation when a number of the fields counted by the twelfth means exceeds a predetermined limit number.

A nineteenth aspect of this invention is based on the twelfth aspect thereof, and provides a-mobile television receiver further comprising twelfth means for allowing the sixth means to control the phase of the second horizontal sync signal in response to the detected phase difference between the first horizontal sync signal and the second horizontal sync signal when the third means decides that the image quality is good.

A twentieth aspect of this invention is based on the twelfth aspect thereof, and provides a mobile television receiver wherein the second means comprises means for separating horizontal sync pulses from the first video signal generated by the TV tuner; and means for counting the separated horizontal sync pulses during a given period of time in every field to detect a quality of an image represented by the first video signal generated by the TV tuner.

A twenty-first aspect of this invention is based on the fifteenth aspect thereof, and provides a mobile television receiver wherein the second means comprises a low pass filter for removing high-frequency components from the first video signal generated by the TV tuner; a differentiator for differentiating an output signal of the low pass filter; a comparator for comparing an output signal of the differentiator with a reference signal representative of a predetermined reference level to convert the output signal of the differentiator into a binary signal; a counter for counting pulses of the binary signal generated by the comparator to detect a quality of an image represented by the first video signal generated by the TV tuner; and means for resetting the counter at a given timing in every frame in response to the second vertical sync signal.

A twenty-second aspect of this invention is based on the twelfth aspect thereof, and provides a mobile television receiver further comprising twelfth means for detecting a quality of an image represented by the first video signal generated by the TV tuner at a given timing in every field related to the first video signal, the twelfth means having an image-quality detecting characteristic different from an image-quality detecting characteristic of the second means; thirteenth means for comparing an AGC voltage generated in the TV tuner with a predetermined reference voltage; and fourteenth means for selecting one of the second means and the twelfth means in response to a result of the comparing by the thirteenth means, and for allowing the image quality detected by the twelfth means to be used instead of the image quality detected by the second means when the twelfth means is selected.

A twenty-third aspect of this invention is based on the twelfth aspect thereof, and provides a mobile television receiver further comprising twelfth means for counting a number of times where a phase of a pulse of the first horizontal sync signal and a phase of a corresponding pulse of the second horizontal sync signal are substantially equal during every field; thirteenth means for deciding whether or not the number counted by the twelfth means is smaller than a predetermined reference number during a given number of successive fields; and fourteenth means for controlling the sixth means in response to the first horizontal sync signal to equalize the phase of the second horizontal sync signal to the phase of the first horizontal sync signal in cases where the thirteenth means decides that the counted number is smaller than the predetermined reference number during the given number of successive fields.

A twenty-fourth aspect of this invention is based on the twelfth aspect thereof, and provides a mobile television receiver further comprising twelfth means for detecting a difference between a phase of a pulse of the first horizontal sync signal and a phase of a corresponding pulse of the second horizontal sync signal; thirteenth means for deciding whether or not the phase difference detected by the twelfth means is in a given range; fourteenth means for counting a number of times where the thirteenth means decides that the phase difference is in the given range; and fifteenth means for changing the memory unit from the still-image mode of operation to the normal mode of operation when the third means changes to decide that the image quality is good in cases where the number counted by the fourteenth means exceeds a predetermined reference number, and for holding the memory unit in the still-image mode of operation when the third means changes to decide that the image quality is good in cases where the number counted by the fourteenth means does not exceed a predetermined reference number.

A twenty-fifth aspect of this invention is based on the twelfth aspect thereof, and provides a mobile television receiver further comprising twelfth means for counting pulses of the first horizontal sync signal which have phases retarding from phases of corresponding pulses of the second horizontal sync signal during every field; fourteenth means for counting pulses of the first horizontal sync signal which have phases advancing from phases of corresponding pulses of the second horizontal sync signal during every field; fifteenth means for comparing a number of the pulses counted by the twelfth means and a number of the pulses counted by the fourteenth means; and sixteenth means for controlling the sixth means in response to a result of the comparing by the fifteenth means.

A twenty-sixth aspect of this invention provides a mobile television receiver comprising a TV tuner demodulating an incoming TV signal into a video signal; first means for separating a first horizontal sync signal and a vertical sync signal from the video signal generated by the TV tuner; a clock oscillator for generating a clock signal having a given frequency; a frequency divider for dividing the frequency of the clock signal by a controllable frequency division factor to convert the clock signal into a second horizontal sync signal; second means for detecting a difference between a phase of the first horizontal sync signal generated by the first means and a phase of the second horizontal sync signal generated by the frequency divider; third means for deciding whether or not the phase difference detected by the second means is outside a predetermined range during a predetermined number of successive fields; fourth means for counting pulses of the vertical sync signal generated by the first means to generate a count signal having a cycle corresponding to a given number of fields; fifth means for controlling the frequency division factor in response to the phase difference detected by the second means a controllable number of times during every cycle of the count signal; sixth means for controlling the number of times of the control by the fifth means in response to the phase difference detected by the second means; seventh means for controlling the frequency divider in response to the first horizontal sync signal to equalize the phase of the second horizontal sync signal to the phase of the first horizontal sync signal in cases where the third means decides that the phase difference is outside the predetermined range during the predetermined number of successive fields; and eighth means for displaying the video signal generated by the TV tuner in response to the second horizontal sync signal generated by the frequency divider and the vertical sync signal generated by the first means.

A twenty-seventh aspect of this invention provides a mobile television receiver comprising a TV tuner demodulating an incoming IV signal into a first video signal; first means for separating a first horizontal sync signal and a vertical sync signal from the first video signal generated by the TV tuner; second means for detecting a quality of an image represented by the first video signal generated by the TV tuner at a given timing in every field related to the first video signal; third means for comparing the image quality detected by the second means with a predetermined threshold quality, for deciding that the image quality detected by the second means is good when the image quality detected by the second means is equal to or greater than the predetermined threshold quality, and for deciding that the image quality detected by the second means is poor when the image quality detected by the second means is smaller than the predetermined threshold quality; a clock oscillator for generating a clock signal having a given frequency; a frequency divider for dividing the frequency of the clock signal by a controllable frequency division factor to convert the clock signal into a second horizontal sync signal; fourth means for detecting a difference between a phase of the first horizontal sync signal generated by the first means and a phase of the second horizontal sync signal generated by the frequency divider; fifth means for deciding whether or not the phase difference detected by the fourth means is outside a predetermined range during a predetermined number of successive fields; sixth means for counting pulses of the vertical sync signal generated by the first means to generate a count signal having a cycle corresponding to a given number of fields; seventh means for controlling the frequency division factor in response to the phase difference detected by the fourth means a controllable number of times during every cycle of the count signal; eighth means for controlling the number of times in response to the phase difference detected by the fourth means; ninth means for controlling the frequency divider in response to the first horizontal sync signal to equalize the phase of the second horizontal sync signal to the phase of the first horizontal sync signal in cases where the fifth means decides that the phase difference is outside the predetermined range during the predetermined number of successive fields; a memory unit changeable between a normal mode of operation and a still-image mode of operation, the memory unit periodically storing the first video signal generated by the TV tuner and periodically outputting the stored first video signal as a second video signal when being in the normal mode of operation, the memory unit stopping periodically storing the first video signal generated by the TV tuner but executing periodically outputting the last stored first video signal as the second video signal when being in the still-image mode of operation; tenth means for changing the memory unit from the normal mode of operation to the still-image mode of operation when the third means changes to decide that the image quality is poor, and for changing the memory unit from the still-image mode of operation to the normal mode of operation when the third means changes to decide that the image quality is good; and eleventh means for displaying the second video signal outputted from the memory unit in response to the second horizontal sync signal generated by the frequency divider and the vertical sync signal generated by the first means.

A twenty-eighth aspect of this invention is based on the twenty-seventh aspect thereof, and provides a mobile television receiver further comprising twelfth means for estimating a strength of the incoming TV signal for every field; thirteenth means for calculating a mean strength among the strengths estimated by the twelfth means during a given number of fields; fourteenth means for deciding whether or not the strength estimated by the twelfth means is lower than the mean strength calculated by the thirteenth means; fifteenth means for deciding whether or not the phase of the first horizontal sync signal and the phase of the second horizontal sync signal are substantially equal by referring to the phase difference detected by the fourth means; and sixteenth means for changing the memory unit from the normal mode of operation to the still-image mode of operation when the fourteenth means decides that the estimated strength is lower than the mean strength, and for changing the memory unit from the still-image mode of operation to the normal mode of operation when the fourteenth means decides that the estimated strength is not lower than the mean strength in cases where the fifteenth means decides that the phase of the first horizontal sync signal and the phase of the second horizontal sync signal are substantially equal.

A twenty-ninth aspect of this invention is based on the twenty-seventh aspect thereof, and provides a mobile television receiver further comprising twelfth means for estimating a strength of the incoming TV signal for every field; thirteenth means for calculating a mean strength among the strengths estimated by the twelfth means during a given number of fields; fourteenth means for deciding whether or not the strength estimated by the twelfth means is lower than the mean strength calculated by the thirteenth means; fifteenth means for deciding whether or not the phase of the first horizontal sync signal and the phase of the second horizontal sync signal are substantially equal by referring to the phase difference detected by the fourth means; and sixteenth means for changing the memory unit from the normal mode of operation to the still-image mode of operation when the fourteenth means decides that the estimated strength is lower than the mean strength, for changing the memory unit from the still-image mode of operation to the normal mode of operation when the fourteenth means decides that the estimated strength is not lower than the mean strength in cases where the fifteenth means decides that the phase of the first horizontal sync signal and the phase of the second horizontal sync signal are substantially equal, and for controlling the frequency divider in response to the first horizontal sync signal to equalize the phase of the second horizontal sync signal to the phase of the first horizontal sync signal and then changing the memory unit from the still-image mode of operation to the normal mode of operation when the fourteenth means decides that the estimated strength is not lower than the mean strength in cases where the fifteenth means decides that the phase of the first horizontal sync signal and the phase of the second horizontal sync signal are not substantially equal.

A thirtieth aspect of this invention is based on the twenty-seventh aspect thereof, and provides a mobile television receiver wherein the second means comprises means for separating horizontal sync pulses from the first video signal generated by the TV tuner; and means for counting the separated horizontal sync pulses during a given period of time in every field to detect a quality of an image represented by the first video signal generated by the TV tuner.

A thirty-first aspect of this invention is based on the twenty-seventh aspect thereof, and provides a mobile television receiver wherein the second means comprises a low pass filter for removing high-frequency components from the first video signal generated by the TV tuner; a differentiator for differentiating an output signal of the low pass filter; a comparator for comparing an output signal of the differentiator with a reference signal representative of a predetermined reference level to convert the output signal of the differentiator into a binary signal; a counter for periodically counting a high-level state of the binary signal generated by the comparator at given intervals to detect a quality of an image represented by the first video signal generated by the IV tuner; and means for resetting the counter at a given timing in every frame in response to the second vertical sync signal.

A thirty-second aspect of this invention is based on the twenty-seventh aspect thereof, and provides a mobile television receiver further comprising twelfth means for generating a second vertical sync signal, for detecting a difference between a phase of the first vertical sync signal generated by the first means and a phase of the second vertical sync signal, and for controlling the phase of the second vertical sync signal in response to the detected phase difference between the first vertical sync signal and the second vertical sync signal to lock the second vertical sync signal in phase and frequency to the first vertical sync signal; and thirteenth means for controlling the second means in response to the second vertical sync signal generated by the twelfth means.

A thirty-third aspect of this invention is based on the twenty-sixth aspect thereof, and provides a mobile television receiver further comprising a second frequency divider for dividing the frequency of the clock signal by a controllable frequency division factor to convert the clock signal into a second vertical sync signal; ninth means for detecting a difference between a phase of the first vertical sync signal generated by the first means and a phase of the second vertical sync signal generated by the second frequency divider; tenth means for deciding whether or not the phase of the first vertical sync signal and the phase of the second vertical sync signal are different during a predetermined number of successive fields; eleventh means for controlling the frequency division factor in the second frequency divider in response to the phase difference detected by the ninth means to lock the second vertical sync signal in phase and frequency to the first vertical sync signal; twelfth means for controlling the eleventh means in response to the first vertical sync signal to equalize the phase of the second vertical sync signal to the phase of the first vertical sync signal when the tenth means decides that the phase of the first vertical sync signal and the phase of the second vertical sync signal are different during the predetermined number of successive fields; and thirteenth means for controlling the eighth means in response to the second vertical sync signal.

A thirty-fourth aspect of this invention is based on the twenty-sixth aspect thereof, and provides a mobile television receiver further comprising ninth means for counting pulses of the first horizontal sync signal which have phases retarding from phases of corresponding pulses of the second horizontal sync signal during every field; tenth means for counting pulses of the first horizontal sync signal which have phases advancing from phases of corresponding pulses of the second horizontal sync signal during every field; eleventh means for comparing a number of the pulses counted by the ninth means and a number of the pulses counted by the tenth means; and twelfth means for controlling the number of times of the control by the fifth means in response to a result of the comparing by the eleventh means.

A thirty-fifth aspect of this invention is based on the twenty-sixth aspect thereof, and provides a mobile television receiver further comprising ninth means for counting successive pulses of the first horizontal sync signal which have phases retarding from phases of corresponding pulses of the second horizontal sync signal during every field; tenth means for counting successive pulses of the first horizontal sync signal which have phases advancing from phases of corresponding pulses of the second horizontal sync signal during every field; eleventh means for deciding whether or not one of a number of the pulses counted by the ninth means and a number of the pulses counted by the tenth means exceeds a predetermined number; and twelfth means for changing the number of times of the control by the fifth means when the eleventh means decides that one of the number of the pulses counted by the ninth means and the number of the pulses counted by the tenth means exceeds the predetermined number.

A thirty-sixth aspect of this invention is based on the twenty-sixth aspect thereof, and provides a mobile television receiver further comprising a vehicle speed sensor for detecting a speed of the vehicle; and ninth means for controlling the number of times of the control by the fifth means in response to the vehicle speed detected by the vehicle speed sensor.

A thirty-seventh aspect of this invention is based on the twenty-sixth aspect thereof, and provides a mobile television receiver further comprising ninth means for estimating a strength of the incoming TV signal for every field; tenth means for calculating a mean strength among the strengths estimated by the ninth means during a given number of fields; eleventh means for counting a number of times where the strength estimated by the ninth means crosses the mean strength calculated by the tenth means; and twelfth means for controlling the number of times of the control by the fifth means in response to the number counted by the eleventh means.

A thirty-eighth aspect of this invention provides an apparatus comprising first means for detecting an amount of noise in a first video signal during a presence of an equalizing pulse in the first video signal for every field related to the first video signal; second means for comparing the noise amount detected by the first means with a predetermined reference amount; a memory unit changeable between a normal mode of operation and a still-image mode of operation, the memory unit periodically storing the first video signal and periodically outputting the stored first video signal as a second video signal when being in the normal mode of operation, the memory unit stopping periodically storing the first video signal but executing periodically outputting the last stored first video signal as the second video signal when being in the still-image mode of operation; and third means for changing the memory unit between the normal mode of operation and the still-image mode of operation in response to a result of the comparing by the second means.

A thirty-ninth aspect of this invention is based on the thirty-eighth aspect thereof, and provides an apparatus further comprising fourth means for displaying the second video signal outputted from the memory unit.

DESCRIPTION OF THE PREFERRED EMBODIMENTS

First Embodiment

Figure 1:
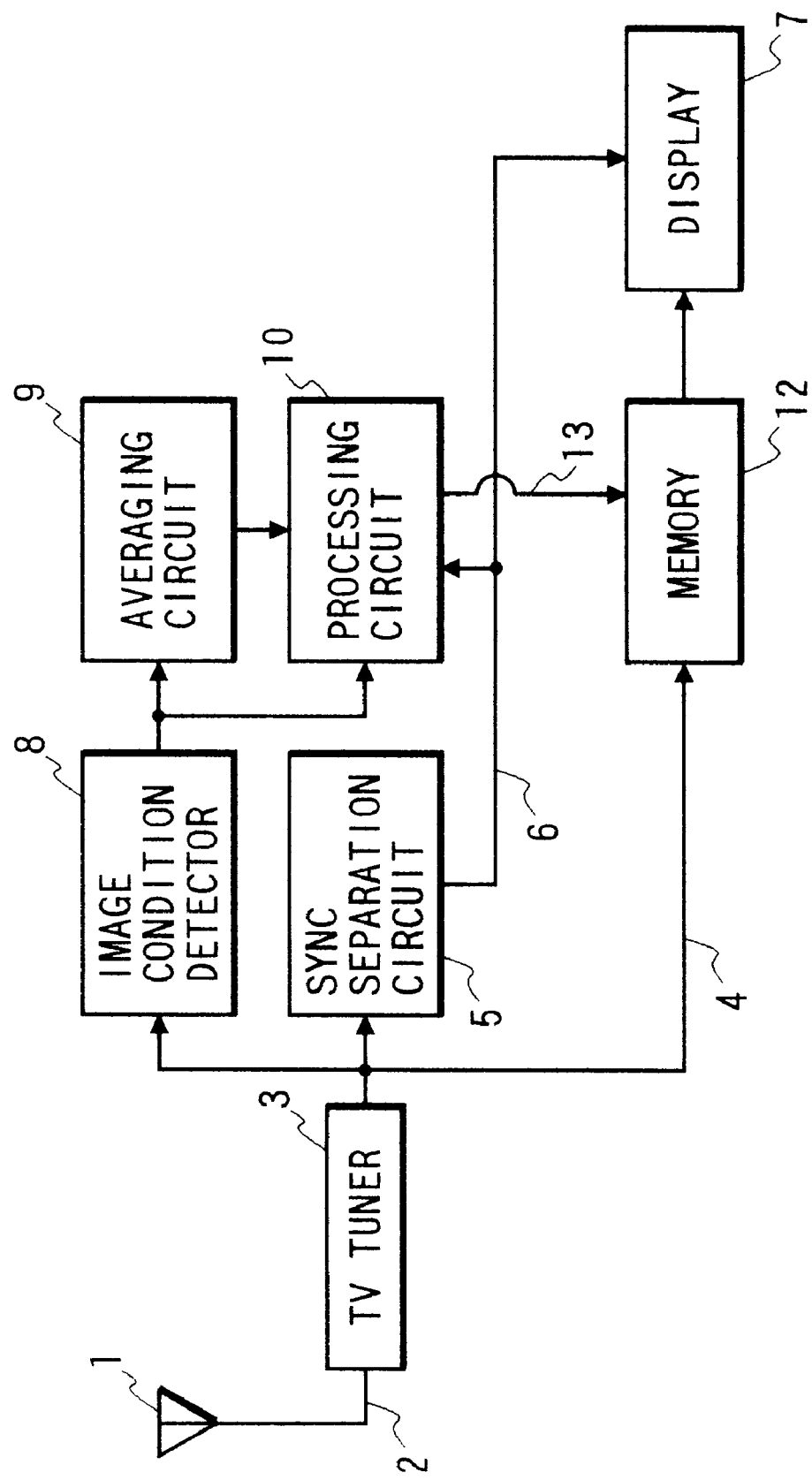
FIG. 1 is a block diagram of a mobile television receiver according to a first embodiment of this invention.

With reference to FIG. 1, an antenna 1 catches RF signals 2 including RF TV signals of different channels. The caught RF signals 2 are fed from the antenna 1 to a TV tuner 3. The TV tuner 3 selects an RF TV signal of a designated channel from among the RF signals fed from the antenna 1. The TV tuner 3 converts the selected RF TV signal into an IF television signal. The TV tuner 3 demodulates the IF television signal into a baseband video signal 4.

The video signal 4 is outputted from the TV tuner 3 to a sync separation circuit 5. The sync separation circuit 5 separates horizontal and vertical sync signals 6 from the video signal 4. The sync separation circuit 5 outputs the horizontal and vertical sync signals 6 to a display 7.

The video signal 4 is fed from the TV tuner 3 to an image condition detector 8. The image condition detector 8 serves to estimate a quality (a condition) of an image represented by the video signal 4 for every field related to the video signal 4. Specifically, the image condition detector 8 serves to detect noise components of the video signal 4 for every field.

Figure 2:
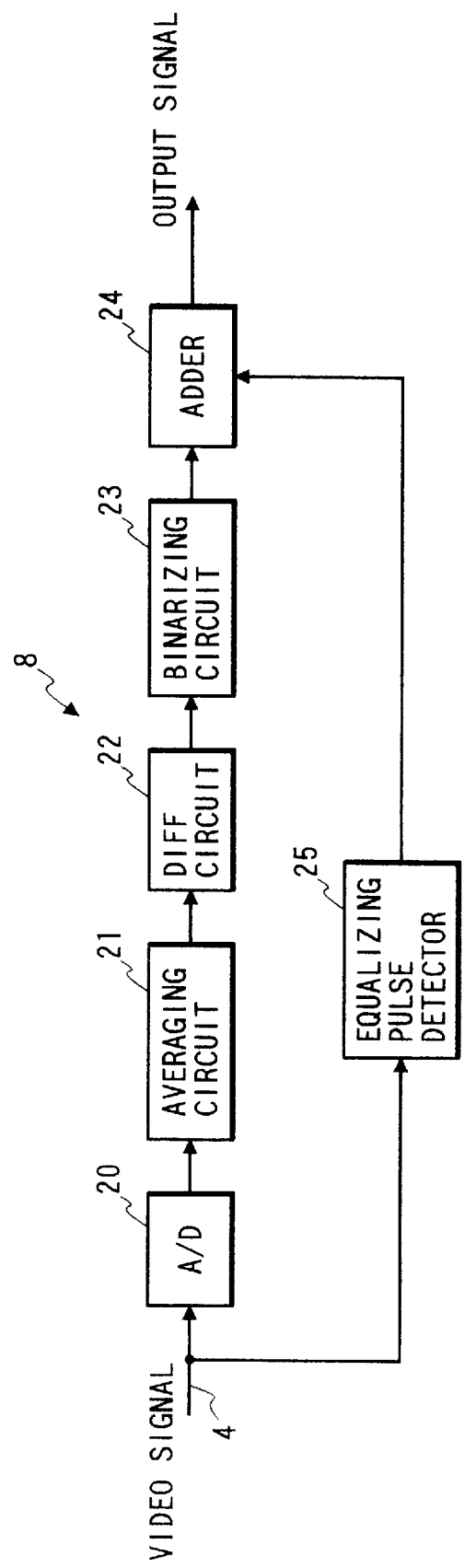
FIG. 2 is a block diagram of an image condition detector in FIG. 1.

As shown in FIG. 2, the image condition detector 8 includes a series combination of an A/D converter 20, an averaging circuit 21, a differential circuit 22, a binarizing circuit 23, an adder 24, and an equalizing pulse detector 25. The A/D converter 20 changes the video signal 4 into a corresponding digital video signal, and outputs the digital video signal to the averaging circuit 21. The averaging circuit 21 periodically calculates a mean value among the values represented by the output signal of the A/D converter 20 at a predetermined number of successive sampling points respectively. The averaging circuit 21 outputs a signal representing the calculated mean value. The differential circuit 22 calculates a difference between the current mean value and the immediately-preceding mean value represented by the output signal of the averaging circuit 21. The differential circuit 22 outputs a signal representing the calculated difference. The binarizing circuit 23 periodically compares the difference represented by the output signal of the difference circuit 22 with a predetermined value. The binarizing circuit 23 generates a binary signal in response to the result of the comparison. The binarizing circuit 23 outputs the generated binary signal to the adder 24. The equalizing pulse detector 25 detects an equalizing pulse in the video signal 4 for every field. For every field, the equalizing pulse detector 25 generates and outputs a signal representing the period of time during which an equalizing pulse lasts, that is, the time period of the presence of an equalizing pulse. The equalizing-pulse-period signal is fed from the equalizing pulse detector 25 to the adder 24. The adder 24 sums or adds the values represented by the output signal of the binarizing circuit 23 during a predetermined period of time for every field represented by the video signal 4. Specifically, the adder 24 sums (accumulates) or adds the values represented by the output signal of the binarizing circuit 23 during the equalizing-pulse period represented by the output signal of the equalizing pulse detector 25. Thus, the adder 24 serves as an accumulator or an integrator. The adder 24 periodically outputs a signal representing the sum result (the addition result) as an output signal of the image condition detector 8.

Figure 3:
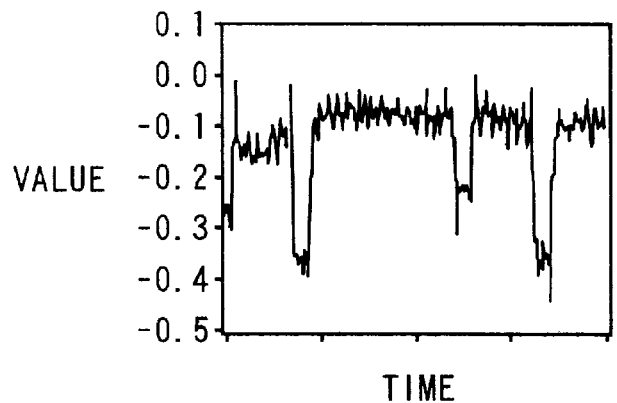
FIG. 3 is a diagram of an example of a time-domain variation in the level of a sampling-resultant signal generated by an A/D converter in FIG. 2.
Figure 4:
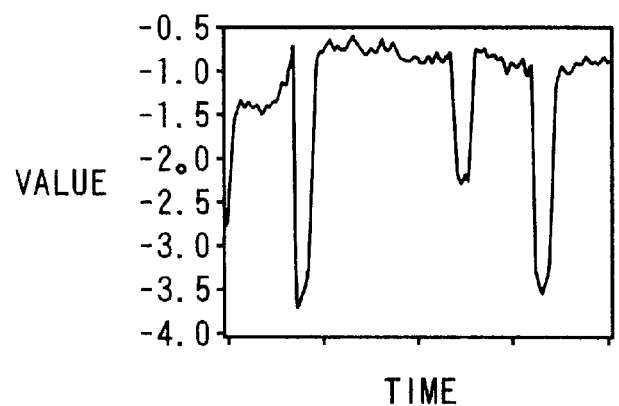
FIG. 4 is a diagram of an example of a time-domain variation in a calculated mean value represented by the output signal of an averaging circuit in FIG. 2.
Figure 5:
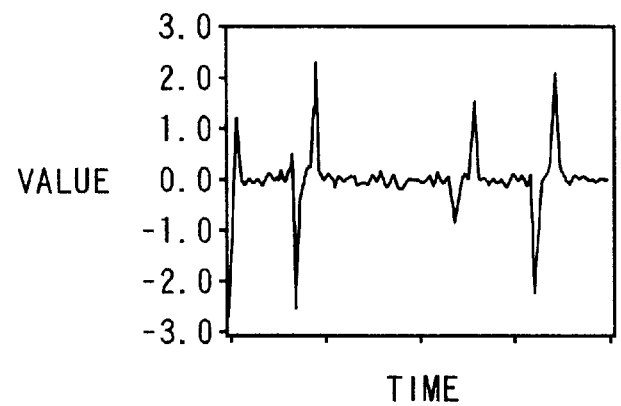
FIG. 5 is a diagram of an example of a time-domain variation in a difference represented by the output signal of a differential circuit in FIG. 2.

The A/D converter 20 periodically samples the video signal 4 at a predetermined sampling frequency based on the sampling theorem. The sampling frequency is equal to, for example, three or four times the color subcarrier frequency of the video signal 4. FIG. 3 shows an example of a time-domain variation in the level of the sampling-resultant signal during a given period of time in every field for which an equalizing pulse lasts. The A/D converter 20 digitizes every sample of the video signal 4. The averaging circuit 21 calculates a mean value among the values represented by the output signal of the A/D converter 20 at a predetermined number of successive sampling points respectively. The averaging process implemented by the averaging circuit 21 removes high-frequency noise components. The averaging circuit 21 outputs a signal representing the calculated mean value. FIG. 4 shows an example of a time-domain variation in the calculated mean value represented by the output signal of the averaging circuit 21 which originates from the sampling-resultant signal in FIG. 3. The differential circuit 22 calculates a difference between the current mean value and the immediately-preceding mean value represented by the output signal of the averaging circuit 21. In other words, the differential circuit 22 differentiates the mean value represented by the output signal of the averaging circuit 21 with respect to time. The differential circuit 22 outputs a signal representing the calculated difference. FIG. 5 shows an example of a time-domain variation in the difference represented by the output signal of the differential circuit 22 which originates from the mean-value signal in FIG. 4. The binarizing circuit 23 compares the difference represented by the output signal of the difference circuit 22 with the predetermined value. The binarizing circuit 23 outputs a signal of "1" when the difference represented by the output signal of the difference circuit 22 is equal to or greater than the predetermined value. The binarizing circuit outputs a signal of "0" when the difference represented by the output signal of the difference circuit 22 is smaller than the predetermined value. The adder 24 sums (accumulates) or adds the values represented by the output signal of the binarizing circuit 23 during the equalizing-pulse period represented by the output signal of the equalizing pulse detector 25.

As understood from the previous explanation, during the period of the presence of an equalizing pulse for every field, the image condition detector 8 serves to detect the amount of noise components of the video signal 4 which have a given level or higher. Generally, high-frequency noise components are excluded from the noise components detected by the image condition detector 8. The value represented by the output signal of the image condition detector 8 increases as the amount of noise components of the video signal increases. Thus, the value represented by the output signal of the image condition detector 8 increases as the quality of an image represented by the video signal 4 decreases. In the case where delayed wave of another equalizing pulse (for example, an equalizing pulse temporally adjacent to the equalizing pulse of interest) enters the period of time (the equalizing-pulse period) during which the image condition detector 8 remains active, the delayed wave is detected by the image condition detector 8 as noise components. Accordingly, the image condition detector 8 can detect noise components including such delayed wave.

It should be noted that the binarizing circuit 23 may be modified to compare the absolute value of the difference represented by the output signal of the difference circuit 22 with the predetermined value.

With reference back to FIG. 1, the output signal of the image condition detector 8 is applied to an averaging circuit 9. The averaging circuit 9 periodically calculates a mean value among the values represented by the output signal of the image condition detector 8 during N successive fields related to the video signal 4. Here, N denotes a predetermined natural number. The averaging circuit 9 generates and outputs a signal representing the calculated mean value. The output signal of the image condition detector 8 is also applied to a processing circuit 10 including a programmable device such as a microcomputer, a CPU, or a digital signal processor (DSP). The output signal of the averaging circuit 9 is applied to the processing circuit 10.

The processing circuit 10 is programmed to generate a memory control signal 13 in response to the output signals of the image condition detector 8 and the averaging circuit 9. The processing circuit 10 includes a combination of an I/O port, a processing section, a RAM, and a ROM. The processing circuit 10 operates in accordance with a control program stored in the ROM. The processing circuit 10 outputs the memory control signal 13 to a memory unit 12.

The video signal 4 is fed from the TV tuner 3 to the memory unit 12. The memory unit 12 temporarily stores the video signal 4, and outputs the stored video signal to the display 7.

Figure 6:
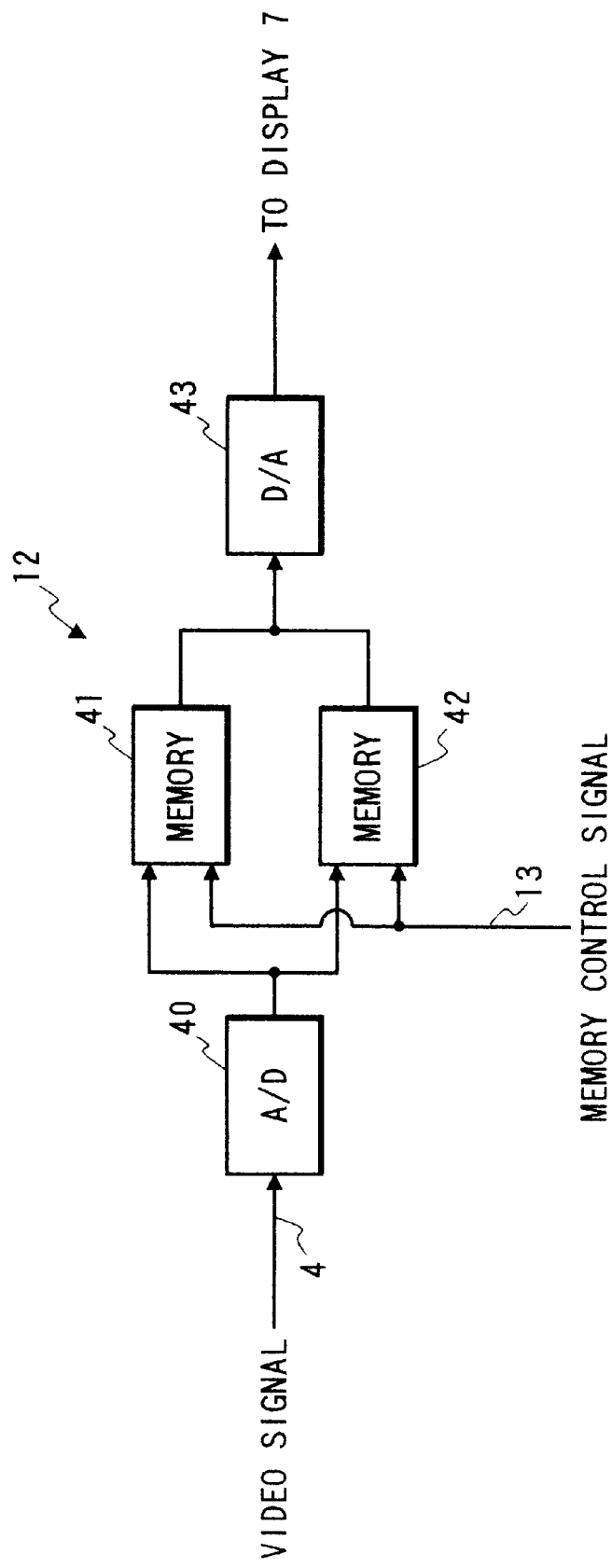
FIG. 6 is a block diagram of a memory unit in FIG. 1.

As shown in FIG. 6, the memory unit 12 includes an A/D converter 40, memories 41 and 42, and a D/A converter 43. The A/D converter 40 changes the video signal 4 into a corresponding digital video signal. The A/D converter 40 outputs the digital video signal to the memories 41 and 42. The memory control signal 13 is fed to the memories 41 and 42 from the processing circuit 10 (see FIG. 1). Operation of the memories 41 and 42 is changed between a normal mode and a still-image mode in response to the memory control signal 13. During the normal mode of operation, the digital video signal is alternately written into the memories 41 and 42 while the digital video signal is alternately read out from the memories 41 and 42. In this case, one of the memories 41 and 42 undergoes a signal writing process while the other memory undergoes a signal reading process. For example, the digital video signal representing every even-numbered field is assigned to the memory 41, and the digital video signal representing every odd-numbered field is assigned to the memory 42. During the normal mode of operation, an image represented by the digital video signal read out from the memories 41 and 42 can change frame by frame (or field by field). During the still-image mode of operation, the updating of the digital video signal in the memories 41 and 42 remains inhibited while the previously-written digital video signal is alternately and periodically read out from the memories 41 and 42. In other words, during the still-image mode of operation, writing the digital video signal into the memories 41 and 42 remains suspended while the previously-written digital video signal is alternately and periodically read out from the memories 41 and 42. In this case, the digital video signal read out from the memories 41 and 42 continues to represent a still image. During the normal mode of operation and also the still-image mode of operation, the digital video signal read out from the memories 41 and 42 is applied to the D/A converter 43. The D/A converter 43 returns the digital video signal to the original analog video signal. The D/A converter 43 outputs the analog video signal to the display 7 (see FIG. 1).

With reference back to FIG. 1, the display 7 visualizes the video signal outputted from the memory unit 12 on its screen in response to the horizontal and vertical sync signals 6 fed from the sync separation circuit 5.

Figure 7:
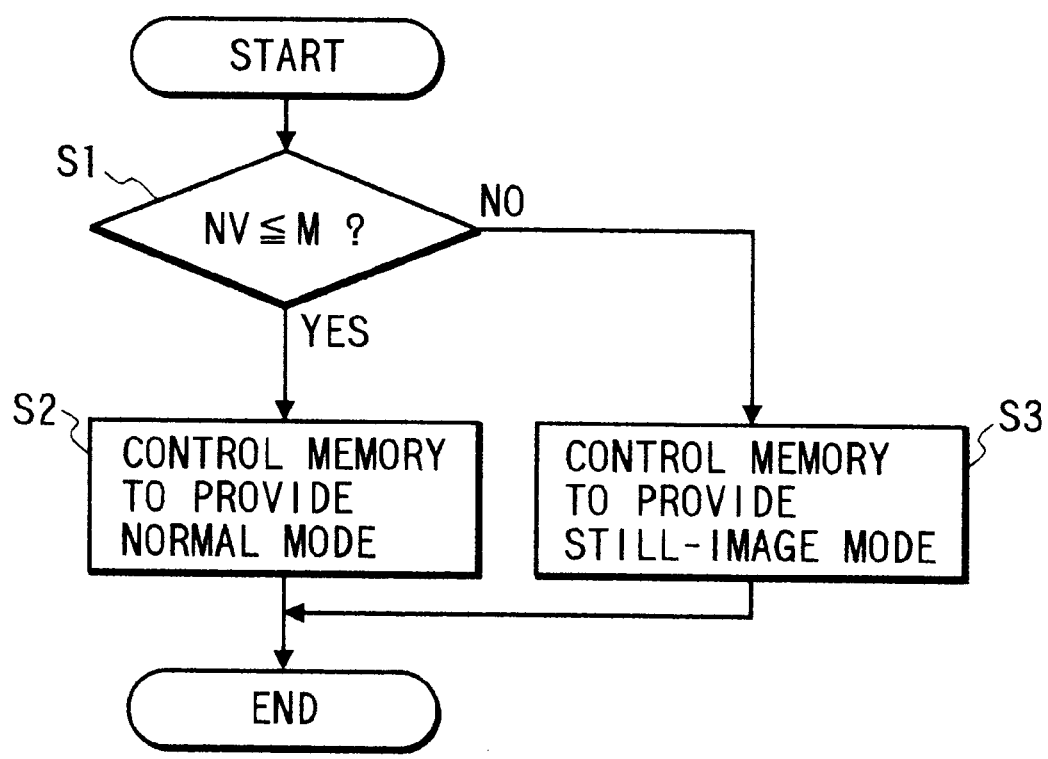
FIG. 7 is a flowchart of a control program for a processing circuit in FIG. 1.

As previously explained, the processing circuit 10 operates in accordance with a control program stored in its internal ROM. FIG. 7 is a flowchart of the program which is executed for every field related to the video signal 4. The processing circuit 10 receives the vertical sync signal from the sync separation circuit 5. The processing circuit 10 starts the execution of the program in response to the vertical sync signal.

As shown in FIG. 7, a first step S1 of the program compares the noise indicating value NV represented by the output signal of the image condition detector 8 with the mean value M represented by the output signal of the averaging circuit 9. When the noise indicating value NV is equal to or less than the mean value M, the program advances from the step S1 to a step S2. Otherwise, the program advances from the step S1 to a step S3.

The step S2 controls the memory unit 12 so that the memories 41 and 42 therein will operate in the normal mode. On the other hand, the step S3 controls the memory unit 12 so that the memories 41 and 42 therein will operate in the still-image mode. After the steps S2 and S3, the current execution cycle of the program ends.

It should be noted that the A/D converter 20 in FIG. 2 and the A/D converter 40 in FIG. 6 may use a common A/D converter.

The averaging circuit 9 may be modified to weight the values represented by the output signal of the image condition detector 8, and to calculates a mean value among the weighting-resultant values during N successive fields related to the video signal 4.

The antenna 1 may be replaced by plural antennas. In this case, a diversity unit for antenna selection is provided between the antennas and the TV tuner 3.

Second Embodiment

Figure 8:
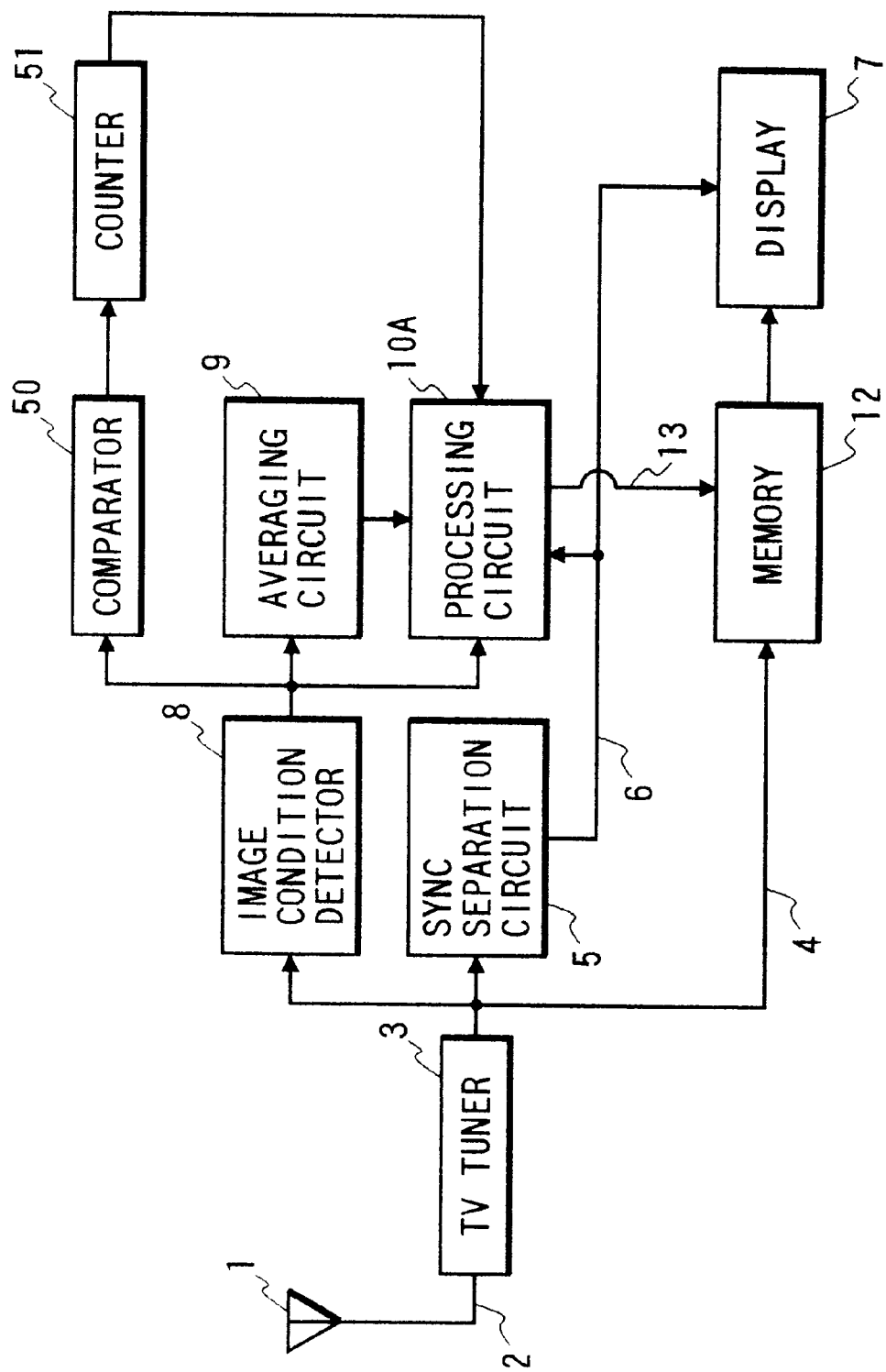
FIG. 8 is a block diagram of a mobile television receiver according to a second embodiment of this invention.

FIG. 8 shows a second embodiment of this invention which is similar to the embodiment of FIGS. 1–7 except for the following additional arrangement. The embodiment of FIG. 8 includes a processing circuit 10A instead of the processing circuit 10 in FIG. 1. The embodiment of FIG. 8 also includes a comparator 50 and a counter 51.

The comparator 50 compares the value represented by the output signal of the image condition detector 8 with a predetermined reference value to detect a weak electric field of the received RF TV signal. The comparator 50 outputs a signal representing whether or not the value represented by the output signal of the image condition detector 8 is smaller than the reference value. The output signal of the comparator 50 is applied to the counter 51. The counter 51 selectively counts field-synchronized pulses in response to the output signal of the comparator 50. The counter 51 calculates the number of fields, in which the value represented by the output signal of the image condition detector 8 is smaller than the reference value, among a predetermined number of successive fields. The counter 51 feeds the processing circuit 10A with a signal representing the calculated field number.

Figure 9:
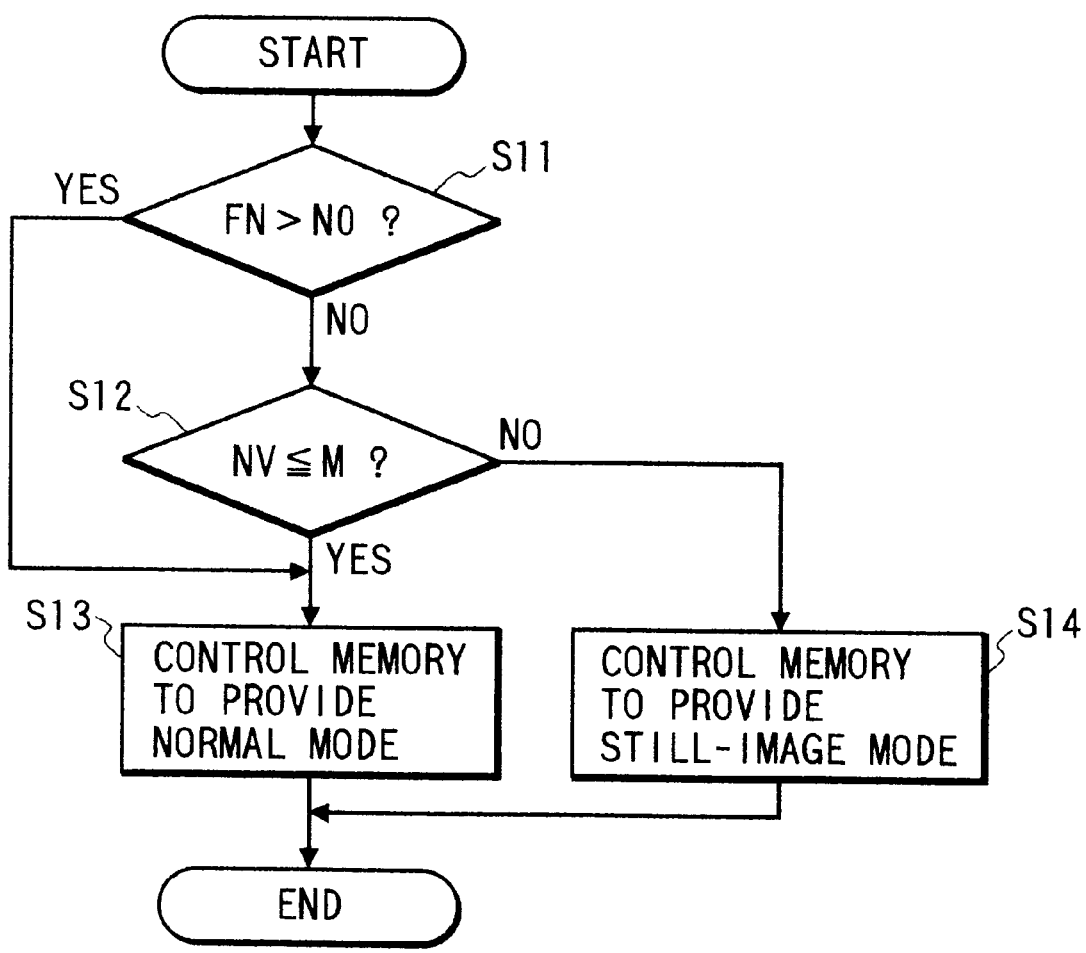
FIG. 9 is a flowchart of a control program for a processing circuit in FIG. 8.

FIG. 9 is a flowchart of a control program for the processing circuit 10A which is executed for every field related to the video signal 4.

As shown in FIG. 9, a first step S1 of the program compares the field number FN represented by the output signal of the counter 51 with a predetermined reference number NO. When the field number FN is equal to or less than the reference number NO, the program advances from the step S1 to a step S12. When the field number FN exceeds the reference number NO, that is, when the electric field of the received RF TV signal is relatively weak, the program advances from the step S1 to a step S13.

The step S12 compares the noise indicating value NV represented by the output signal of the image condition detector 8 with the mean value M represented by the output signal of the averaging circuit 9. When the noise indicating value NV is equal to or less than the mean value M, the program advances from the step S12 to the step S13. Otherwise, the program advances from the step S12 to a step S14.

The step S3 controls the memory unit 12 so that the memories 41 and 42 therein will operate in the normal mode. On the other hand, the step S14 controls the memory unit 12 so that the memories 41 and 42 therein will operate in the still-image mode. After the steps S13 and S14, the current execution cycle of the program ends.

The step S1 provides the following process. When the electric field of the received RF TV signal is relatively weak, the memory unit 12 is inhibited from operating in the still-image mode.

Third Embodiment

Figure 10:
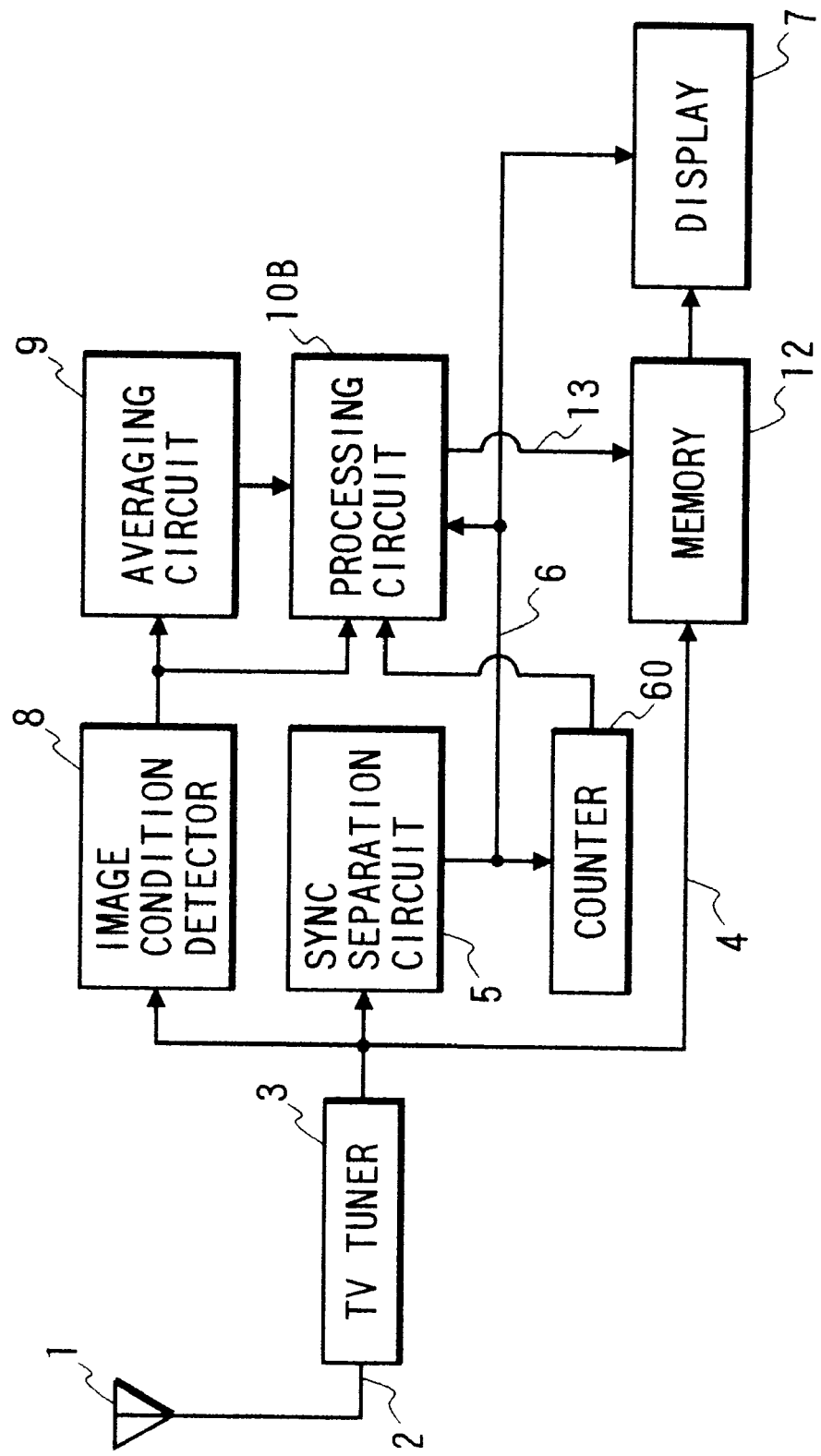
FIG. 10 is a block diagram of a mobile television receiver according to a third embodiment of this invention.

FIG. 10 shows a third embodiment of this invention which is similar to the embodiment of FIGS. 1–7 except for the following additional arrangement. The embodiment of FIG. 10 includes a processing circuit 10B instead of the processing circuit 10 in FIG. 1. The embodiment of FIG. 10 also includes a counter 60.

The counter 60 receives the horizontal sync signal from the sync separation circuit 5, and counts pulses of the horizontally sync signal during every field related to the video signal 4. The counter 60 feeds the processing circuit 10B with a signal representing the calculated pulse number for every field. The pulse number represented by the output signal of the counter 60 is updated for every field.

When the intensity of delayed wave of the received RF TV signal is comparable with the intensity of direct wave thereof, the counter 60 responds to horizontal sync pulses in the delayed wave as well as horizontal sync pulses in the direct wave. Accordingly, the pulse number represented by the output signal of the counter 60 indicates a condition of the delayed wave. This means that the counter 60 detects a condition of the delayed wave.

Figure 11:
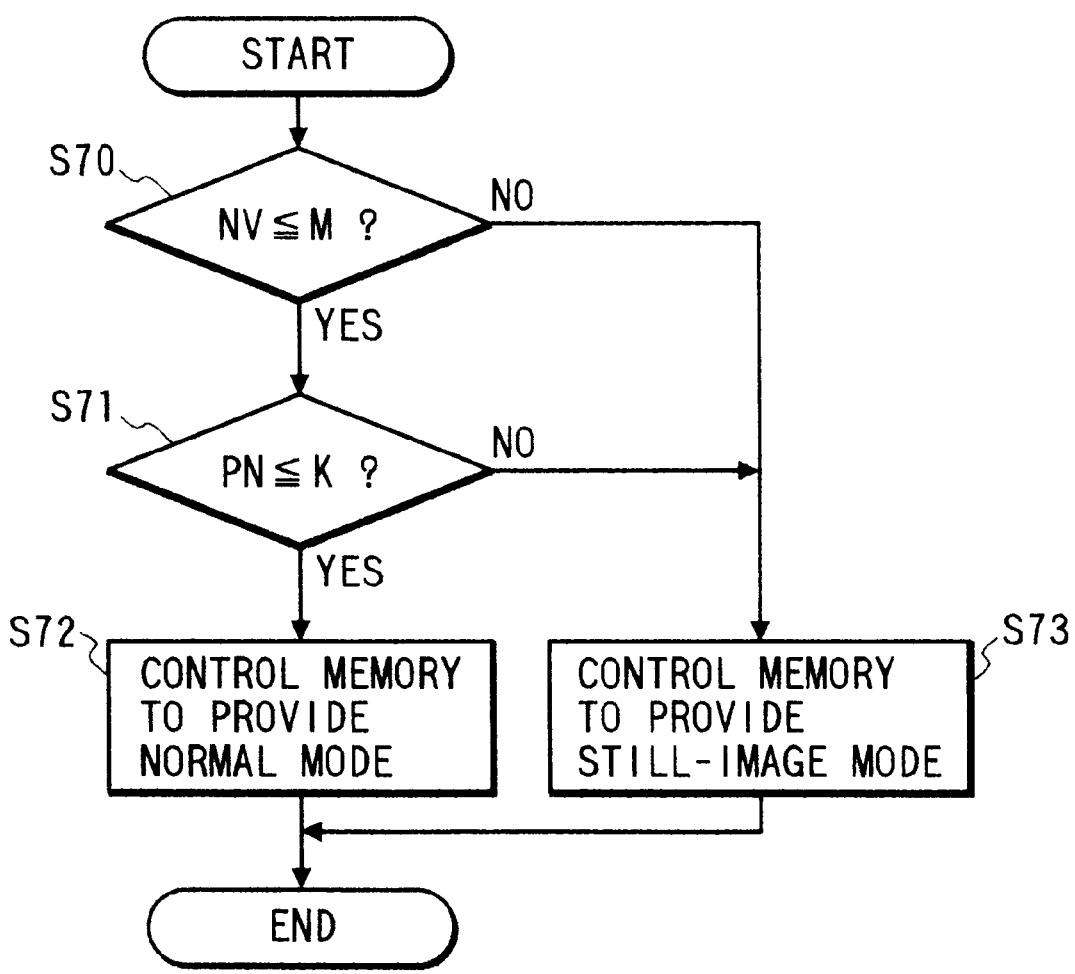
FIG. 11 is a flowchart of a control program for a processing circuit in FIG. 10.

FIG. 11 is a flowchart of a control program for the processing circuit 10B which is executed for every field related to the video signal 4.

As shown in FIG. 11, a first step S70 of the program compares the noise indicating value NV represented by the output signal of the image condition detector 8 with the mean value M represented by the output signal of the averaging circuit 9. When the noise indicating value NV is equal to or less than the mean value M, the program advances from the step S70 to a step S71. Otherwise, the program advances from the step S70 to a step S73.

The step S71 compares the pulse number PN represented by the output signal of the counter 60 with a predetermined reference number K. When the pulse number PN is equal to or less than the reference number K, the program advances from the step S71 to a step S72. Otherwise, the program advances from the step S71 to the step S73. Preferably, the reference number K is chosen to correspond to a condition where direct wave is present while delayed wave is substantially absent.

The step S72 controls the memory unit 12 so that the memories 41 and 42 therein will operate in the normal mode. On the other hand, the step S73 controls the memory unit 12 so that the memories 41 and 42 therein will operate in the still-image mode. After the steps S72 and S73, the current execution cycle of the program ends.

The antenna 1 may be replaced by plural antennas. In this case, a diversity unit for antenna selection is provided between the antennas and the TV tuner 3.

Fourth Embodiment

Figure 12:
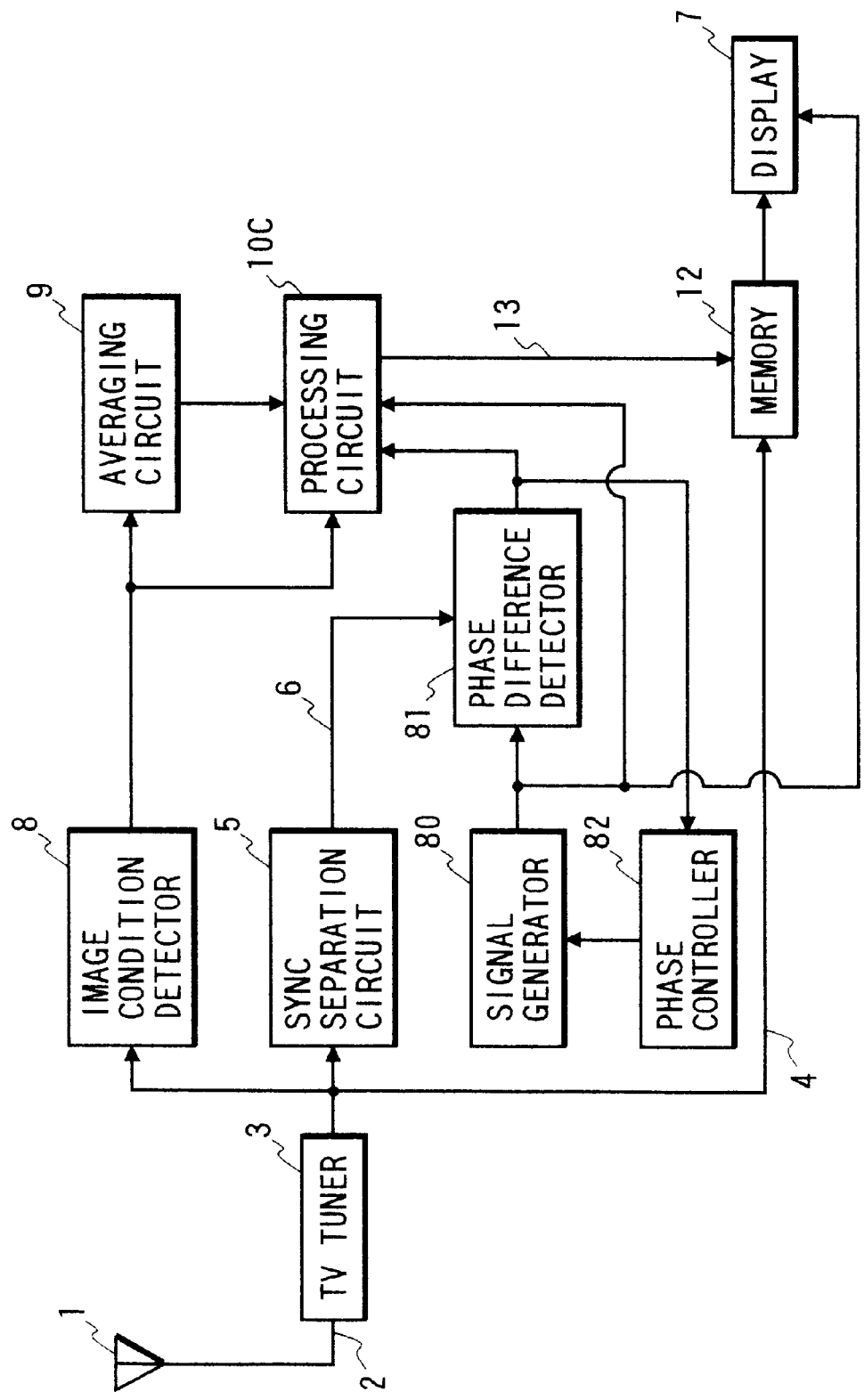
FIG. 12 is a block diagram of a mobile television receiver according to a fourth embodiment of this invention.

FIG. 12 shows a fourth embodiment of this invention which is similar to the embodiment of FIGS. 1–7 except for the following additional arrangement. The embodiment of FIG. 12 includes a processing circuit 10C instead of the processing circuit 10 in FIG. 1. The embodiment of FIG. 12 also includes a signal generator 80, a phase difference detector 81, and a phase controller 82.

The phase difference detector 81 receives the horizontal sync signal from the sync separation circuit 5. The signal generator 80, the phase difference detector 81, and the phase controller 82 are connected to form a PLL circuit which generates a second horizontal sync signal locked in phase and frequency to the horizontal sync signal fed from the sync separation circuit 5. The second horizontal sync signal generated by the PLL circuit appears at a first output terminal of the signal generator 80. A second vertical sync signal having a fixed frequency relation with the second horizontal sync signal is also produced by the signal generator 80. The second vertical sync signal appears at a second output terminal of the signal generator 80. The second horizontal sync signal and the second vertical sync signal are transmitted from the signal generator 80 to the display 7.

The device 81 detects the difference between the phase of the horizontal sync signal outputted from the sync separation circuit 5 and the phase of the horizontal sync signal outputted from the signal generator 80. The phase difference detector 81 feeds the processing circuit 10C with a signal representing the detected phase difference.

Figure 13:
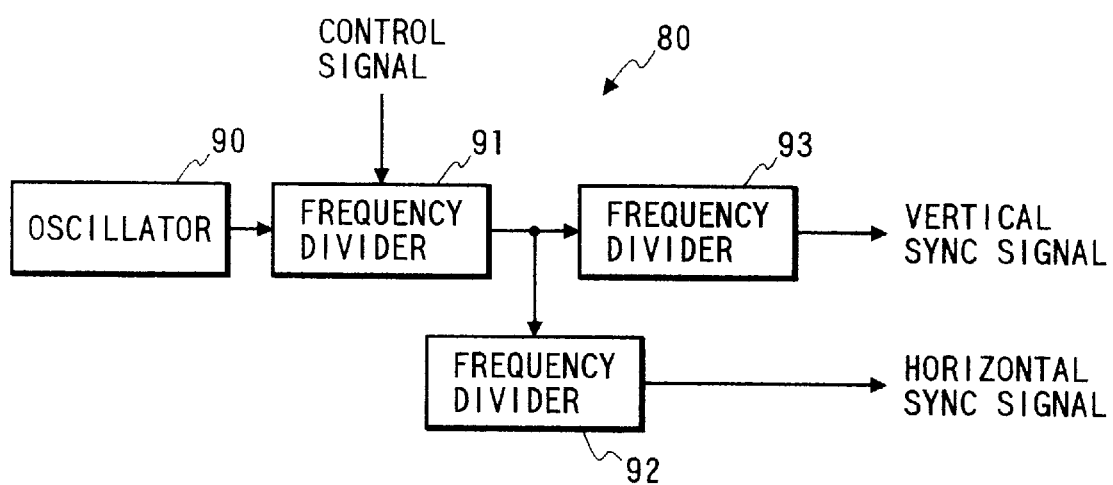
FIG. 13 is a block diagram of a signal generator in FIG. 12.

As shown in FIG. 13, the signal generator 80 includes an oscillator 90 and frequency dividers 91, 92, and 93.

Preferably, the oscillator 90 has a quartz resonator tuned to a frequency equal to four times the color subcarrier frequency of the video signal 4. The oscillator 90 outputs a signal having a predetermined fixed frequency equal to four times the color subcarrier frequency. The frequency divider 91 divides the frequency of the output signal of the oscillator 90 by a frequency division factor adjustable in a given range which is centered at 455 in the case where the video signal 4 is of the NTSC system. The frequency division factor used by the frequency divider 91 is adjusted in response to an output signal of the phase controller 82 (see FIG. 12). The frequency divider 92 divides the frequency of the output signal of the frequency divider 91 by a frequency division factor which is equal to 2 in the case where the video signal 4 is of the NTSC system. The frequency divider 92 generates the second horizontal sync signal. The frequency divider 92 outputs the second horizontal sync signal to the display 7 (see FIG. 12). The frequency divider 93 divides the frequency of the output signal of the frequency divider 91 by a frequency division factor which is equal to 525 in the case where the video signal 4 is of the NTSC system. The frequency divider 93 generates the second vertical sync signal. The frequency divider 93 outputs the second vertical sync signal to the display 7 (see FIG. 12).

With reference back to FIG. 12, the phase controller 82 receives the output signal of the phase difference detector 81 which represents the difference between the phase of the horizontal sync signal outputted from the sync separation circuit 5 and the phase of the horizontal sync signal outputted from the signal generator 80. The phase controller 82 generates a control signal in response to the output signal of the phase difference detector 81. The phase controller 82 outputs the generated control signal to the frequency divider 91 in the signal generator 80 (see FIG. 13). The phase controller 82 adjusts the frequency division factor in the frequency divider 91 so as to nullify the difference between the phase of the horizontal sync signal outputted from the sync separation circuit 5 and the phase of the horizontal sync signal outputted from the signal generator 80.

Figure 14:
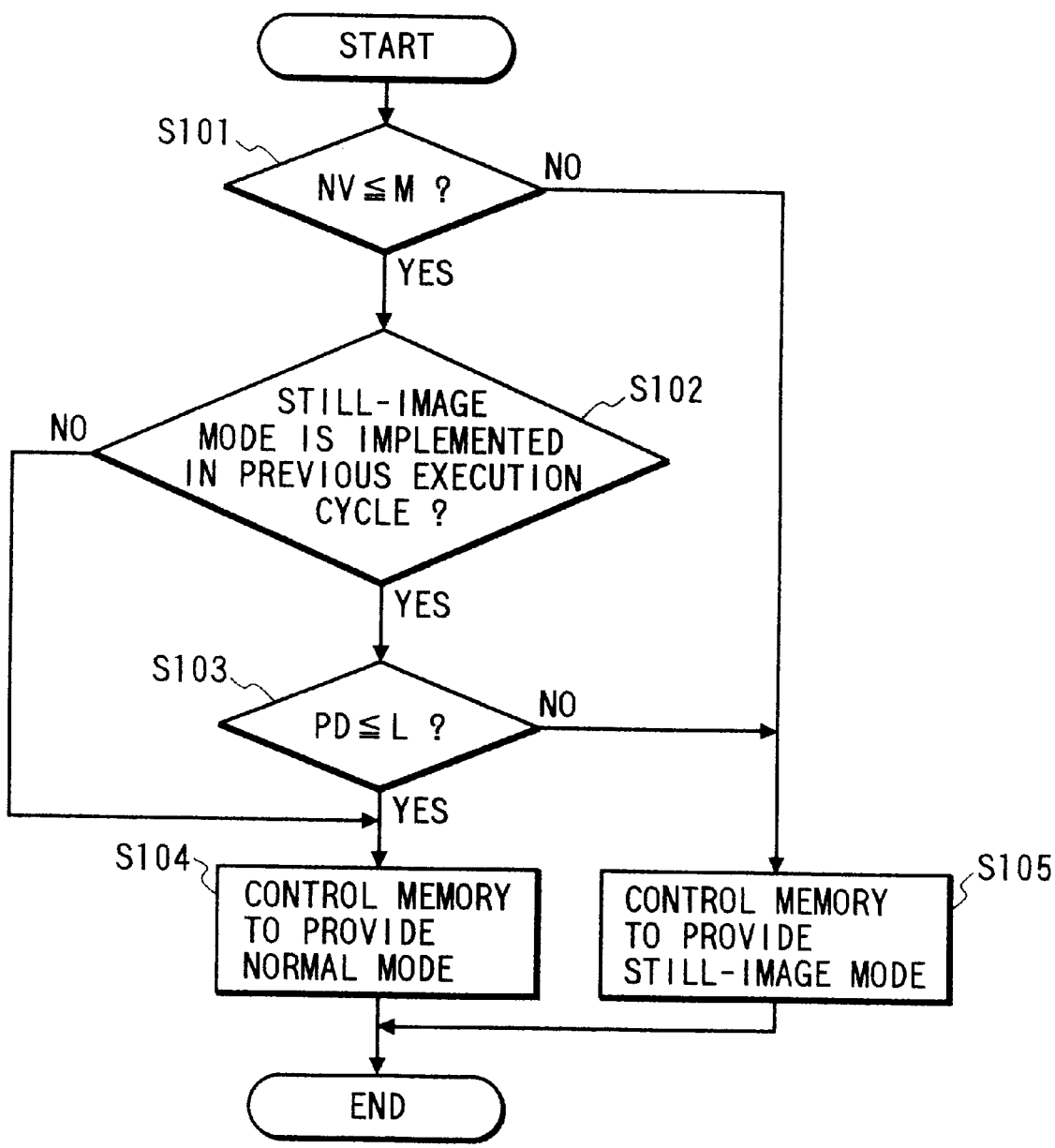
FIG. 14 is a flowchart of a control program for a processing circuit in FIG. 12.

FIG. 14 is a flowchart of a control program for the processing circuit 10C which is executed for every field related to the video signal 4. The processing circuit 10C receives the second vertical sync signal from the signal generator 80. The processing circuit 10C starts the execution of the program in response to the second vertical sync signal.

As shown in FIG. 14, a first step S101 of the program compares the noise indicating value NV represented by the output signal of the image condition detector 8 with the mean value M represented by the output signal of the averaging circuit 9. When the noise indicating value NV is equal to or less than the mean value M, the program advances from the step S101 to a step S102. Otherwise, the program advances from the step S101 to a step S105.

The step S102 decides whether operation of the memory unit 12 is controlled to the still-image mode or the normal mode by the immediately-preceding execution cycle of the program. In the case where operation of the memory unit 12 is controlled to the still-image mode by the immediately-preceding execution cycle of the program, the program advances from the step S102 to a step S103. In the case where operation of the memory unit 12 is controlled to the normal mode by the immediately-preceding execution cycle of the program, the program jumps from the step S102 to a step S104.

The step S103 compares the phase difference PD represented by the output signal of the phase difference detector 81 with a predetermined reference value L. When the phase difference PD is equal to or less than the reference value L, the program advances from the step S103 to the step S104. Otherwise, the program advances from the step S103 to the step S105.

The step S104 controls the memory unit 12 so that the memories 41 and 42 therein will operate in the normal mode. On the other hand, the step S105 controls the memory unit 12 so that the memories 41 and 42 therein will operate in the still-image mode. After the steps S104 and S105, the current execution cycle of the program ends.

The antenna 1 may be replaced by plural antennas. In this case, a diversity unit for antenna selection is provided between the antennas and the TV tuner 3.

Fifth Embodiment

Figure 15:
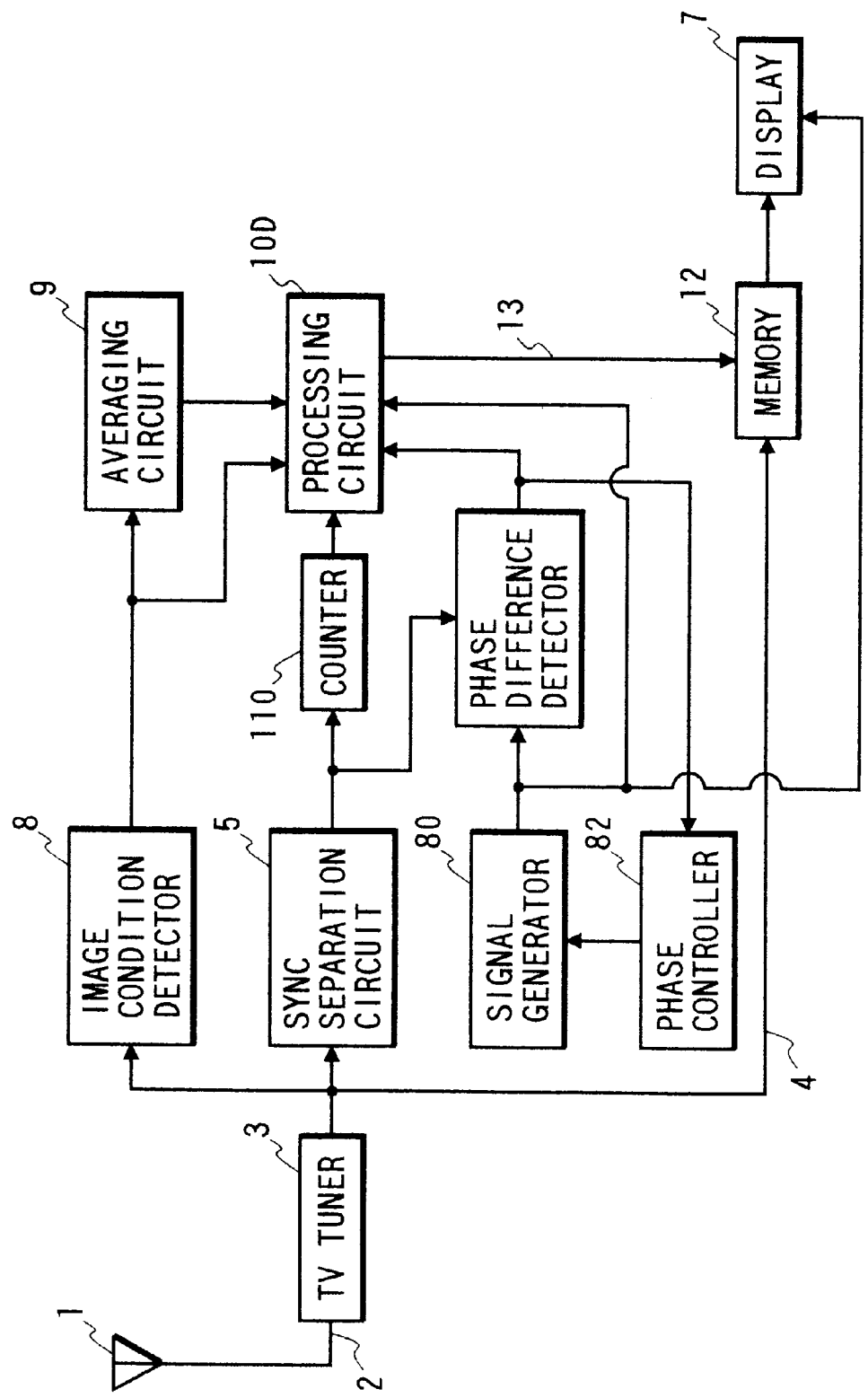
FIG. 15 is a block diagram of a mobile television receiver according to a fifth embodiment of this invention.

FIG. 15 shows a fifth embodiment of this invention which is similar to the embodiment of FIGS. 12–14 except for the following additional arrangement. The embodiment of FIG. 15 includes a processing circuit 10D instead of the processing circuit 10C in FIG. 12. The embodiment of FIG. 15 also includes a counter 110.

The counter 110 receives the horizontal sync signal from the sync separation circuit 5, and counts pulses of the horizontally sync signal during every field related to the video signal 4. The counter 110 feeds the processing circuit 10D with a signal representing the calculated pulse number for every field. The pulse number represented by the output signal of the counter 110 is updated for every field.

When the intensity of delayed wave of the received RF TV signal is comparable with the intensity of direct wave thereof, the counter 110 responds to horizontal sync pulses in the delayed wave as well as horizontal sync pulses in the direct wave. Accordingly, the pulse number represented by the output signal of the counter 110 indicates a condition of the delayed wave. This means that the counter 110 detects a condition of the delayed wave.

Figure 16:
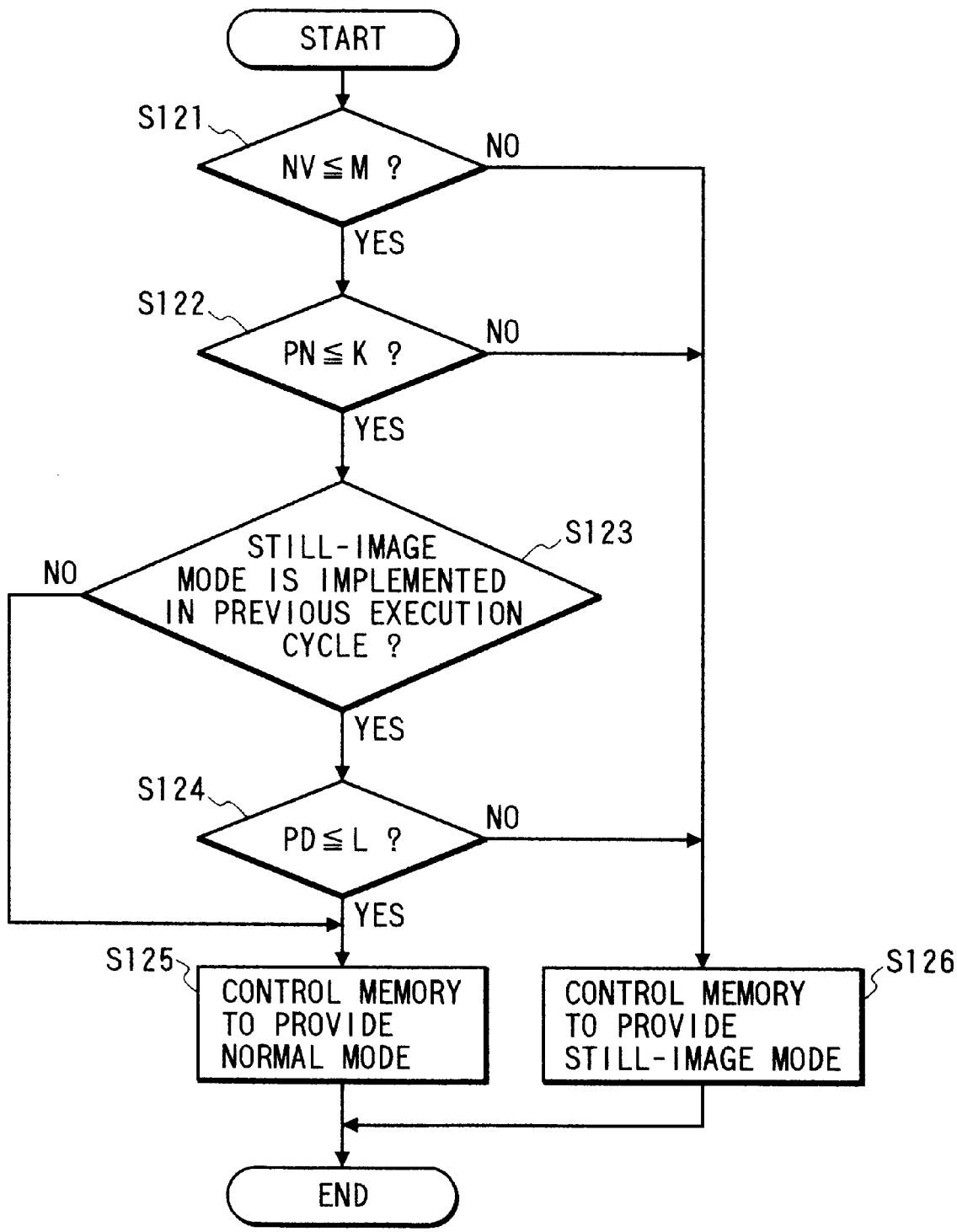
FIG. 16 is a flowchart of a control program for a processing circuit in FIG. 15.

FIG. 16 is a flowchart of a control program for the processing circuit 10D which Is executed for every field related to the video signal 4.

As shown in FIG. 16, a first step S121 of the program compares the noise indicating value NV represented by the output signal of the image condition detector 8 with the mean value M represented by the output signal of the averaging circuit 9. When the noise indicating value NV is equal to or less than the mean value M, the program advances from the step S121 to a step S122. Otherwise, the program advances from the step S121 to a step S126.

The step S122 compares the pulse number PN represented by the output signal of the counter 110 with a predetermined reference number K. When the pulse number PN is equal to or less than the reference number K, the program advances from the step S122 to a step S123. Otherwise, the program advances from the step S122 to the step S126. Preferably, the reference number K is chosen to correspond to a condition where direct wave is present while delayed wave is substantially absent.

The step S123 decides wether operation of the memory unit 12 is controlled to the still-image mode or the normal mode by the immediately-preceding execution cycle of the program. In the case where operation of the memory unit 12 is controlled to the still-image mode by the immediately-preceding execution cycle of the program, the program advances from the step S123 to a step S124. In the case where operation of the memory unit 12 is controlled to the normal mode by the immediately-preceding execution cycle of the program, the program jumps from the step S123 to a step S125.

The step S124 compares the phase difference PD represented by the output signal of the phase difference detector 81 with a predetermined reference value L. When the phase difference PD is equal to or less than the reference value L, the program advances from the step S124 to the step S125. Otherwise, the program advances from the step S124 to the step S126.

The step S125 controls the memory unit 12 so that the memories 41 and 42 therein will operate in the normal mode. On the other hand, the step S126 controls the memory unit 12 so that the memories 41 and 42 therein will operate in the still-image mode. After the steps S125 and S126, the current execution cycle of the program ends.

The antenna 1 may be replaced by plural antennas. In this case, a diversity unit for antenna selection is provided between the antennas and the TV tuner 3.

Sixth Embodiment

Figure 17:
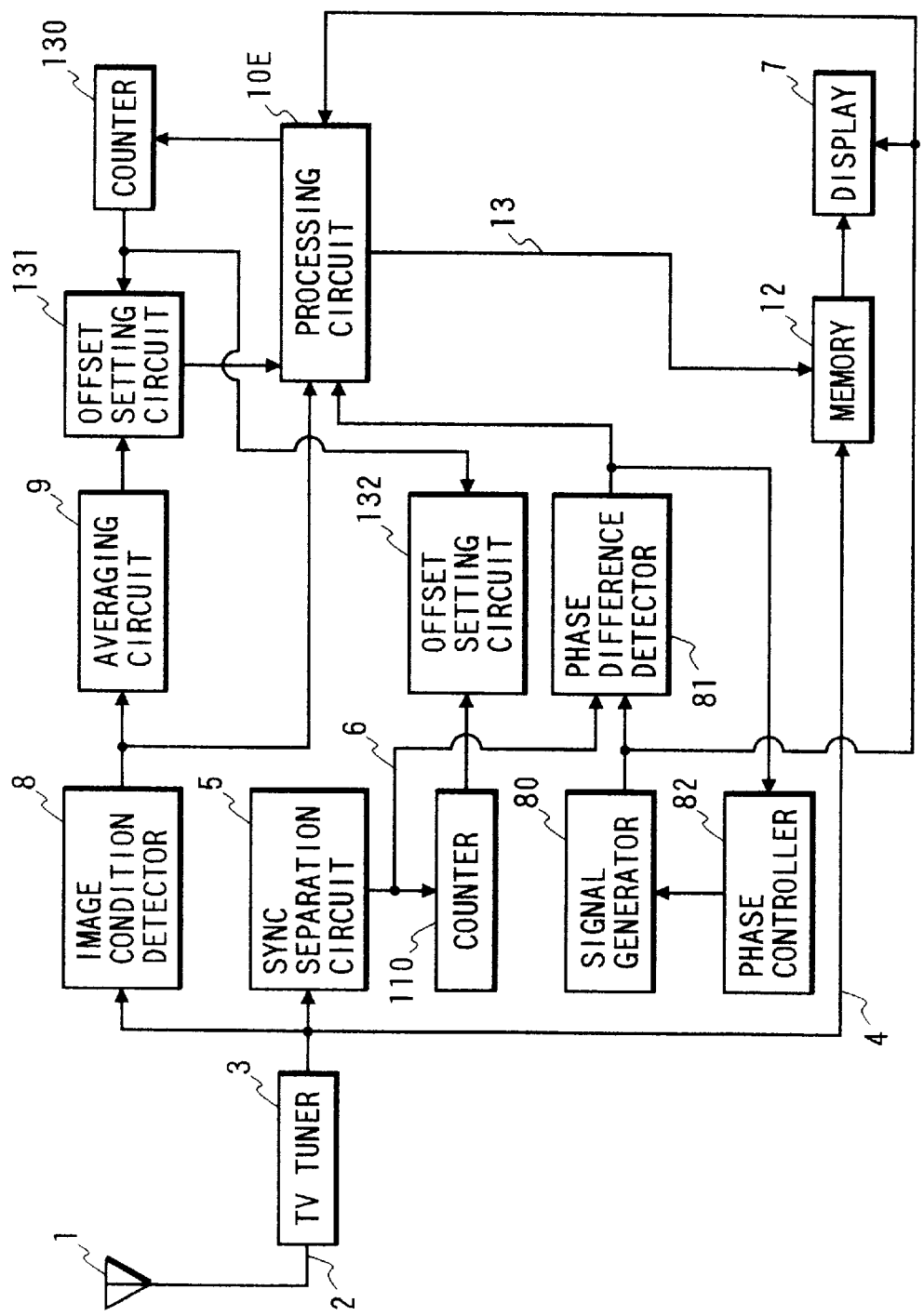
FIG. 17 is a block diagram of a mobile television receiver according to a sixth embodiment of this invention.

FIG. 17 shows a sixth embodiment of this invention which is similar to the embodiment of FIGS. 15 and 16 except for the following additional arrangement. The embodiment of FIG. 17 includes a processing circuit 10E instead of the processing circuit 10D in FIG. 15. The embodiment of FIG. 17 also includes a counter 130 and offset setting circuits 131 and 132.

The counter 130 is controlled by the processing circuit 10E so as to output a signal representing the number of consecutive fields during which operation of the memory unit 12 remains in the still-image mode.

The offset setting circuit 131 includes a signal generator responding to the output signal of the counter 130. The signal generator in the offset setting circuit 131 produces a signal representing an offset value D1 which depends on the field number represented by the output signal of the counter 130. It is preferable that the offset value D1 increases as the field number represented by the output signal of the counter 130 increases. The offset setting circuit 131 also includes an adder which receives the output signal of the averaging circuit 9. The adder in the offset setting circuit 131 adds the offset value D1 to the mean value M represented by the output signal of the averaging circuit 9. Thus, the adder in the offset setting circuit 131 calculates the sum M2 of the offset value D1 and the mean value M. The offset setting circuit 131 feeds the processing circuit 10E with a signal representing the addition result value M2.

The offset setting circuit 132 includes a signal generator responding to the output signal of the counter 130. The signal generator in the offset setting circuit 132 produces a signal representing an offset value D2 which depends on the field number represented by the output signal of the counter 130. It is preferable that the offset value D2 increases as the field number represented by the output signal of the counter 130 increases. The offset setting circuit 132 also includes a subtracter which receives the output signal of the counter 110. The subtracter in the offset setting circuit 132 subtracts the offset value D2 from the pulse number PN represented by the output signal of the counter 110. Thus, the subtracter in the offset setting circuit 132 calculates the value PN2 equal to the pulse number PN minus the offset value D2. The offset setting circuit 132 feeds the processing circuit 10E with a signal representing the subtraction result value PN2.

Figure 18:
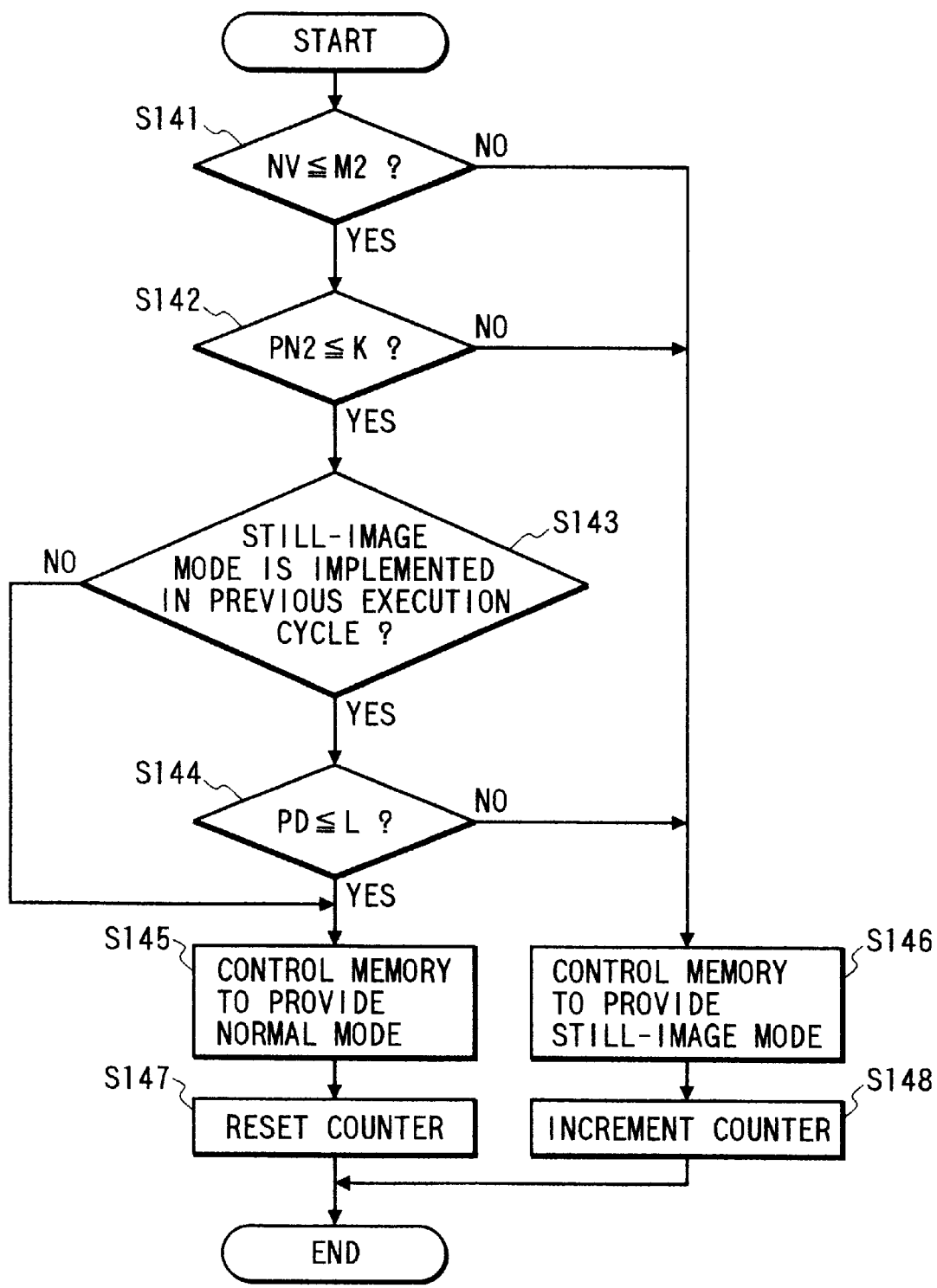
FIG. 18 is a flowchart of a control program for a processing circuit in FIG. 17.

FIG. 18 is a flowchart of a control program for the processing circuit 10E which is executed for every field related to the video signal 4.

As shown in FIG. 18, a first step S141 of the program compares the noise indicating value NV represented by the output signal of the image condition detector 8 with the value M2 represented by the output signal of the offset setting circuit 131. When the noise indicating value NV is equal to or less than the value M2, the program advances from the step S141 to a step S142. Otherwise, the program advances from the step S141 to a step S146.

The step S142 compares the value PN2 represented by the output signal of the offset setting circuit 132 with a predetermined reference number K. When the value PN2 is equal to or less than the reference number K, the program advances from the step S142 to a step S143. Otherwise, the program advances from the step S142 to the step S146. Preferably, the reference number K is chosen to correspond to a condition where direct wave is present while delayed wave is substantially absent.

The step S143 decides wether operation of the memory unit 12 is controlled to the still-image mode or the normal mode by the immediately-preceding execution cycle of the program. In the case where operation of the memory unit 12 is controlled to the still-image mode by the immediately-preceding execution cycle of the program, the program advances from the step S143 to a step S144. In the case where operation of the memory unit 12 is controlled to the normal mode by the immediately-preceding execution cycle of the program, the program jumps from the step S143 to a step S145.

The step S144 compares the phase difference PD represented by the output signal of the phase difference detector 81 with a predetermined reference value L. When the phase difference PD is equal to or less than the reference value L, the program advances from the step S144 to the step S145. Otherwise, the program advances from the step S144 to the step S146.

The step S145 controls the memory unit 12 so that the memories 41 and 42 therein will operate in the normal mode. On the other hand, the step S146 controls the memory unit 12 so that the memories 41 and 42 therein will operate in the still-image mode.

A step S147 following the step S145 resets the counter 130 to "0". A step S148 following the step S146 increments the counter 130 by "1". After the steps S147 and S148, the current execution cycle of the program ends.

The antenna 1 may be replaced by plural antennas. In this case, a diversity unit for antenna selection is provided between the antennas and the TV tuner 3.

It should be noted that the offset values D1 and D2 may be adjusted in accordance with user's instructions. Furthermore, the relation between the offset value D1 and the field number represented by the output signal of the counter 130 may be changed in accordance with user's instructions. Also, the relation between the offset value D2 and the field number represented by the output signal of the counter 130 may be changed in accordance with user's instructions.

Seventh Embodiment

Figure 19:
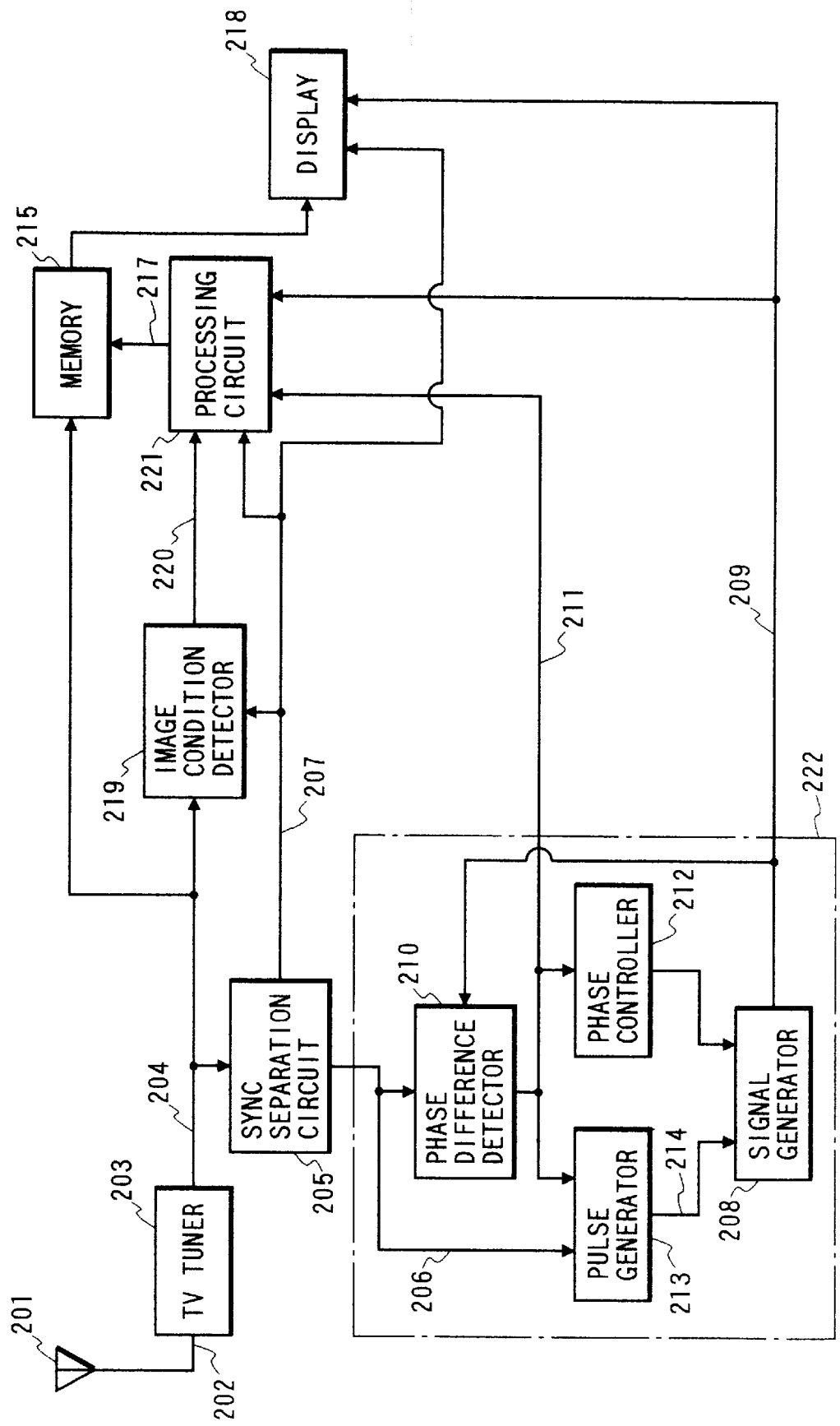
FIG. 19 is a block diagram of a mobile television receiver according to a seventh embodiment of this invention.

With reference to FIG. 19, an antenna 201 catches RF signals 202 including RF TV signals of different channels. The caught RF signals 202 are fed from the antenna 201 to a TV tuner 203. The TV tuner 203 selects an RF TV signal of a designated channel from among the RF signals fed from the antenna 201. The TV tuner 203 converts the selected RF TV signal into an IF television signal. The TV tuner 203 demodulates the IF television signal into a baseband video signal 204.

The video signal 204 is outputted from the TV tuner 203 to a sync separation circuit 205. The sync separation circuit 205 separates a horizontal sync signal 206 and a vertical sync signal 207 from the video signal 204. The sync separation circuit 205 outputs the vertical sync signal 207 to a display 218, an image condition detector 219, and a processing circuit 221. The sync separation circuit 205 outputs the horizontal sync signal 206 to a horizontal sync stabilizer 222.

The horizontal sync stabilizer 222 includes a signal generator 208, a phase difference detector 210, a phase controller 212, and a pulse generator 213. The phase difference detector 210 receives the horizontal sync signal 206 from the sync separation circuit 205. The signal generator 208, the phase difference detector 210, and the phase controller 212 are connected to form a PLL circuit which generates a horizontal sync signal 209 locked in phase and frequency to the horizontal sync signal 206 fed from the sync separation circuit 205. The horizontal sync signal 209 generated by the PLL circuit appears at the output terminal of the signal generator 208. The horizontal sync signal 209 is transmitted from the signal generator 208 to the display 218 and the processing circuit 221.

The phase difference detector 210 detects the difference between the phase of the horizontal sync signal 206 outputted from the sync separation circuit 205 and the phase of the horizontal sync signal 209 outputted from the signal generator 208. The phase difference detector 210 feeds a signal 211 representative of the detected phase difference to the phase controller 212, the pulse generator 213, and the processing circuit 221.

The phase controller 212 generates a phase control signal in response to the phase difference signal 211. The phase controller 212 outputs the phase control signal to the signal generator 208. The signal generator 208 produces the horizontal sync signal 209 whose phase is controlled in response to the phase control signal fed from the phase controller 212. The phase controller 212 is designed so that the horizontal sync signal 209 can be locked in phase and frequency to the horizontal sync signal 206. Preferably, the variable range of the phase of the horizontal sync signal 209 is limited to a predetermined range within a 1-field period of time.

The signal generator 208 includes an oscillator having a quartz resonator tuned to an integral multiple of the horizontal sync frequency of the video signal 204. The signal generator 208 includes a frequency divider converting the output signal of the oscillator into the horizontal sync signal 209. The frequency divider has a function of adjusting the phase of the horizontal sync signal 209 in response to the output signal of the phase controller 212. In the case where the video signal 204 is of the NTSC system, the oscillation frequency of the oscillator is equal to, for example, four times the color subcarrier frequency of the video signal 204, and the frequency division factor used by the frequency divider is equal to, for example, 910.

In a first modification, during every field, count is given of pulses of the horizontal sync signal 209 which advance from corresponding pulses of the horizontal sync signal 206, and pulses of the horizontal sync signal 209 which retard from corresponding pulses of the horizontal sync signal 206. The phase of the horizontal sync signal 209 is adjusted in a direction of correcting a phase error (a phase difference) corresponding to the greater of the counted advance pulse number and the counted retard pulse number.

In a second modification, only when the image condition detector 219 detects that an image represented by the video signal 204 is in a good condition, the phase controller is allowed to control the phase of the horizontal sync signal 209 in response to the output signal 211 of the phase difference detector 210.

The pulse generator 213 receives the horizontal sync signal 206 from the sync separation circuit 205. The pulse generator 213 receives the phase difference signal 211 from the phase difference detector 210. The pulse generator 213 includes a comparator which detects whether or not the phase difference between the horizontal sync signals 206 and 209 is in a given range. The pulse generator 213 includes a deciding section which determines whether or not the phase difference remains outside the given range during at least a given number of successive fields. The pulse generator 213 includes a gate which allows the horizontal sync signal 206 to be fed to the signal generator 208 as a reset pulse signal 214 only in the case where the phase difference remains outside the given range during at least the given number of successive fields. The frequency divider in the signal generator 208 is reset by the reset pulse signal 214 so that the phase of the horizontal sync signal 209 will be equalized to the phase of the horizontal sync signal 206.

In a modification, count is given of pulses of the horizontal sync signal 206 when the phase difference remains in the given range. Only in the case where the counted pulse number is smaller than a given number during at least the given number of successive fields, the pulse generator 213 outputs the reset pulse signal 214 to the signal generator 208.

The video signal 204 is fed from the TV tuner 203 to the image condition detector 219. The image condition detector 219 serves to estimate a quality (a condition) of an image represented by the video signal 204 for every field related to the video signal 204. Specifically, the image condition detector 219 serves to detect delayed wave components of the video signal 204 for every field.

Figure 20:
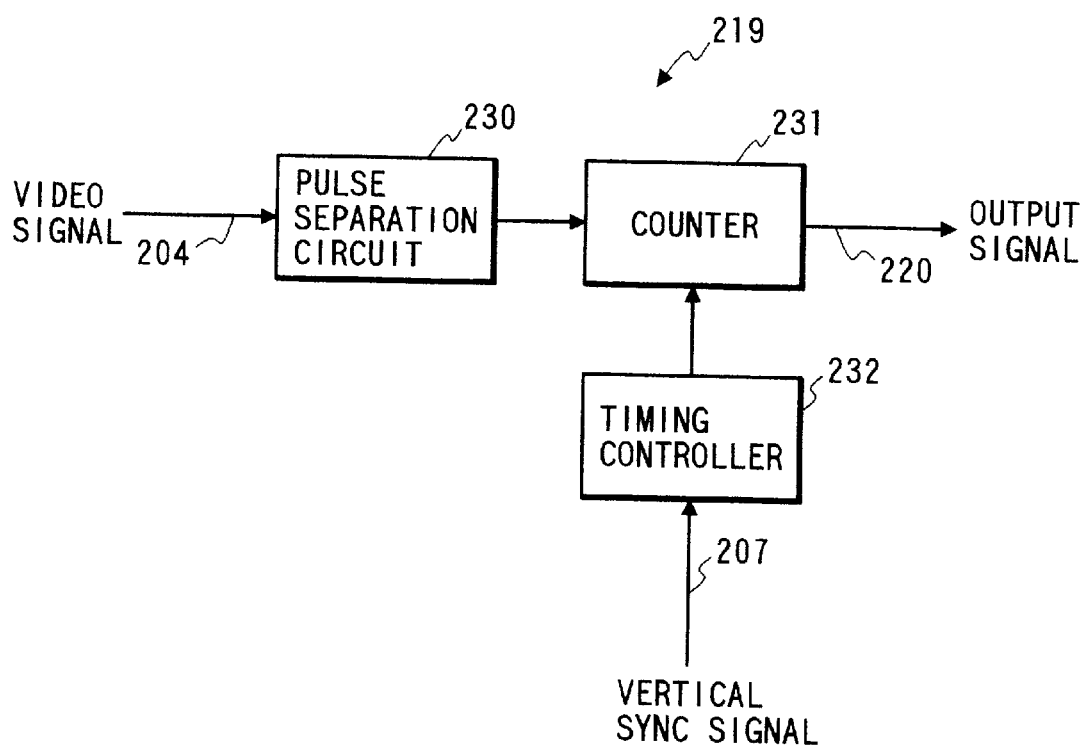
FIG. 20 is a block diagram of an image condition detector in FIG. 19.

As shown in FIG. 20, the image condition detector 219 includes a pulse separation circuit 230, a counter 231, and a timing controller 232. The pulse separation circuit 230 receives the video signal 204, and separates horizontal sync pulses from the video signal 204. The counter 231 receives the horizontal sync pulses from the pulse separation circuit 230. The timing controller 232 receives the vertical sync signal 207 from the sync separation circuit 205 (see FIG. 19). The timing controller 232 periodically generates a count enabling signal in response to the vertical sync signal 207 The timing controller 232 outputs the count enabling signal to the counter 231. The counter 231 counts the horizontal sync pulses during a predetermined period of time within every field in response to the count enabling signal fed from the timing controller 232. The counter 231 outputs a signal 220 representing the counted pulse number as an output signal of the image condition detector 219.

When the intensity of delayed wave of the received RF TV signal is comparable with the intensity of direct wave thereof, the counter 231 responds to horizontal sync pulses in the delayed wave as well as horizontal sync pulses in the direct wave. Accordingly, the counted pulse number represented by the output signal 220 of the counter 231 indicates a condition of the delayed wave. This means that the image condition detector 219 detects a condition of the delayed wave.

With reference back to FIG. 19, the output signal 220 of the image condition detector 219 is applied to the processing circuit 221. The processing circuit 221 includes a programmable device such as a microcomputer, a CPU, or a digital signal processor (DSP). The processing circuit 221 is programmed to generate a memory control signal 217 in response to the output signal 220 of the image condition detector 219, the output signal 211 of the phase difference detector 210, the vertical sync signal 207, and the horizontal sync signal 209. The processing circuit 221 includes a combination of an I/O port, a processing section, a RAM, and a ROM. The processing circuit 221 operates in accordance with a program stored in the ROM. The processing circuit 221 outputs the memory control signal 217 to a memory unit 215.

The video signal 204 is fed from the TV tuner 203 to the memory unit 215. The memory unit 215 temporarily stores the video signal 204, and outputs the stored video signal to the display 218.

Figure 21:
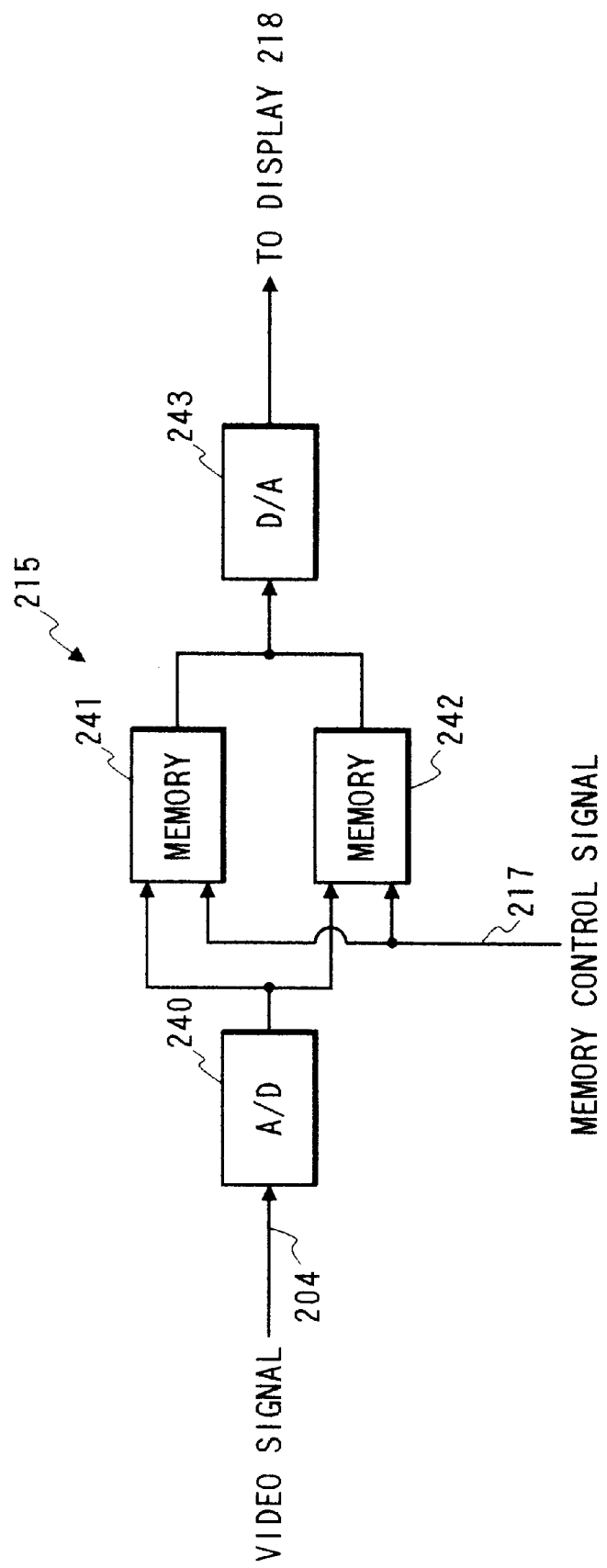
FIG. 21 is a block diagram of a memory unit in FIG. 19.

As shown in FIG. 21, the memory unit 215 includes an A/D converter 240, memories 241 and 242, and a D/A converter 243. The A/D converter 240 changes the video signal 204 into a corresponding digital video signal. The A/D converter 240 outputs the digital video signal to the memories 241 and 242. The memory control signal 217 is fed to the memories 241 and 242 from the processing circuit 221 (see FIG. 19). Operation of the memories 241 and 242 is changed between a normal mode and a still-image mode in response to the memory control signal 217. During the normal mode of operation, the digital video signal is alternately written into the memories 241 and 242 while the digital video signal is alternately read out from the memories 241 and 242. In this case, one of the memories 241 and 242 undergoes a signal writing process while the other memory undergoes a signal reading process. For example, the digital video signal representing every even-numbered field is assigned to the memory 241, and the digital video signal representing every odd-numbered field is assigned to the memory 242. During the normal mode of operation, an image represented by the digital video signal read out from the memories 241 and 242 can change frame by frame (or field by field). During the still-image mode of operation, the updating of the digital video signal in the memories 241 and 242 remains inhibited while the previously-written digital video signal is alternately and periodically read out from the memories 241 and 242. In other words, during the still-image mode of operation, writing the digital video signal into the memories 241 and 242 remains suspended while the previously-written digital video signal is alternately and periodically read out from the memories 241 and 242. In this case, the digital video signal read out from the memories 241 and 242 continues to represent a still image. During the normal mode of operation and also the still-image mode of operation, the digital video signal read out from the memories 241 and 242 is applied to the D/A converter 243. The D/A converter 243 returns the digital video signal to the original analog video signal. The D/A converter 243 outputs the analog video signal to the display 218 (see FIG. 19).

With reference back to FIG. 19, the display 218 visualizes the video signal outputted from the memory unit 215 on its screen in response to the vertical sync signal 207 and the horizontal sync signal 209 fed from the sync separation circuit 205 and the signal generator 208 respectively.

Figure 22:
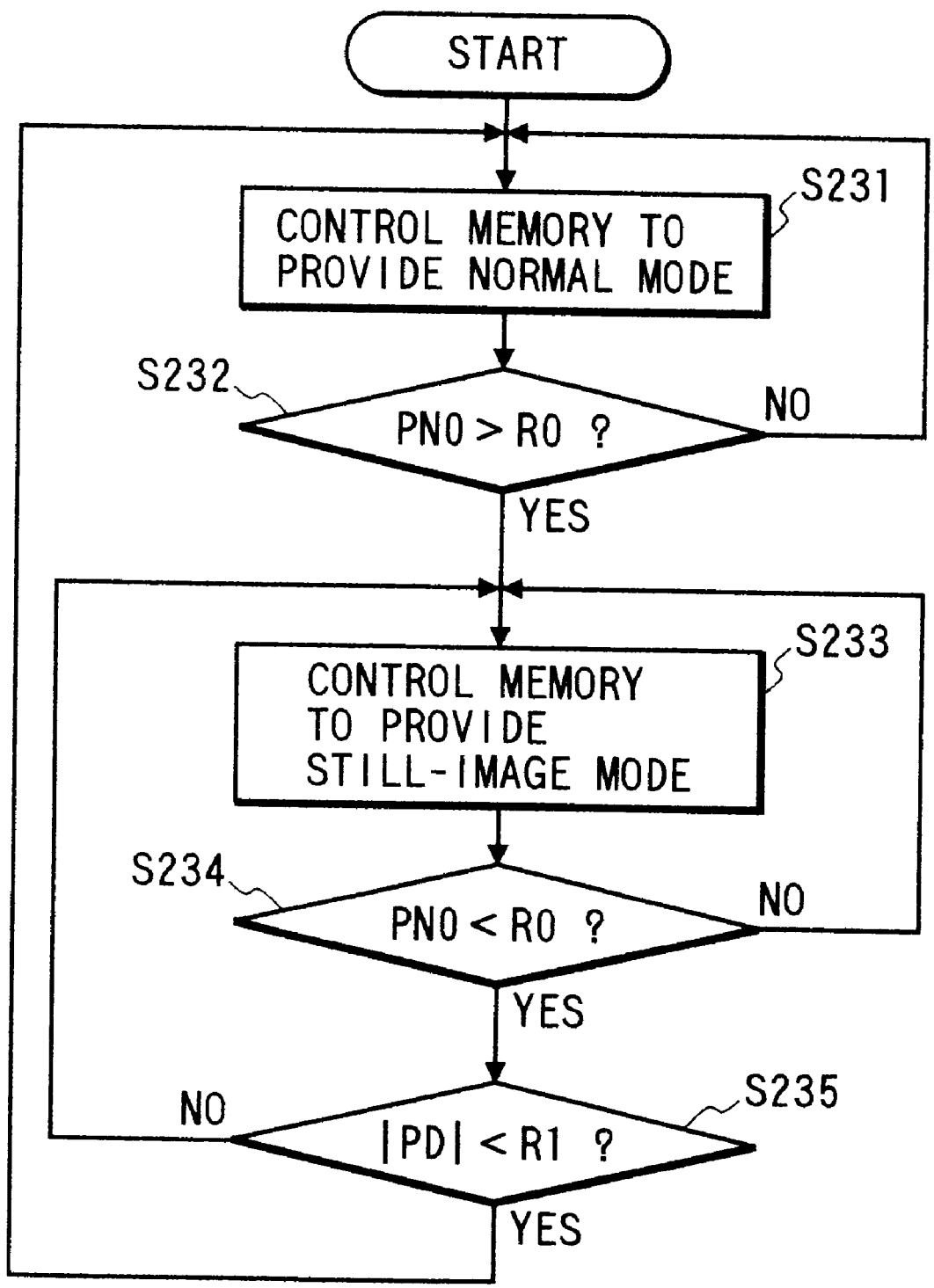
FIG. 22 is a flowchart of a control program for a processing circuit in FIG. 19.

As previously explained, the processing circuit 221 operates in accordance with a control program stored in its internal ROM. FIG. 22 is a flowchart of the program.

As shown in FIG. 22, a first step S231 of the program controls the memory unit 215 so that the memories 241 and 242 therein will operate in the normal mode.

A step S232 following the step S231 compares the counted pulse number PN0 represented by the output signal 220 of the image condition detector 219 with a predetermined reference number R0. When the counted pulse number PN0 is greater than the predetermined reference number R0, the program advances from the step S232 to a step S233. Otherwise, the program returns from the step S232 to the step S231.

The step S233 controls the memory unit 215 so that the memories 241 and 242 therein will operate in the still-image mode.

A step S234 following the step S233 compares the counted pulse number PN0 represented by the output signal 220 of the image condition detector 219 with the predetermined reference number R0. When the counted pulse number PN0 is smaller than the predetermined reference number R0, the program advances from the step S234 to a step S235. Otherwise, the program returns from the step S234 to the step S233.

The step S235 compares the absolute value of the phase difference PD1 represented by the output signal 211 of the phase difference detector 210 with a predetermined reference value R1. When the absolute value of the phase difference PD1 is smaller than the predetermined reference value R1, the program returns from the step S235 to the step S231. Otherwise, the program returns from the step S235 to the step S233.

The processing circuit 221 responds to the vertical sync signal 207 so that one of the steps S231 and S233 in FIG. 22 will be executed once during every field.

In a modification, during every field, count is given of pulses of the horizontal sync signal 209 which have a given phase error or less from corresponding pulses of the horizontal sync signal 206. In the case where the counted pulse number exceeds a given number, operation of the memory unit 215 is changed from the still-image mode to the normal mode. In the case where the counted pulse number is smaller than the given number, the memory unit 215 is held in the still-image mode of operation.

The antenna 201 may be replaced by plural antennas. In this case, a diversity unit for antenna selection is provided between the antennas and the TV tuner 203.

Eighth Embodiment

Figure 23:
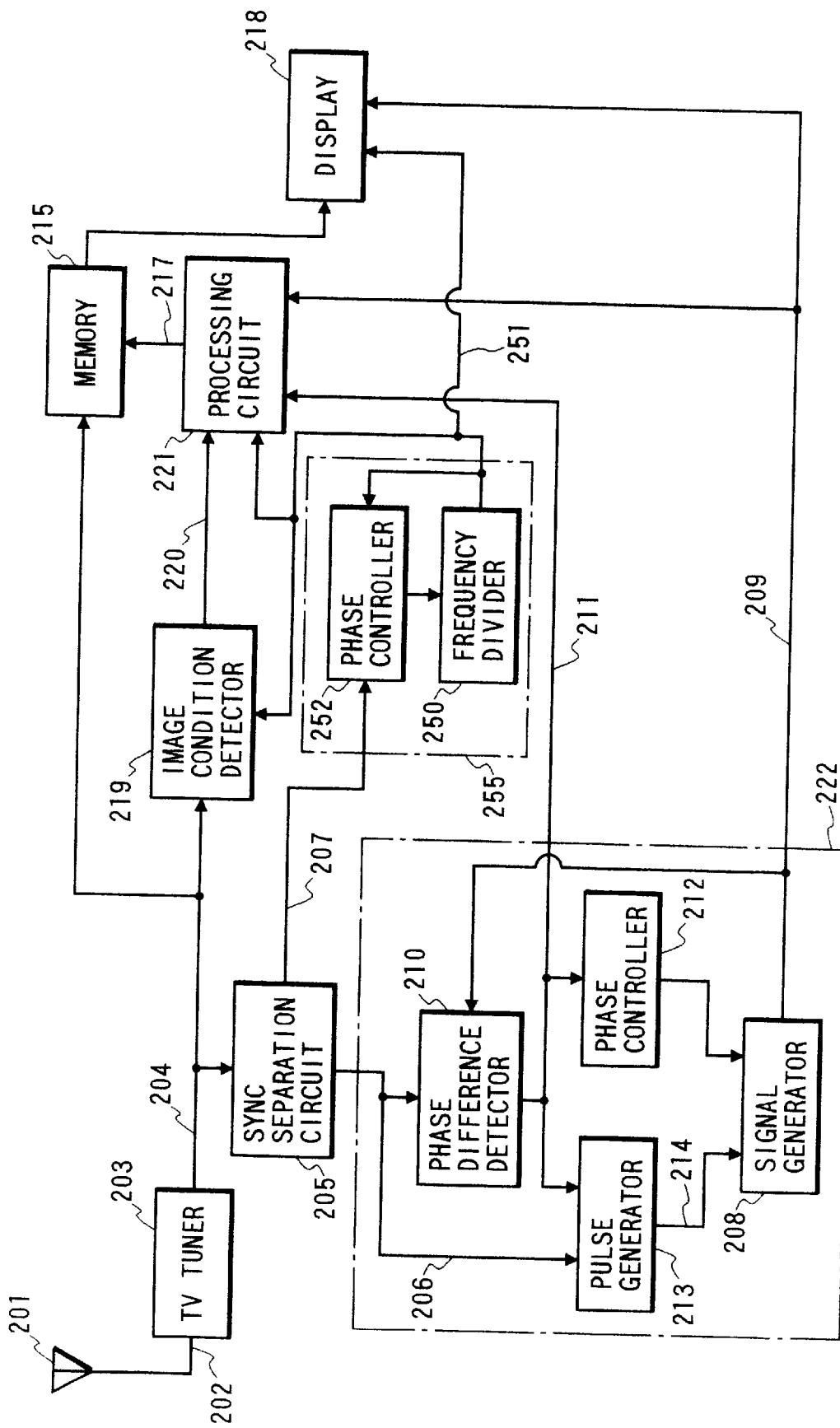
FIG. 23 is a block diagram of a mobile television receiver according to an eighth embodiment of this invention.

FIG. 23 shows an eighth embodiment of this invention which is similar to the embodiment of FIGS. 19–22 except for the following additional arrangement. The embodiment of FIG. 23 includes a vertical sync stabilizer 255.

The vertical sync stabilizer 255 has a frequency divider 250 and a phase controller 252. The frequency divider 250 receives the horizontal sync signal 209 from the signal generator 208, and divides the frequency of the horizontal sync signal 209 to generate a vertical sync signal 251. The phase controller 252 receives the vertical sync signal 207 from the sync separation circuit 205. The phase controller 252 receives the vertical sync signal 251 from the frequency divider 250. The frequency divider 250 and the phase controller 252 are connected and designed to form a PLL circuit which locks the vertical sync signal 251 in phase and frequency to the vertical sync signal 207. The vertical sync stabilizer 255 outputs the vertical sync signal 251 to the display 218, the image condition detector 219, and the processing circuit 221.

Specifically, the phase controller 252 has a first section which detects a phase difference (a phase error) between the vertical sync signals 207 and 251. The phase controller 252 has a second section which decides whether or not the detected phase difference remains out of a given range during at least a predetermined number of successive fields. The phase controller 252 has a third section which outputs the vertical sync signal 207 to the frequency divider 250 as a reset pulse signal in the case where the detected phase difference remains out of the given range during at least the predetermined number of successive fields.

Ninth Embodiment

Figure 24:
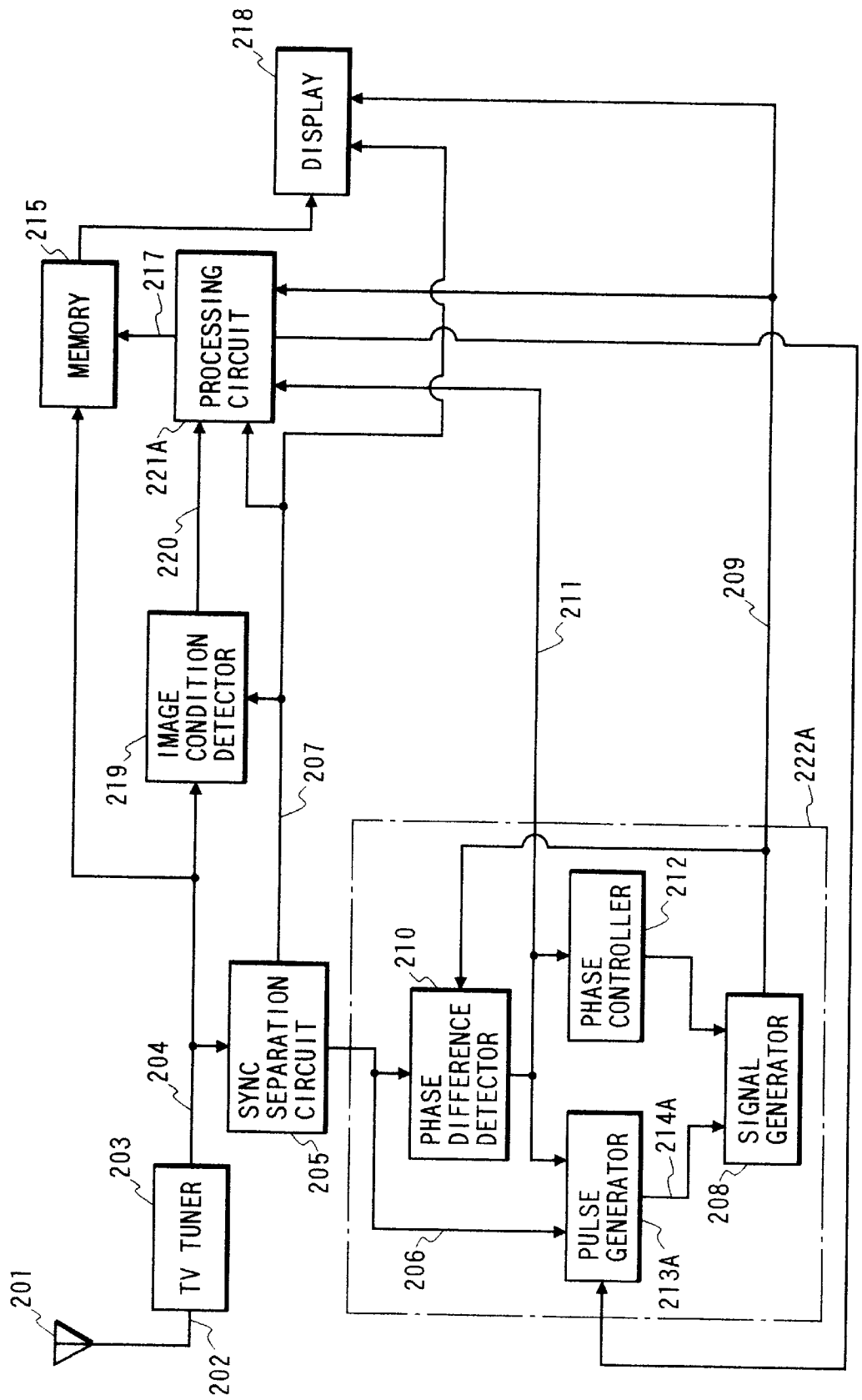
FIG. 24 is a block diagram of a mobile television receiver according to a ninth embodiment of this invention.

FIG. 24 shows a ninth embodiment of this invention which is similar to the embodiment of FIGS. 19–22 except for the following additional arrangement. The embodiment of FIG. 24 includes a processing circuit 221A and a horizontal sync stabilizer 222A instead of the processing circuit 221 and the horizontal sync stabilizer 222 in FIG. 19 respectively. The horizontal sync stabilizer 222A includes a pulse generator 213A instead of the pulse generator 213 in FIG. 19.

The processing circuit 221A is connected to the pulse generator 213A. The processing circuit 221A is programmed to control the pulse generator 213A.

The pulse generator 213A receives the horizontal sync signal 206 from the sync separation circuit 205. The pulse generator 213A receives the phase difference signal 211 from the phase difference detector 210. The pulse generator 213A includes a comparator which detects whether or not the phase difference between the horizontal sync signals 206 and 209 is in a given range. The pulse generator 213A includes a deciding section which determines whether or not the phase difference remains outside the given range during at least a given number of successive fields. The pulse generator 213A includes a gate which allows the horizontal sync signal 206 to be fed to the signal generator 208 for a given time as a reset pulse signal 214A in the case where the phase difference remains outside the given range during at least the given number of successive fields. Also, the gate in the pulse generator 213A allows the horizontal sync signal 206 to be fed to the signal generator 208 for the given time as the reset pulse signal 214A in the case where an H-level control signal is fed from the processing circuit 221A. The frequency divider in the signal generator 208 is reset by the reset pulse signal 214A so that the phase of the horizontal sync signal 209 will be equalized to the phase of the horizontal sync signal 206.

Figure 25:
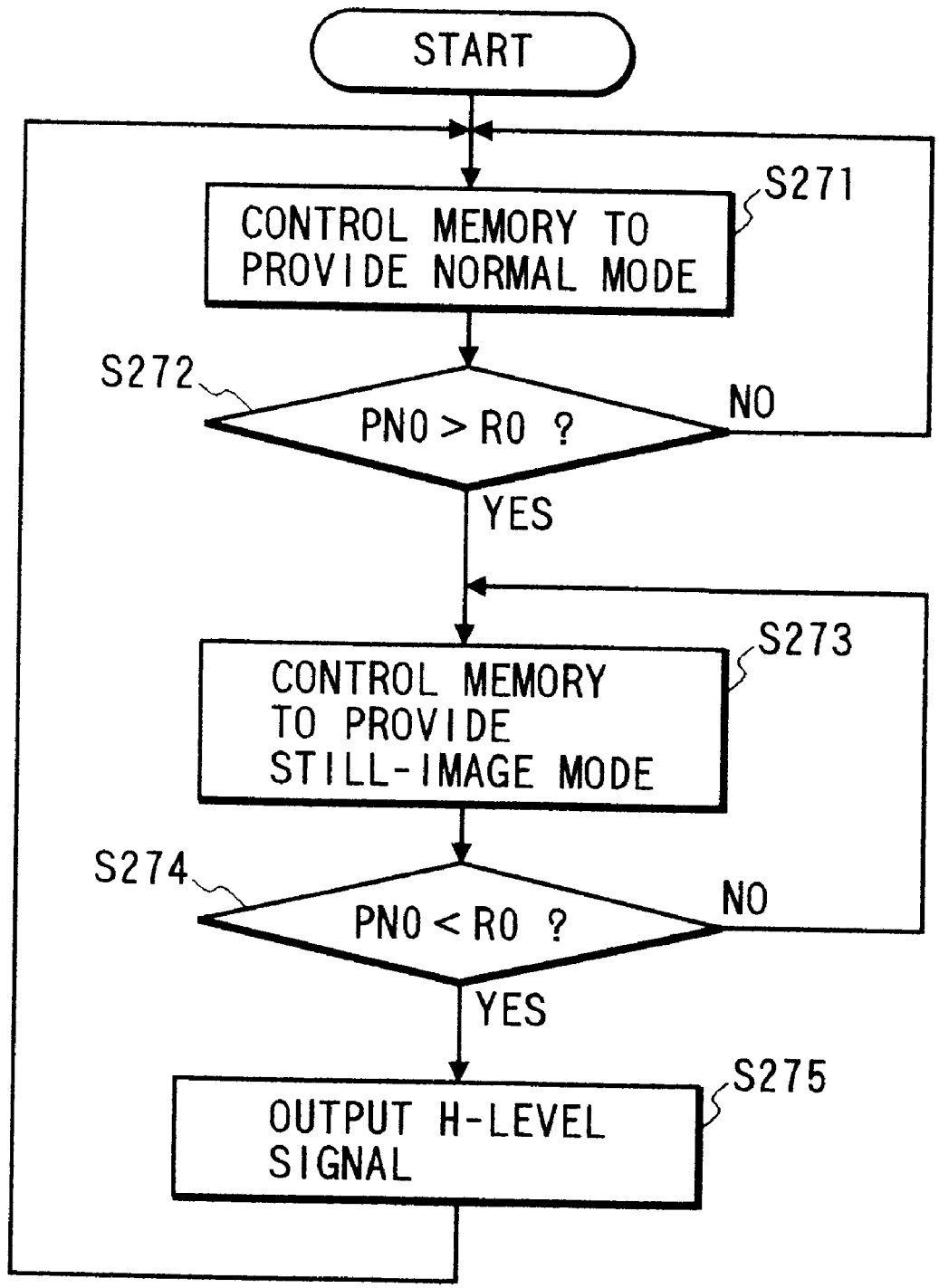
FIG. 25 is a flowchart of a control program for a processing circuit in FIG. 24.

FIG. 25 is a flowchart of a control program for the processing circuit 221A. As shown in FIG. 25, a first step S271 of the program controls the memory unit 215 so that the memories 241 and 242 therein will operate in the normal mode.

A step S272 following the step S271 compares the counted pulse number PN0 represented by the output signal 220 of the image condition detector 219 with a predetermined reference number R0. When the counted pulse number PN0 is greater than the predetermined reference number R0, the program advances from the step S272 to a step S273. Otherwise, the program returns from the step S272 to the step S271.

The step S273 controls the memory unit 215 so that the memories 241 and 242 therein will operate in the still-image mode.

A step S274 following the step S273 compares the counted pulse number PN0 represented by the output signal 220 of the image condition detector 219 with the predetermined reference number R0. When the counted pulse number PN0 is smaller than the predetermined reference number R0, the program advances from the step S274 to a step S275. Otherwise, the program returns from the step S274 to the step S273.

The step S275 changes the control signal, fed to the pulse generator 213A, from an L level to an H level. In response to the H-level control signal fed from the processing circuit 221A, the pulse generator 213A controls the signal generator 208 and thereby equalizes the phase of the horizontal sync signal 209 to the phase of the horizontal sync signal 206. Then, the step S275 returns the control signal, fed to the pulse generator 213A, from the H level to the L level. After the step S275, the program returns to the step S271.

As understood from the previous explanation, the step S275 equalizes the phase of the horizontal sync signal 209 to the phase of the horizontal sync signal 206 before operation of the memory unit 215 is changed from the still-image mode to the normal mode.

Tenth Embodiment

Figure 26:
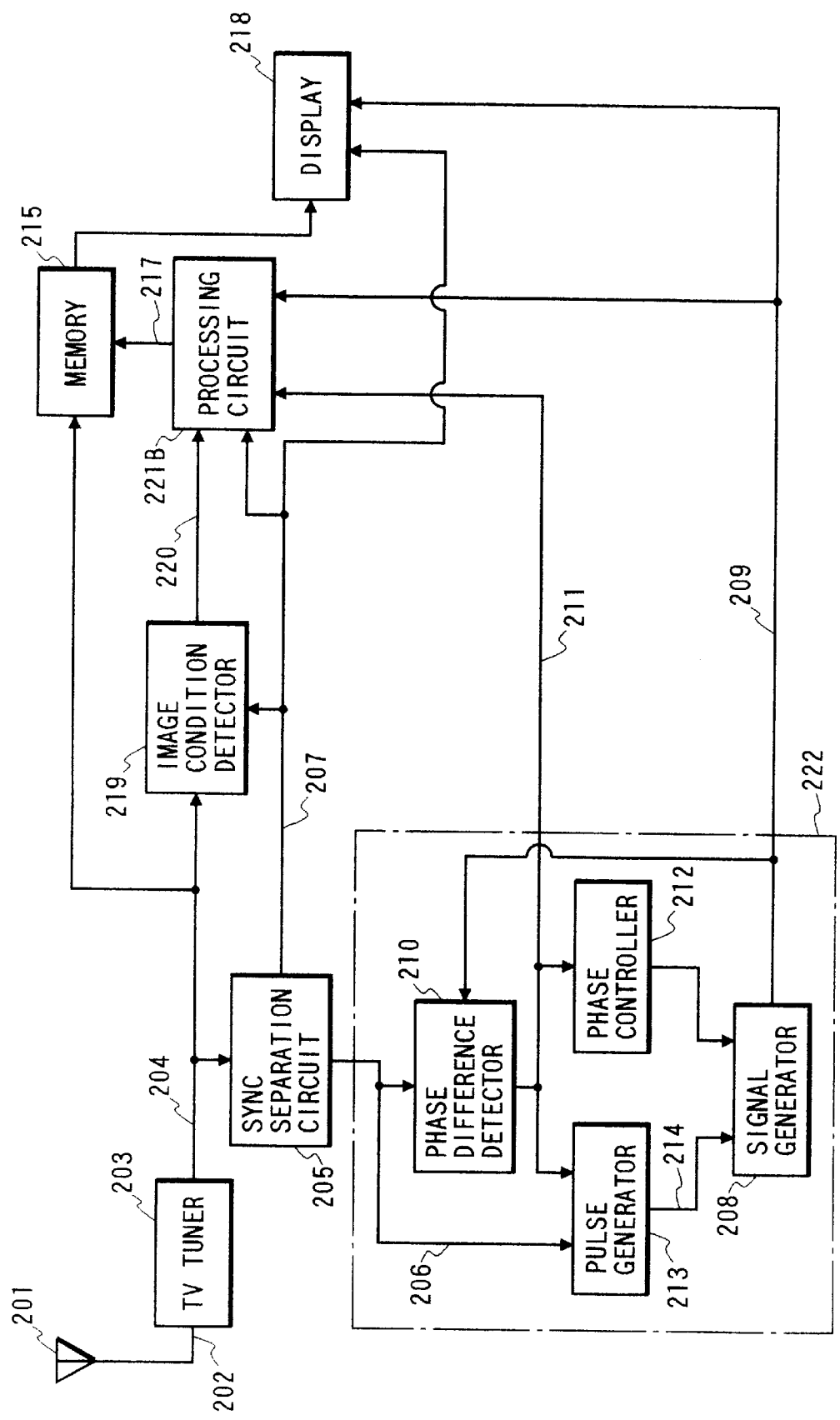
FIG. 26 is a block diagram of a mobile television receiver according to a tenth embodiment of this invention.

FIG. 26 shows a tenth embodiment of this invention which is similar to the embodiment of FIGS. 19–22 except for the following design change. The embodiment of FIG. 26 includes a processing circuit 221B instead of the processing circuit 221 in FIG. 19.

Figure 27:
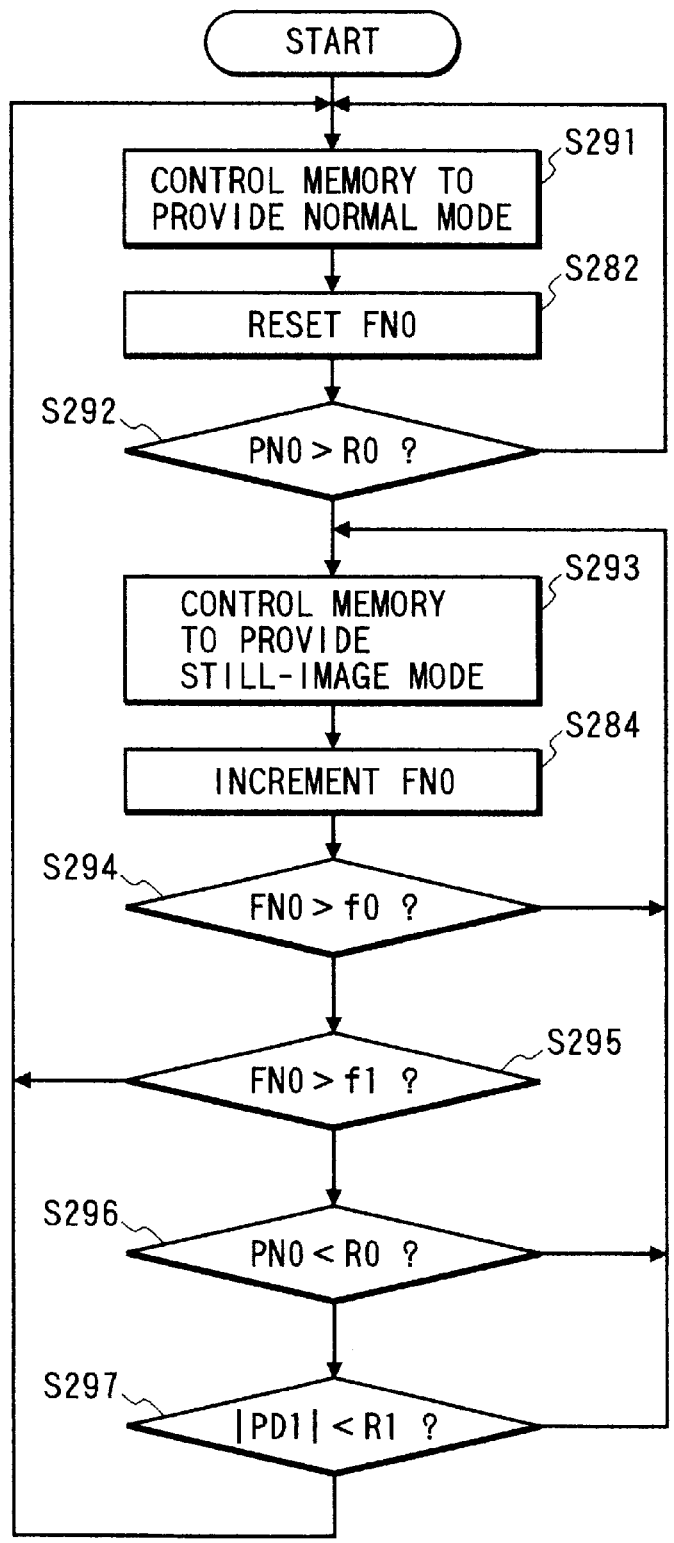
FIG. 27 is a flowchart of a control program for a processing circuit in FIG. 26.

FIG. 27 is a flowchart of a control program for the processing circuit 221A. As shown in FIG. 27, a first step S291 of the program controls the memory unit 215 so that the memories 241 and 242 therein will operate in the normal mode.

A step S282 following the step S291 resets a field number FN0 to "0". After the step S282, the program advances to a step S292.

The step S292 compares the counted pulse number PN0 represented by the output signal 220 of the image condition detector 219 with a predetermined reference number R0. When the counted pulse number PN0 is greater than the predetermined reference number R0, the program advances from the step S292 to a step S293. Otherwise, the program returns from the step S292 to the step S291.

The step S293 controls the memory unit 215 so that the memories 241 and 242 therein will operate in the still-image mode.

A step S284 following the step S293 increments the field number FN0 by "1" according to a statement as "FN=FN0+1". The field number FN0 indicates the number of successive fields during which the memory unit 215 continues to operate in the still-image mode.

A step S294 subsequent to the step S284 compares the field number FN0 with a predetermined lower limit value f0. When the field number FN0 is greater than the predetermined lower limit value f0, the program advances from the step S294 to a step S295. Otherwise, the program returns from the step S294 to the step S293.

The step S295 compares the field number FN0 with a predetermined upper limit value f1 greater than the predetermined lower limit value f0. When the field number FN0 is greater than the predetermined upper limit value f1, the program returns from the step S295 to the step S291. Otherwise, the program advances from the step S295 to a step S296.

The step S296 compares the counted pulse number PN0 represented by the output signal 220 of the image condition detector 219 with the predetermined reference number R0. When the counted pulse number PN0 is smaller than the predetermined reference number R0, the program advances from the step S296 to a step S297. Otherwise, the program returns from the step S296 to the step S293.

The step S297 compares the absolute value of the phase difference PD1 represented by the output signal 211 of the phase difference detector 210 with a predetermined reference value R1. When the absolute value of the phase difference PD1 is smaller than the predetermined reference value R1, the program returns from the step S297 to the step S291. Otherwise, the program returns from the step S297 to the step S293.

The processing circuit 221B responds to the vertical sync signal 207 so that one of the steps S282 and S284 in FIG. 27 will be executed once during every field.

The steps S294 and S295 in FIG. 27 serve to limit the number of successive fields during which the memory unit 215 continues to operate in the still-image mode.

It should be noted that one of the steps S294 and S295 may be omitted from the program in FIG. 27.

Eleventh Embodiment

Figure 28:
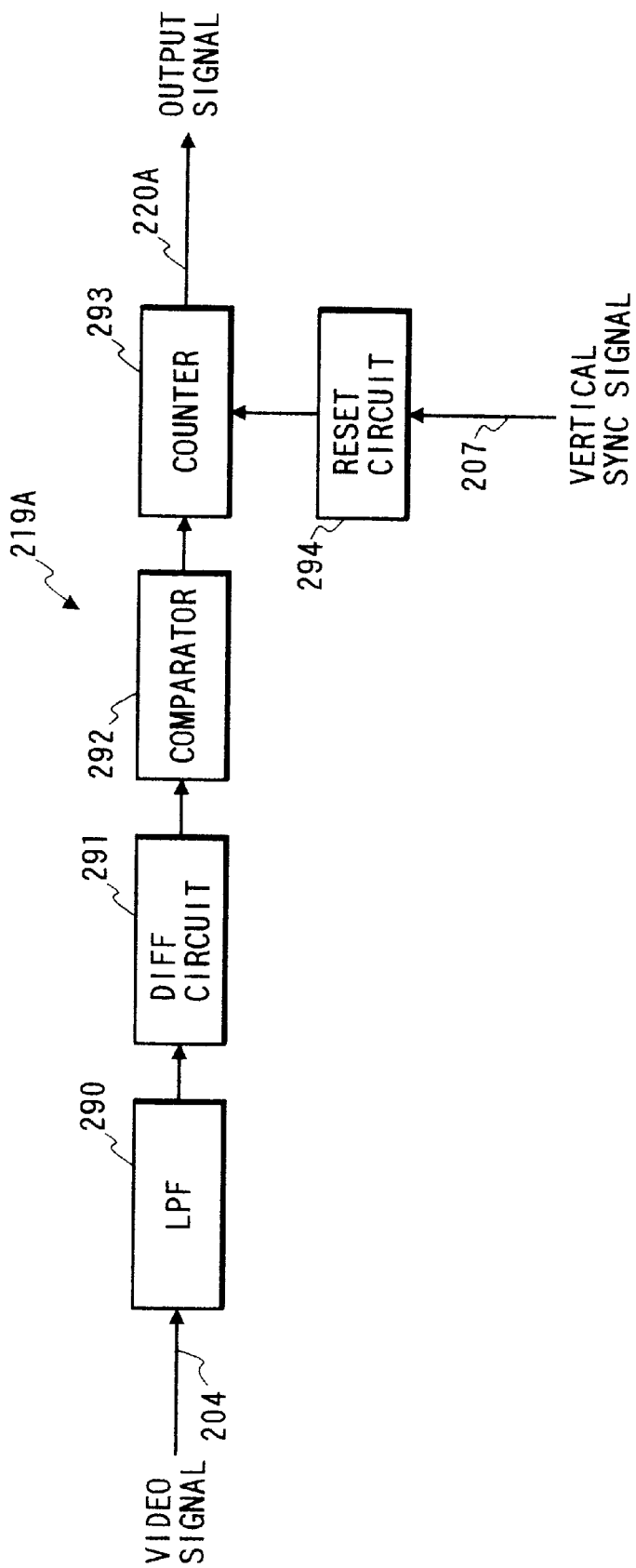
FIG. 28 is a block diagram of a portion of a mobile television receiver according to an eleventh embodiment of this invention.

FIG. 28 shows a portion of an eleventh embodiment of this invention which is similar to the embodiment of FIGS. 19–22, the embodiment of FIG. 23, the embodiment of FIGS. 24 and 25, or the embodiment of FIGS. 26 and 27 except for the following design change. The eleventh embodiment includes an image condition detector 219A instead of the image condition detector 219 (see FIG. 20). The image condition detector 219A serves to estimate a quality (a condition) of an image represented by the video signal 204 for every field related to the video signal 204. The image condition detector 219A is designed to use an equalizing pulse in the video signal 204 for every field.

As shown in FIG. 28, the image condition detector 219A includes a low pass filter 290, a differentiating circuit 291, a comparator 292, a counter 293, and a reset circuit 294.

The reset circuit 294 receives the vertical sync signal 207. For every field, the reset circuit 294 outputs a reset pulse to the counter 293 in response to the vertical sync signal 207 immediately before an equalizing pulse occurs in the video signal 204. The counter 293 is reset by the reset pulse outputted from the reset circuit 294.

The low pass filter 290 receives the video signal 204. The low pass filter 290 removes high-frequency noise components from the video signal 204. It is preferable that the low pass filter 290 has a cutoff frequency in the range of 0.5 MHz to 2 MHz. The differentiating circuit 291 differentiates the output signal of the low pass filter 290 with respect to a time base.

The comparator 292 periodically compares the level of the output signal of the differentiating circuit 291 with a predetermined reference level. When the level of the output signal of the differentiating circuit 291 exceeds the predetermined reference level, the comparator 292 periodically outputs an H-level signal to the counter 293. Otherwise, the comparator 292 outputs an L-level signal to the counter 293.

The device 293 counts every change of the output signal of the comparator 292 from the L level to the H level or every H-level signal outputted from the comparator 292. The counter 293 outputs a signal 220A representing the result of the count. The output signal 220A of the counter 293 is used as an output signal of the image condition detector 219A.

Twelfth Embodiment

Figure 29:
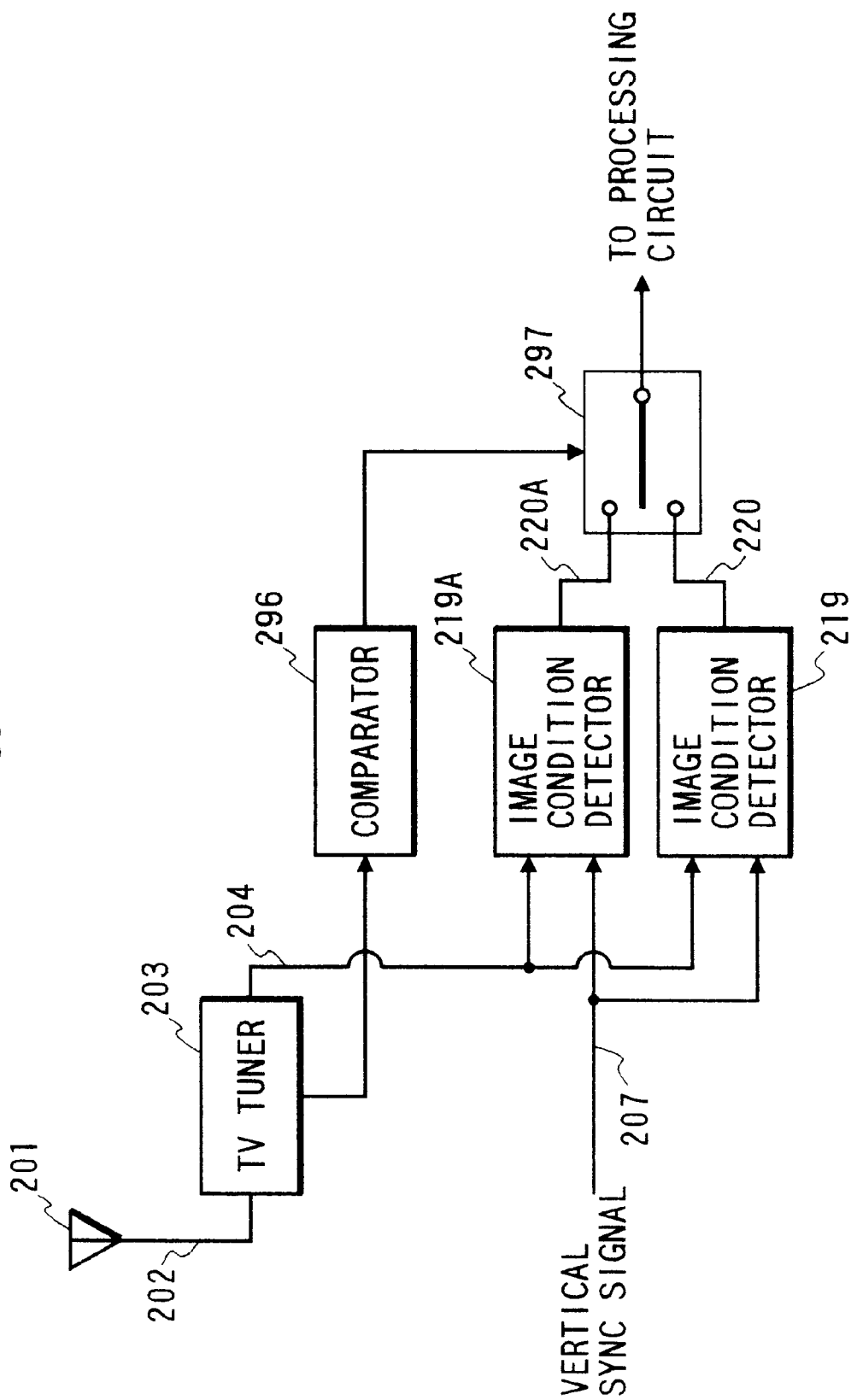
FIG. 29 is a block diagram of a portion of a mobile television receiver according to a twelfth embodiment of this invention.

FIG. 29 shows a portion of a twelfth embodiment of this invention which is similar to the embodiment of FIGS. 19–22, the embodiment of FIG. 23, the embodiment of FIGS. 24 and 25, or the embodiment of FIGS. 26 and 27 except for the following design change. The eleventh embodiment includes the image condition detector 219 (see FIG. 20), the image condition detector 219A (see FIG. 28), a comparator 296, and a switch 297.

The comparator 296 monitors an AGC voltage generated in the TV tuner 203 which indicates the strength of an electric field of the received RF TV signal of the designated channel. The comparator 296 compares the AGC voltage with a predetermined reference voltage to detect whether or not the strength of the electric field of the RF TV signal is in a given "weak" range. The comparator 296 outputs a signal representative of the result of the comparison to the switch 297.

The switch 297 selects one of the output signals 220 and 220A of the image condition detectors 219 and 219A in response to the output signal of the comparator 296. The switch 297 transmits the selected signal to the processing circuit 221, 221A, or 221B (see FIG. 19, FIG. 23, FIG. 24, or FIG. 26). Specifically, the switch 297 selects the output signal 219 of the image condition detector 219 when the strength of the electric field of the RF TV signal is in the given "weak" range. Otherwise, the switch 297 selects the output signal 219A of the image condition detector 219A.

Thirteenth Embodiment

Figure 30:
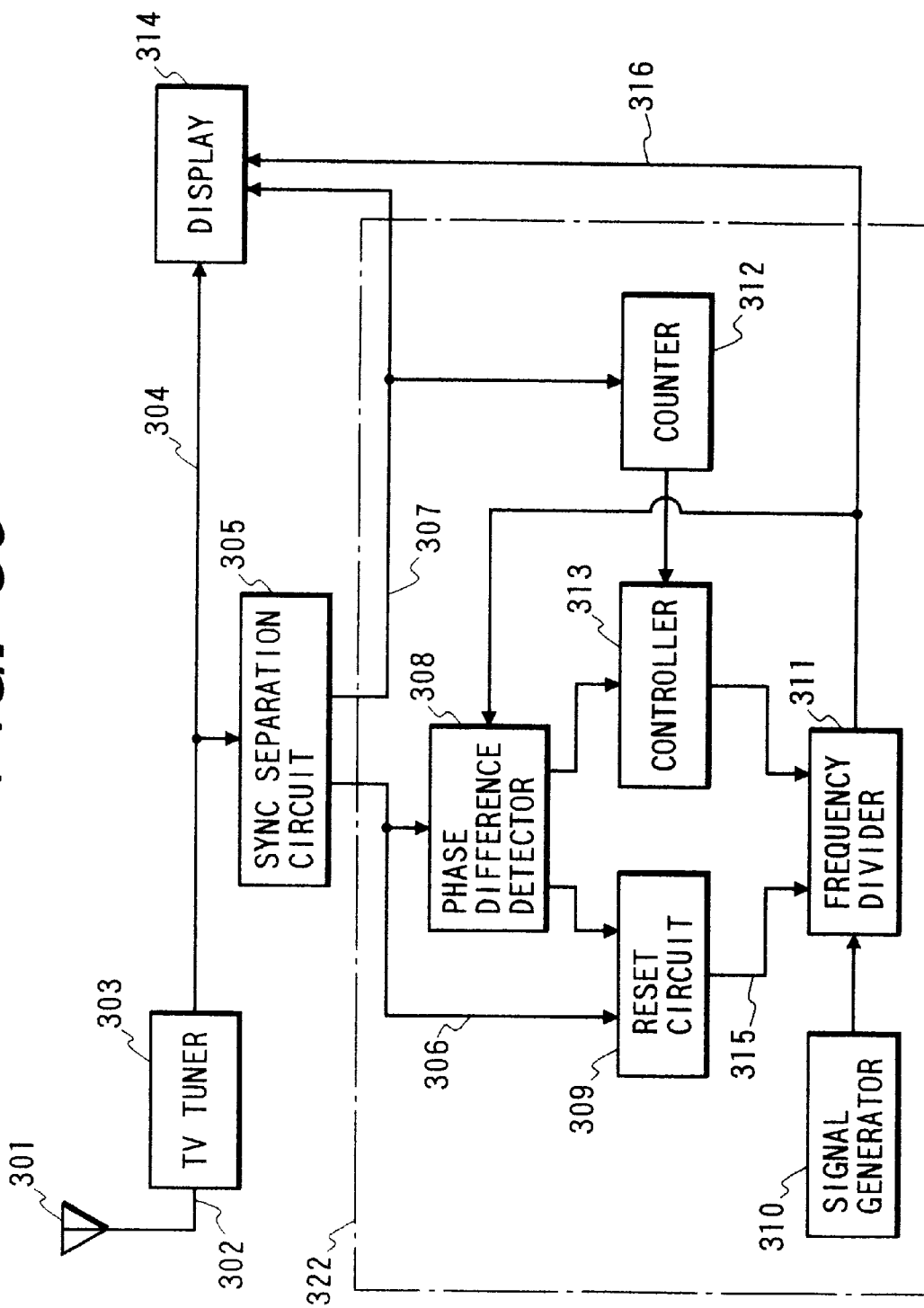
FIG. 30 is a block diagram of a mobile television receiver according to a thirteenth embodiment of this invention.

With reference to FIG. 30, an antenna 301 catches RF signals 302 including RF TV signals of different channels. The caught RF signals 302 are fed from the antenna 301 to a TV tuner 303. The TV tuner 303 selects an RF TV signal of a designated channel from among the RF signals fed from the antenna 301. The TV tuner 303 converts the selected RF TV signal into an IF television signal. The TV tuner 303 demodulates the IF television signal into a baseband video signal 304.

The video signal 304 is outputted from the TV tuner 303 to a sync separation circuit 305. The sync separation circuit 305 separates a horizontal sync signal 306 and a vertical sync signal 307 from the video signal 304. The sync separation circuit 305 outputs the horizontal sync signal 306 to a horizontal sync stabilizer 322. The sync separation circuit 305 outputs the vertical sync signal 307 to a display 314 and the horizontal sync stabilizer 322.

The horizontal sync stabilizer 322 includes a phase difference detector 308, a reset circuit 309, a signal generator 310, a frequency divider 311, a counter 312, and a controller 313. The phase difference detector 308 receives the horizontal sync signal 306 from the sync separation circuit 305. The phase difference detector 308, the signal generator 310, the frequency divider 311, and the controller 313 are connected to form a PLL circuit which generates a horizontal sync signal 316 locked in phase and frequency to the horizontal sync signal 306 fed from the sync separation circuit 305. The horizontal sync signal 316 generated by the PLL circuit appears at the output terminal of the frequency divider 311. The horizontal sync signal 316 is transmitted from the frequency divider 311 to the display 314.

The phase difference detector 308 detects the difference between the phase of the horizontal sync signal 306 outputted from the sync separation circuit 305 and the phase of the horizontal sync signal 316 outputted from the frequency divider 311. The phase difference detector 308 includes a comparator. The comparator in the phase difference detector 308 decides whether or not the absolute value of the detected phase difference is in a predetermined small range centered at "0" to determine whether or not the phases of the horizontal sync signals 306 and 316 are substantially equal. In the case where the absolute value of the detected phase difference is not in the predetermined small range, the phase difference detector 308 detects the direction of the phase difference, that is, the sign of the phase difference. The detected phase difference direction indicates whether the phase of the horizontal sync signal 306 advances or retards from the phase of the horizontal sync signal 316. The phase difference detector 308 outputs a signal representative of the phase difference direction to the controller 313. The signal outputted to the controller 313 from the phase difference detector 308 also indicates whether or not the phases of the horizontal sync signals 306 and 316 are substantially equal.

The phase difference detector 308 includes another comparator which decides whether or not the phase difference between the horizontal sync signals 306 and 316 is in a given range. The phase difference detector 308 outputs a signal representative of the result of the decision to the reset circuit 309.

The controller 313 generates a control signal in response to the phase difference direction signal outputted from the phase difference detector 308 and also the output signal of the counter 312. The controller 313 outputs the control signal to the frequency divider 311.

The signal generator 310 includes an oscillator having a quartz resonator tuned to an integral multiple of the horizontal sync frequency of the video signal 304. Thus, the signal generator 310 produces a clock signal having a frequency equal to the integral multiple of the horizontal sync frequency of the video signal 304. The signal generator 310 outputs the clock signal to the frequency divider 311.

The frequency divider 311 divides the frequency of the clock signal by a frequency division factor dependent on the control signal, thereby converting the clock signal into the horizontal sync signal 316.

The counter 312 receives the vertical sync signal 307 from the sync separation circuit 305, and counts pulses of the vertical sync signal 307. The counter 312 generates and outputs a signal which is updated field by field in a cycle corresponding to a predetermined number Nf of successive fields. In the case where the predetermined number Nf is equal to 8, the number represented by the output signal of the counter 312 sequentially changes as "0", "1", "2", . . . , "7" in accordance with the updating of the field during every cycle. The output signal of the counter 312 is applied to the controller 313.

The controller 313 includes a programmable device such as a microcomputer, a CPU, or a digital signal processor (DSP). The controller 313 has a combination of an I/O port, a processing section, a RAM, and a ROM. The controller 313 operates in accordance with a program stored in the ROM.

The ROM in the controller 313 also stores a table of control 8-bit sequences assigned to control data numbers (addresses) respectively. Specifically, a first control 8-bit sequence is "11111111", and is assigned to a control data number of "8". A second control 8-bit sequence is "11110111", and is assigned to a control data number of "7". A third control 8-bit sequence is "01110111", and is assigned to a control data number of "6". A fourth control 8-bit sequence is "01101101", and is assigned to a control data number of "5". A fifth control 8-bit sequence is "10101010", and is assigned to a control data number of "4". A sixth control 8-bit sequence is "10010010", and is assigned to a control data number of "3". A seventh control 8-bit sequence is "10001000", and is assigned to a control data number of "2". An eighth control 8-bit sequence is "00010000", and is assigned to a control data number of "1". A ninth control 8-bit sequence is "00000000", and is assigned to a control data number of "0". A tenth control 8-bit sequence is "00010000", and is assigned to a control data number of "−1". An eleventh control 8-bit sequence is "10001000", and is assigned to a control data number of "−2". A twelfth control 8-bit sequence is "10010010", and is assigned to a control data number of "−3". A thirteenth control 8-bit sequence is "10101010", and is assigned to a control data number of "−4". A fourteenth control 8-bit sequence is "01101101", and is assigned to a control data number of "−5". A fifteenth control 8-bit sequence is "101110111", and is assigned to a control data number of "−6". A sixteenth control 8-bit sequence is "11101111", and is assigned to a control data number of "−7". A seventeenth control 8-bit sequence is "11111111", and is assigned to a control data number of "−8".

The controller 313 is programmed to implement the following processes. The controller 313 selects one from among the control 8-bit sequences in response to the phase difference direction signal outputted from the phase difference detector 308. The controller 313 sequentially reads out bits of the selected control 8-bit sequence field by field in response to the output signal of the counter 312. During a field for which the corresponding bit of the selected control 8-bit sequence is "1", the controller 313 periodically increments the frequency division factor in the frequency divider 311 by "1" a predetermined number "k" of times in the case where the control data number corresponding to the selected control 8-bit sequence is positive. During a field for which the corresponding bit of the selected control 8-bit sequence is "1", the controller 313 periodically decrements the frequency division factor in the frequency divider 311 by "1" the predetermined number "k" of times in the case where the control data number corresponding to the selected control 8-bit sequence is negative. On the other hand, during a field for which the corresponding bit of the selected control 8-bit sequence is "0", the controller 313 does not change the frequency division factor in the frequency divider 311.

Accordingly, the control 8-bit sequence assigned to a control data number of "8" provides a mean phase control amount of "k/f" over an 8-field period of time. Here, "f" denotes the frequency of the clock signal. The control 8-bit sequence assigned to a control data number of "7" provides a mean phase control amount of "7k/(8f)" over an 8-field period of time. The control 8-bit sequence assigned to a control data number of "6" provides a mean phase control amount of "6k/(8f)" over an 8-field period of time. The control 8-bit sequence assigned to a control data number of "5" provides a mean phase control amount of "5k/(8f)" over an 8-field period of time. The control 8-bit sequence assigned to a control data number of "4" provides a mean phase control amount of "4k/(8f)" over an 8-field period of time. The control 8-bit sequence assigned to a control data number of "3" provides a mean phase control amount of "3k/(8f)" over an 8-field period of time. The control 8-bit sequence assigned to a control data number of "2" provides a mean phase control amount of "2k/(8f)" over an 8-field period of time. The control 8-bit sequence assigned to a control data number of "1" provides a mean phase control amount of "k/(8f)" over an 8-field period of time. The control 8-bit sequence assigned to a control data number of "0" provides a mean phase control amount of "0" over an 8-field period of time. The control 8-bit sequence assigned to a control data number of "−1" provides a mean phase control amount of "−k/(8f)" over an 8-field period of time. The control 8-bit sequence assigned to a control data number of "−2" provides a mean phase control amount of "−2k/(8f)" over an 8-field period of time. The control 8-bit sequence assigned to a control data number of "−3" provides a mean phase control amount of "−3k/(8f)" over an 8-field period of time. The control 8-bit sequence assigned to a control data number of "−4" provides a mean phase control amount of "−4k/(8f)" over an 8-field period of time. The control 8-bit sequence assigned to a control data number of "−5" provides a mean phase control amount of "−5k/(8f)" over an 8-field period of time. The control 8-bit sequence assigned to a control data number of "−6" provides a mean phase control amount of "−6k/(8f)" over an 8-field period of time. The control 8-bit sequence assigned to a control data number of "−7" provides a mean phase control amount of "−7k/(8f)" over an 8-field period of time.

The control 8-bit sequence assigned to a control data number of "−8" provides a mean phase control amount of "−8k/(8f)" over an 8-field period of time.

The reset circuit 309 receives the horizontal sync signal 306 from the sync separation circuit 305. The reset circuit 309 receives the output signal of the phase difference detector 308 which represents whether or not the phase difference between the horizontal sync signals 306 and 316 is in the given range. The reset circuit 309 includes a deciding section which determines whether or not the phase difference remains outside the given range during at least a given number of successive fields by referring to the output signal of the phase difference detector 308. The reset circuit 309 includes a gate which allows the horizontal sync signal 306 to be fed to the frequency divider 311 for a given time as a reset pulse signal 315 only in the case where the phase difference remains outside the given range during at least the given number of successive fields. The frequency divider 311 is reset by the reset pulse signal 315 so that the phase of the horizontal sync signal 316 will be equalized to the phase of the horizontal sync signal 306.

In a modification, for every field, count is given of horizontal scanning periods during which the phases of the horizontal sync signals 306 and 316 are substantially equal. Only in the case where the count result number is smaller than a given number during at least the given number of successive fields, the reset circuit 309 outputs the reset pulse signal 315 to the frequency divider 311.

The display 314 receives the video signal 304 from the TV tuner 303. The display 314 receives the vertical sync signal 307 from the sync separation circuit 305. The display 314 receives the horizontal sync signal 316 from the horizontal sync stabilizer 322. The display 314 visualizes the video signal 304 on its screen in response to the vertical sync signal 307 and the horizontal sync signal 316.

Figure 31:
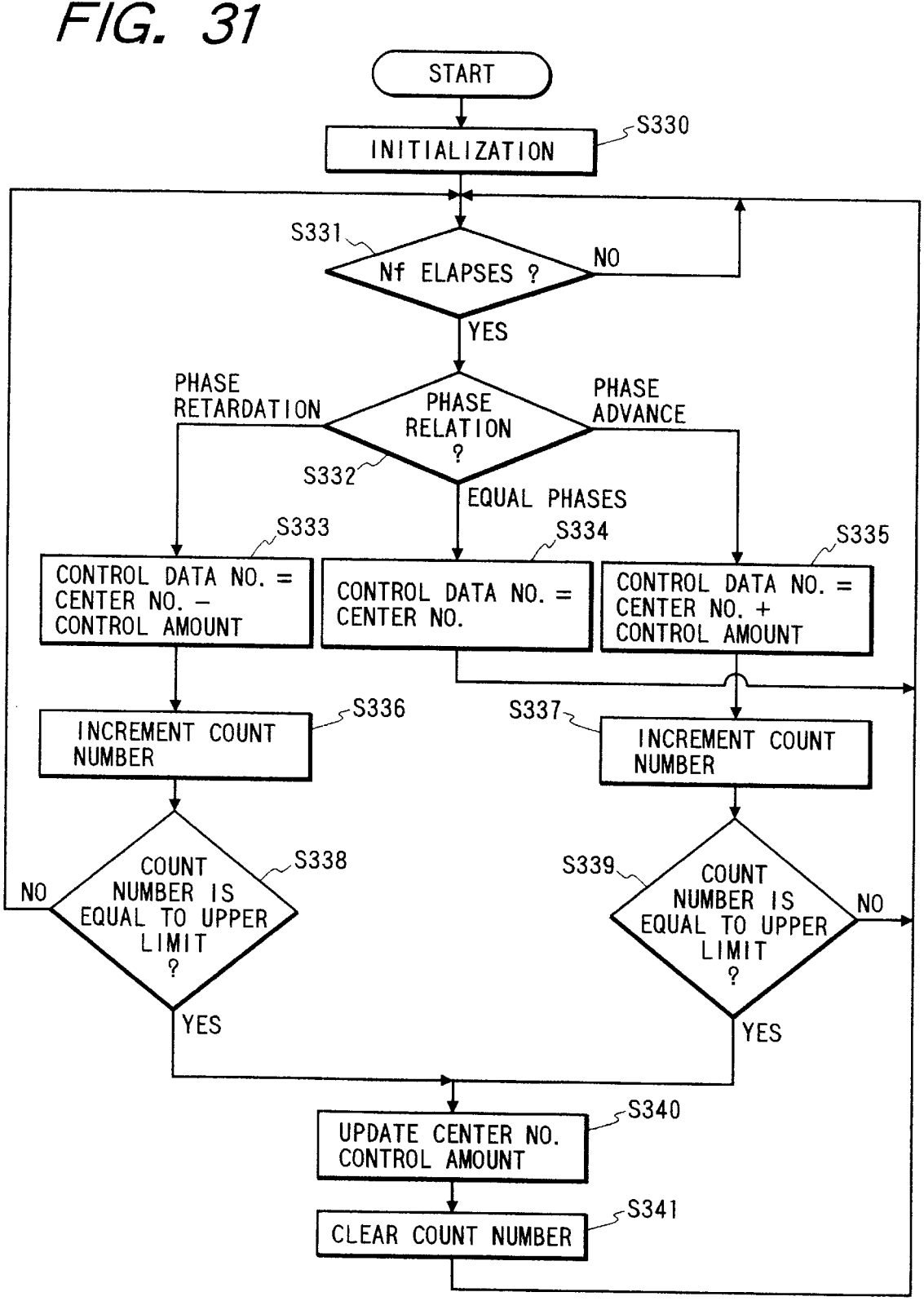
FIG. 31 is a flowchart of a program related to operation of a controller in FIG. 30.

As previously explained, the controller 313 operates in accordance with a program stored in its internal ROM. FIG. 31 is a flowchart of a segment of the program which is designed to determine the control data number in response to the output signal of the phase difference detector 308.

As shown in FIG. 31, a first step S330 of the program segment sets a center number and a control amount to predetermined initial values respectively. After the step S330, the program advances to a step S331.

The step S331 decides whether or not a time corresponding to the predetermined number Nf of successive fields has elapsed. When the time corresponding to the predetermined number Nf of successive fields has elapsed, the program advances from the step S331 to a step S332. Otherwise, the step S331 is repeated. Thus, the step S331 serves to wait the time corresponding to the predetermined number Nf of successive fields.

The step S332 decides the phase relation between the horizontal sync signals 306 and 316 by referring to the output signal of the phase difference detector 308. When the phase of the horizontal sync signal 306 retards from the phase of the horizontal sync signal 316, the program proceeds from the step S332 to a step S333. When the phase of the horizontal sync signal 306 is substantially equal to the phase of the horizontal sync signal 316, the program proceeds from the step S332 to a step S334. When the phase of the horizontal sync signal 306 advances from the phase of the horizontal sync signal 316, the program proceeds from the step S332 to a step S335.

The step S333 sets a control data number equal to the center number minus the control amount. A step S336 following the step S333 increments a count number corresponding to phase retardation.

The step S334 sets the control data number equal to the center number. After the step S334, the program returns to the step S331.

The step S335 sets the control data number equal to the center number plus the control amount. A step S337 following the step S335 increments a count number corresponding to phase advance.

A step S338 subsequent to the step S336 decides whether or not the phase-retardation count number is equal to a predetermined upper limit. When the phase-retardation count number is equal to the predetermined upper limit, the program proceeds from the step S338 to a step S340. Otherwise, the program returns from the step S338 to the step S331.

A step S339 subsequent to the step S337 decides whether or not the phase-advance count number is equal to a predetermined upper limit. When the phase-advance count number is equal to the predetermined upper limit, the program proceeds from the step S339 to the step S340. Otherwise, the program returns from the step S339 to the step S331.

The step S340 updates the center number and the control amount according to predetermined rules. A step S341 following the step S340 clears or resets the phase-retardation count number and the phase-advance count number. After the step S341, the program returns to the step S331.

In a modification, for every field, count is given of horizontal scanning periods during which the phase of the horizontal sync signal 306 advances from the phase of the horizontal sync signal 316, and also count is given of horizontal scanning periods during which the phase of the horizontal sync signal 306 retards from the phase of the horizontal sync signal 316. A decision is made as to which of the phase-advance count number and the phase-retardation count number is greater. The step S332 uses the result of the decision. Specifically, when the phase-retardation count number is greater, the program proceeds from the step S332 to the step S333. When the phase-advance count number is greater, the program proceeds from the step S332 to the step S335.

The updating of the center number and the control amount by the step S340 will be further explained. It is assumed that as shown in the portion (a) of FIG. 32, the center number and the control amount are equal to "0" and "8" respectively at an initial state. It is also assumed that the initial center number is greater than a correct frequency division factor P0 at which the frequency error between the horizontal sync signals 306 and 316 is nullified. After the initial state, the phase-retardation count number given by the step S336 reaches the predetermined upper limit. When the phase-retardation count number reaches the predetermined upper limit, the step S340 updates the center number and the control amount to "−4" and "4" respectively as shown in the portion (b) of FIG. 32. After the updating, the phase-retardation count number given by the step S336 reaches the predetermined upper limit again. When the phase-retardation count number reaches the predetermined upper limit, the step S340 updates the center number and the control amount to "−6" and "2" respectively as shown in the portion (c) of FIG. 32. After the updating, the phase-retardation count number given by the step S336 reaches the predetermined upper limit again. When the phase-retardation count number reaches the predetermined upper limit, the step S340 updates the center number and the control amount to "−5" and "1" respectively as shown in the portion (d) of FIG. 32. Thus, the center number converges toward the correct frequency division factor P0 while the control amount decreases.

The antenna 301 may be replaced by plural antennas. In this case, a diversity unit for antenna selection is provided between the antennas and the TV tuner 303.

Fourteenth Embodiment

Figure 32:
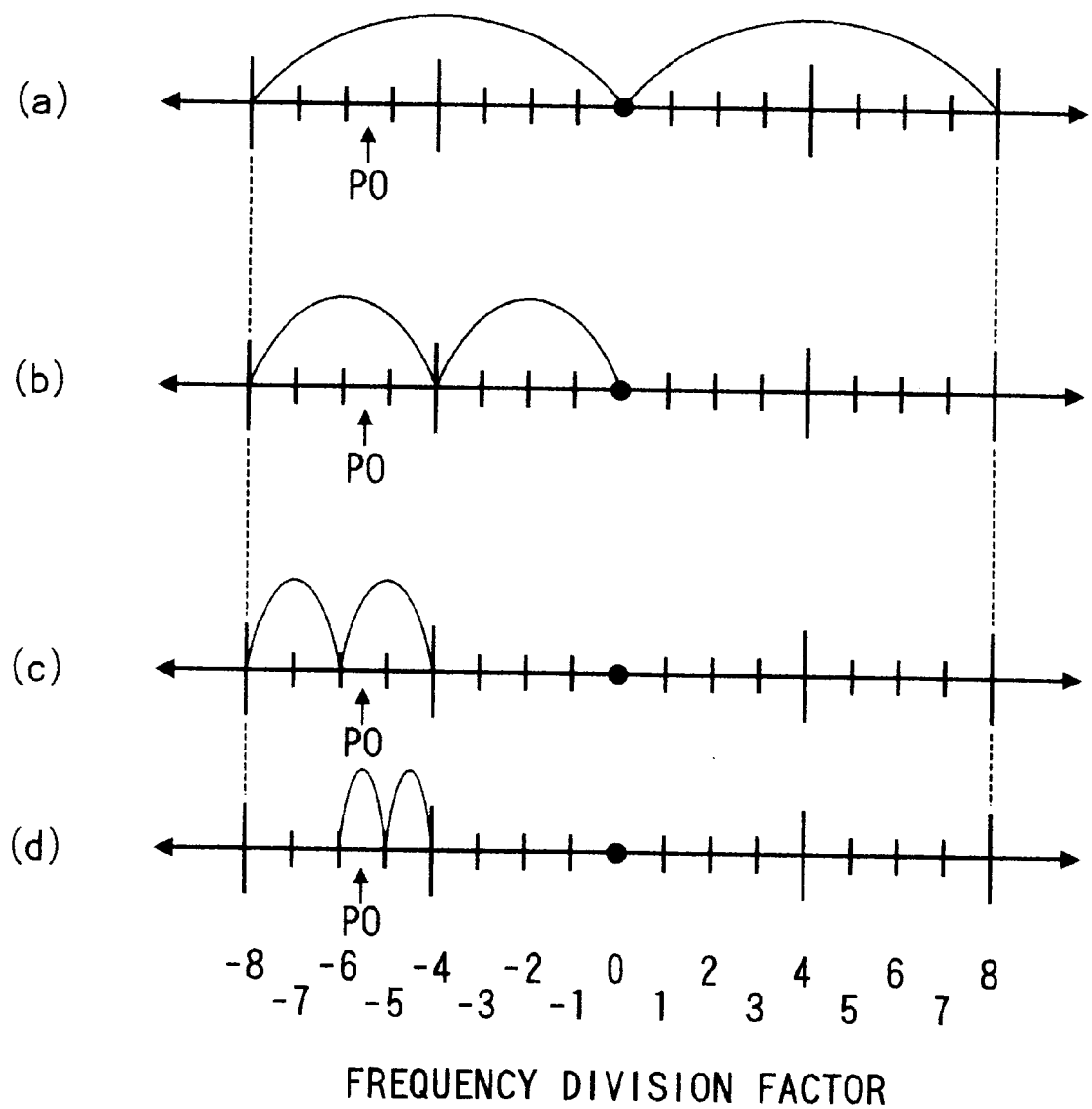
FIG. 32 is a diagram of four exemplary sets each having a center number and a control amount defined along a line representing a frequency division factor in the mobile television receiver of FIG. 30.
Figure 33:
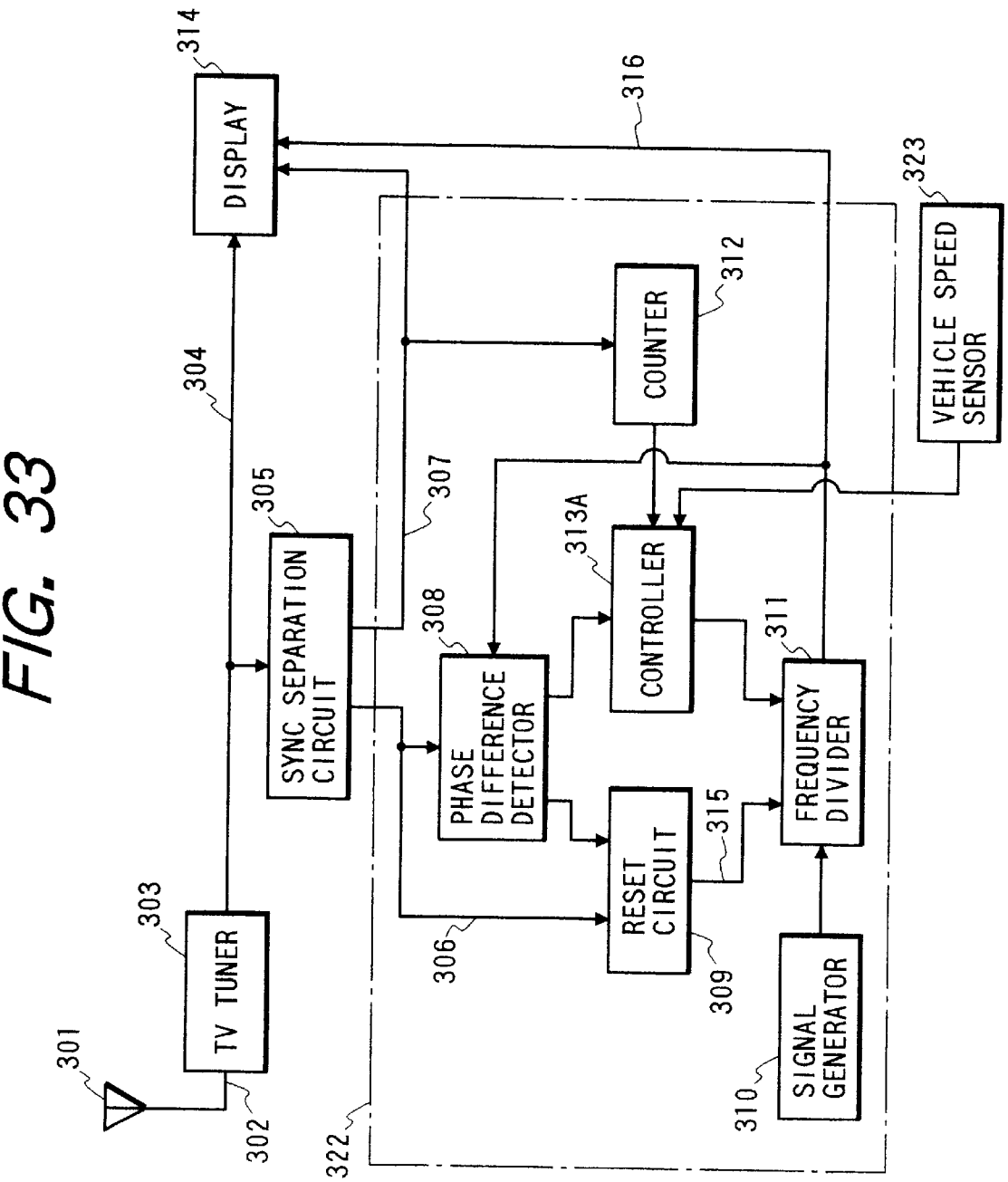
FIG. 33 is a block diagram of a mobile television receiver according to a fourteenth embodiment of this invention.

FIG. 33 shows a fourteenth embodiment of this invention which is similar to the embodiment of FIGS. 30–32 except for the following additional arrangement. The embodiment of FIG. 33 is mounted on a vehicle. The embodiment of FIG. 33 includes a controller 313A instead of the controller 313 in FIG. 30. The embodiment of FIG. 33 also includes a vehicle speed sensor 323 which detects the speed of the vehicle. The vehicle speed sensor 323 outputs a signal representative of the detected vehicle speed to the controller 313A.

Figure 34:
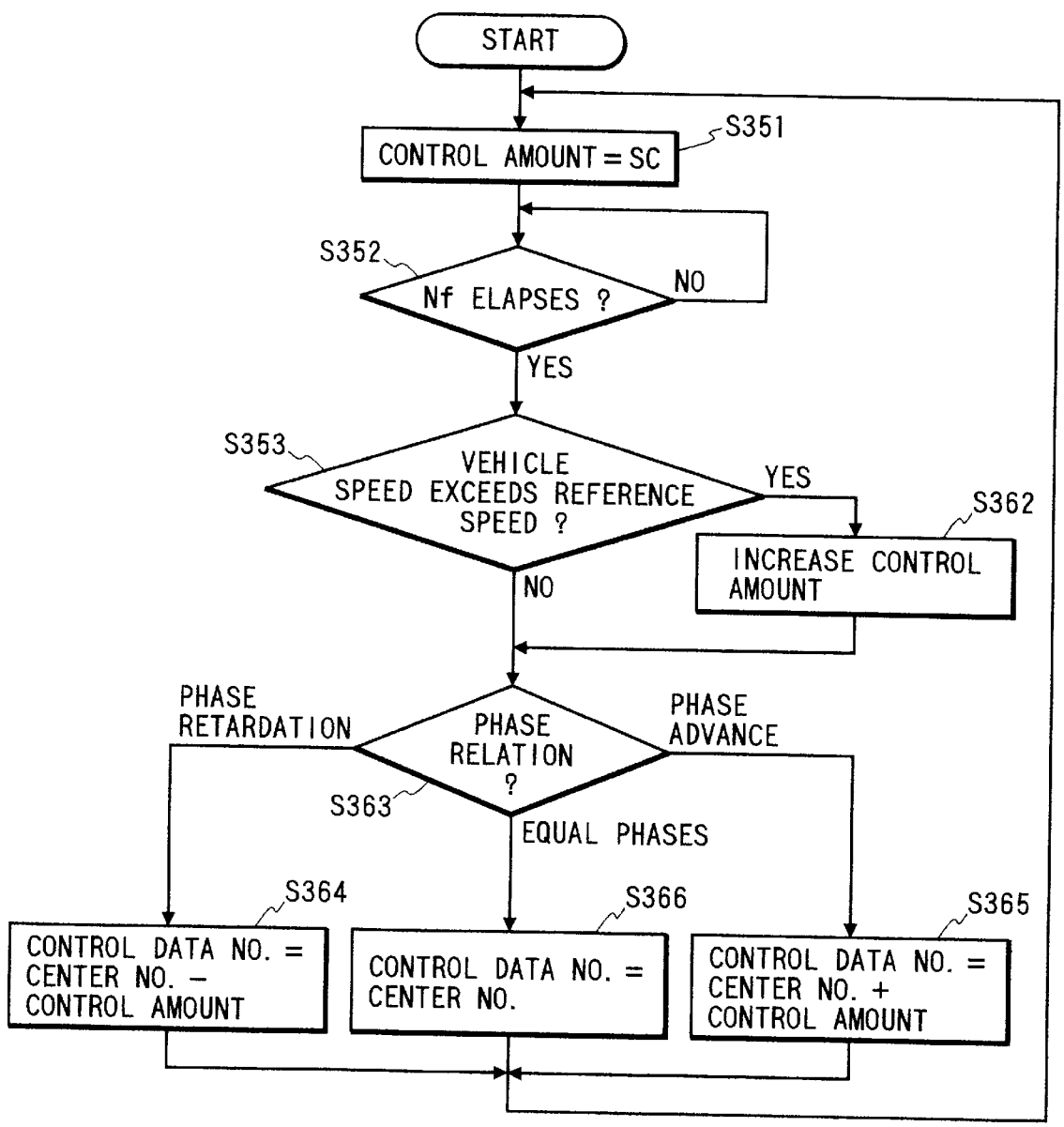
FIG. 34 is a flowchart of a program related to operation of a controller in FIG. 33.

FIG. 34 is a flowchart of a segment of a program for the controller 313A. As shown in FIG. 34, a first step S351 of the program segment sets the control amount to a prescribed amount SC. After the step S351, the program advances to a step S352.

The step S352 decides whether or not a time corresponding to the predetermined number Nf of successive fields has elapsed. When the time corresponding to the predetermined number Nf of successive fields has elapsed, the program advances from the step S352 to a step S353. Otherwise, the step S352 is repeated. Thus, the step S352 serves to wait the time corresponding to the predetermined number Nf of successive fields.

The step S353 compares the detected vehicle speed represented by the output signal of the vehicle speed sensor 323 with a predetermined reference speed. When the detected vehicle speed is higher than the predetermined reference speed, the program advances from the step S353 to a step S362. Otherwise, the program jumps from the step S353 to a step S363.

The step S362 increases the control amount by a predetermined increment. The resultant control amount is equal to the prescribed amount SC plus the predetermined increment. After the step S362, the program advances to the step S363.

The step S363 decides the phase relation between the horizontal sync signals 306 and 316 by referring to the output signal of the phase difference detector 308. When the phase of the horizontal sync signal 306 retards from the phase of the horizontal sync signal 316, the program proceeds from the step S363 to a step S364. When the phase of the horizontal sync signal 306 is substantially equal to the phase of the horizontal sync signal 316, the program proceeds from the step S363 to a step S366. When the phase of the horizontal sync signal 306 advances from the phase of the horizontal sync signal 316, the program proceeds from the step S363 to a step S365.

The step S364 sets a control data number equal to the center number minus the control amount. After the step S364, the program returns to the step S351.

The step S365 sets the control data number equal to the center number plus the control amount. After the step S365, the program returns to the step S351.

The step S366 sets the control data number equal to the center number. After the step S364, the program returns to the step S351.

When the vehicle is traveling, the video signal 304 is subjected to a Doppler frequency shift. The step S362 compensates for a Doppler frequency shift by increasing the control amount. Thus, the control of equalizing the phases and the frequencies of the horizontal sync signals 306 and 316 remains enabled even when a Doppler frequency shift occurs.

The control amount may be increased in proportion to the carrier frequency of the received RF TV signal of the designated channel. Alternatively, the control amount may be increased in proportion to the product of the detected vehicle speed and the carrier frequency of the received RF TV signal.

Fifteenth Embodiment

Figure 35:
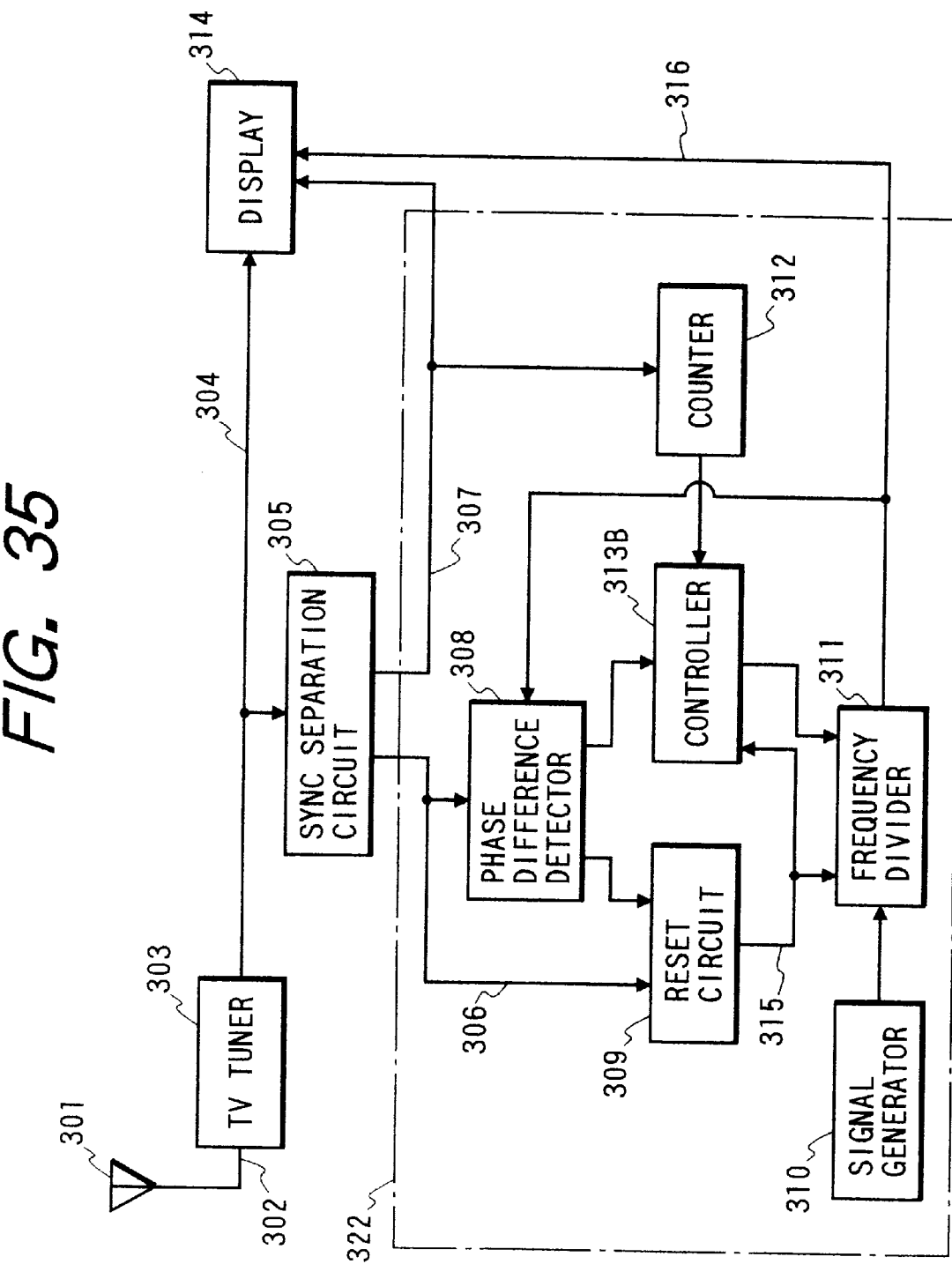
FIG. 35 is a block diagram of a mobile television receiver according to a fifteenth embodiment of this invention.

FIG. 35 shows a fifteenth embodiment of this invention which is similar to the embodiment of FIGS. 30–32 except for the following design change. The embodiment of FIG. 35 includes a controller 313B instead of the controller 313 in FIG. 30. The controller 313B receives the reset pulse signal 315 from the reset circuit 309.

Figure 36:
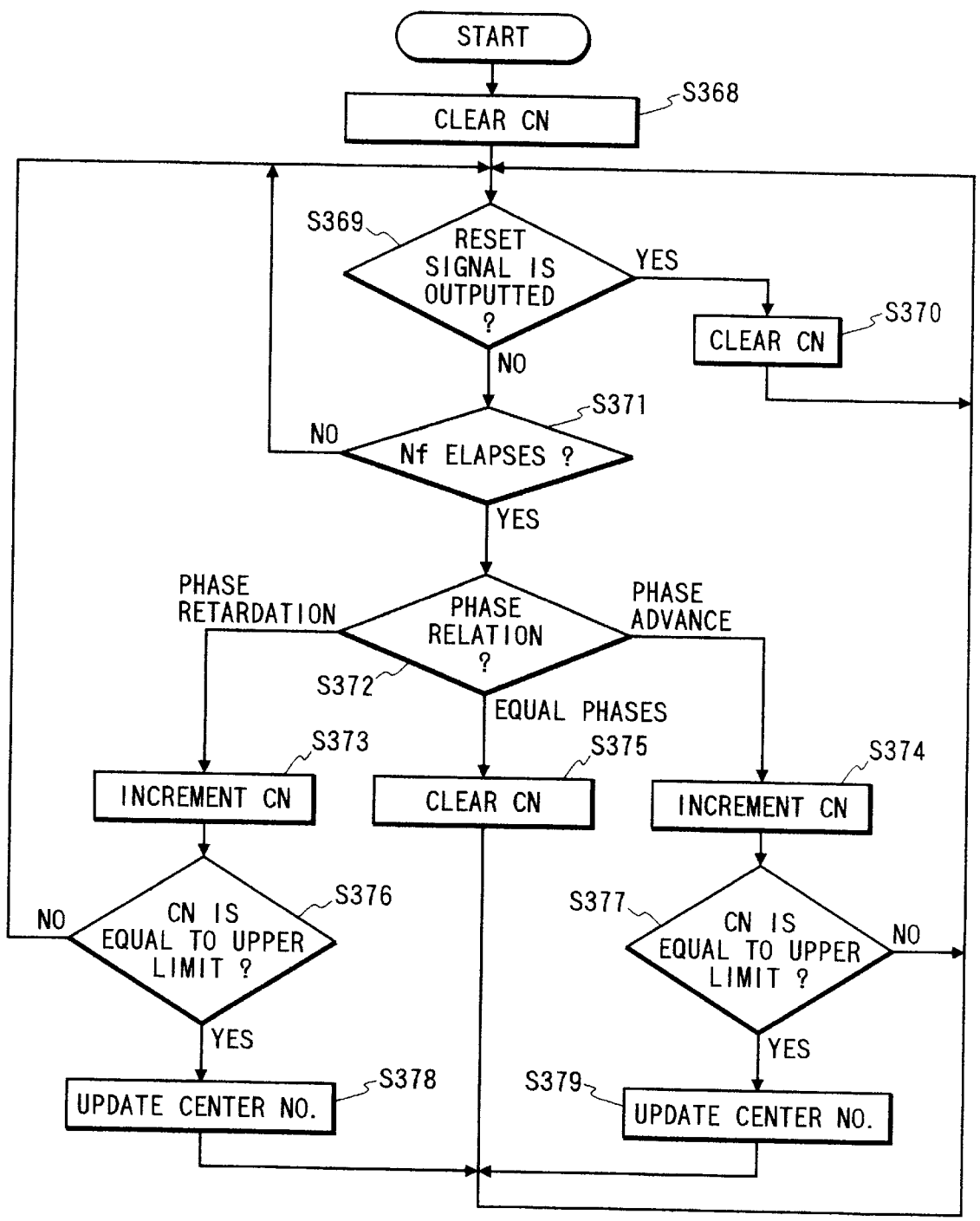
FIG. 36 is a flowchart of a program related to operation of a controller in FIG. 35.

FIG. 36 is a flowchart of a segment of a program for the controller 313B. As shown in FIG. 36, a first step S368 of the program segment clears or resets a count number CN corresponding to a continuously-occurring phase difference. After the step S368, the program advances to a step S369.

The step S369 decides whether or not the reset pulse signal 315 is outputted from the reset circuit 309. When the reset pulse signal 315 is outputted from the reset circuit 309, the program advances from the step S369 to a step S370. Otherwise, the program advances from the step S369 to a step S371.

The step S370 clears or resets the count number CN. After the step S370, the program returns to the step S369.

The step S371 decides whether or not a time corresponding to the predetermined number Nf of successive fields has elapsed. When the time corresponding to the predetermined number Nf of successive fields has elapsed, the program advances from the step S371 to a step S372. Otherwise, the program returns from the step S371 to the step S369. Thus, the step S371 serves to wait the time corresponding to the predetermined number Nf of successive fields.

The step S372 decides the phase relation between the horizontal sync signals 306 and 316 by referring to the output signal of the phase difference detector 308. When the phase of the horizontal sync signal 306 retards from the phase of the horizontal sync signal 316, the program proceeds from the step S372 to a step S373. When the phase of the horizontal sync signal 306 is substantially equal to the phase of the horizontal sync signal 316, the program proceeds from the step S372 to a step S375. When the phase of the horizontal sync signal 306 advances from the phase of the horizontal sync signal 316, the program proceeds from the step S372 to a step S374.

The step S373 increments the count number CN. A step S376 following the step S373 decides whether or not the count number CN is equal to a predetermined upper limit. When the count number CN is equal to the predetermined upper limit, the program advances from the step S376 to a step S378. Otherwise, the program returns from the step S376 to the step S369.

The step S374 increments the count number CN. A step S377 following the step S374 decides whether or not the count number ON is equal to the predetermined upper limit. When the count number CN is equal to the predetermined upper limit, the program advances from the step S377 to a step S379. Otherwise, the program returns from the step S377 to the step S369.

The step S375 clears or resets the count number CN. After the step S375, the program returns to the step S369.

The step S378 updates the center number. Specifically, the step S378 decrements the center number by the prescribed amount SC. After the step S378, the program returns to the step S369.

The step S379 updates the center number. Specifically, the step S379 increments the center number by the prescribed amount SC. After the step S379, the program returns to the step S369.

The steps S376, S377, S378, and S379 cooperate to update the center number only in the case where the phase of the horizontal sync signal 306 varies continuously and gradually relative to the phase of the horizontal sync signal 316. The updating of the center number can compensate for a temperature-dependent variation in the frequency of the clock signal outputted from the signal generator 310.

Sixteenth Embodiment

Figure 37:
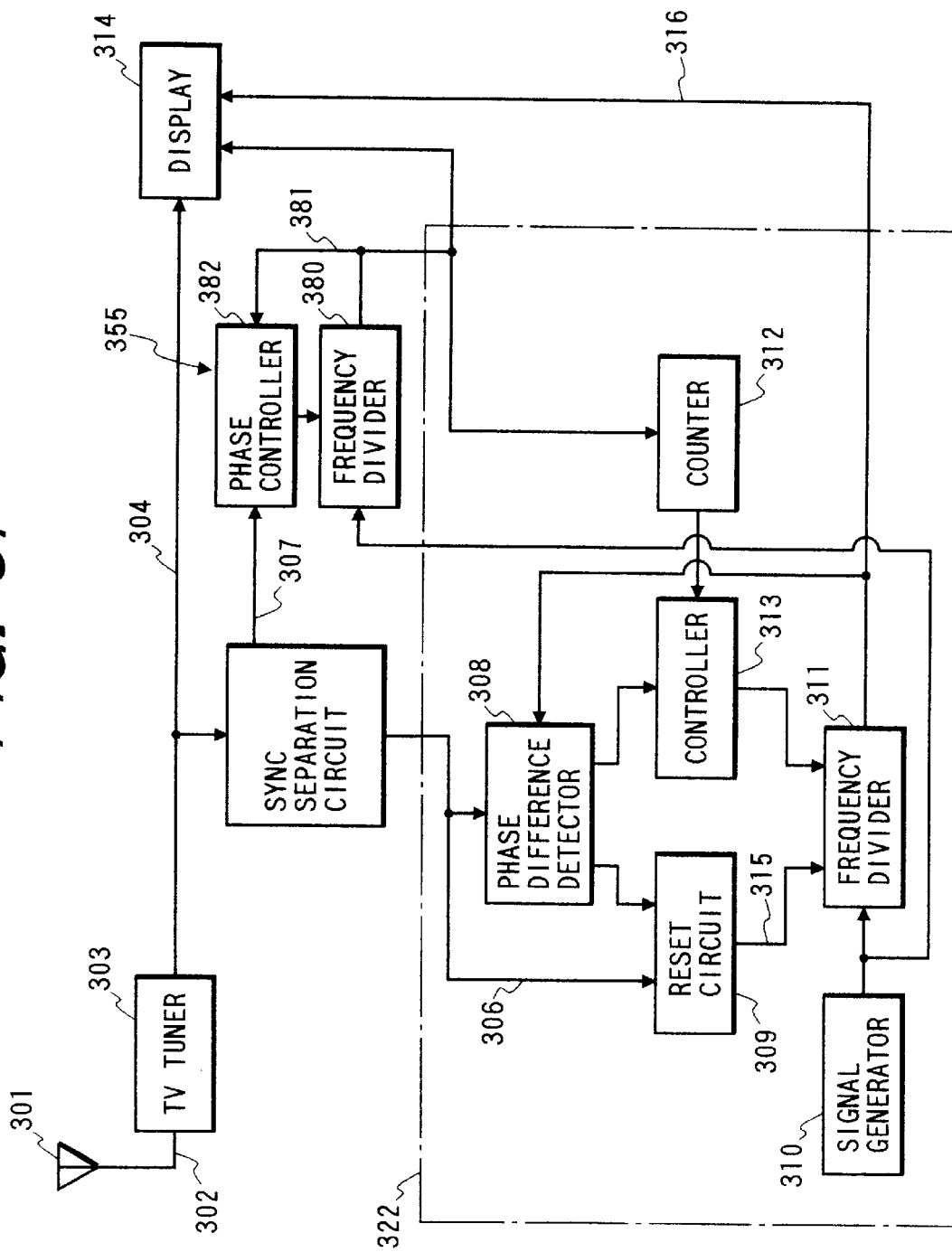
FIG. 37 is a block diagram of a mobile television receiver according to a sixteenth embodiment of this invention.

FIG. 37 shows a sixteenth embodiment of this invention which is similar to the embodiment of FIGS. 30–32 except for the following additional arrangement. The embodiment of FIG. 37 includes a vertical sync stabilizer 355.

The vertical sync stabilizer 355 has a frequency divider 380 and a phase controller 382. The frequency divider 380 receives the clock signal from the signal generator 310, and divides the frequency of the clock signal to generate a vertical sync signal 381. The phase controller 382 receives the vertical sync signal 307 from the sync separation circuit 305. The phase controller 382 receives the vertical sync signal 381 from the frequency divider 380. The frequency divider 380 and the phase controller 382 are connected and designed to form a PLL circuit which locks the vertical sync signal 381 in phase and frequency to the vertical sync signal 307. The vertical sync stabilizer 355 outputs the vertical sync signal 381 to the counter 312 and the display 314.

Specifically, the phase controller 382 has a first section which detects a phase difference (a phase error) between the vertical sync signals 307 and 381. The phase controller 382 has a second section which decides whether or not the detected phase difference remains out of a given range during at least a predetermined number of successive fields. The phase controller 382 has a third section which outputs the vertical sync signal 307 to the frequency divider 380 as a reset pulse signal in the case where the detected phase difference remains out of the given range during at least the predetermined number of successive fields.

Seventeenth Embodiment

Figure 38:
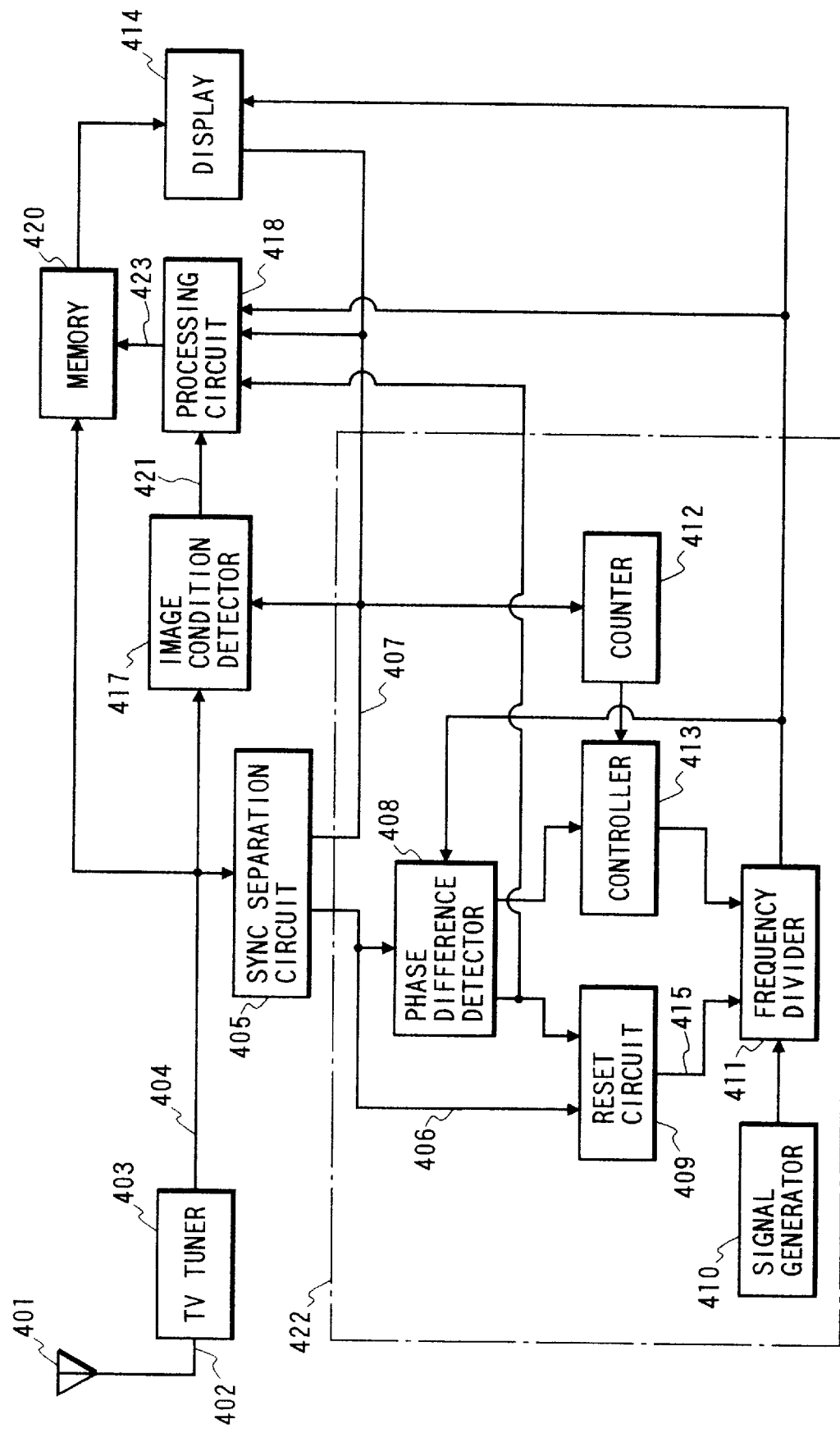
FIG. 38 is a block diagram of a mobile television receiver according to a seventeenth embodiment of this invention.

With reference to FIG. 38, an antenna 401 catches RF signals 402 including RF TV signals of different channels. The caught RF signals 402 are fed from the antenna 401 to a TV tuner 403. The TV tuner 403 selects an RF TV signal of a designated channel from among the RF signals fed from the antenna 401. The TV tuner 403 converts the selected RF TV signal into an IF television signal. The TV tuner 403 demodulates the IF television signal into a baseband video signal 404.

The video signal 404 is outputted from the TV tuner 403 to a sync separation circuit 405. The sync separation circuit 405 separates a horizontal sync signal 406 and a vertical sync signal 407 from the video signal 404. The sync separation circuit 405 outputs the horizontal sync signal 406 to a horizontal sync stabilizer 422. The sync separation circuit 405 outputs the vertical sync signal 407 to a display 414, an image condition detector 417, a processing circuit 418, and the horizontal sync stabilizer 422.

The horizontal sync stabilizer 422 includes a phase difference detector 408, a reset circuit 409, a signal generator 410, a frequency divider 41 1, a counter 412, and a controller 413. The horizontal sync stabilizer 422 is similar to the horizontal sync stabilizer 322 in FIG. 30. The phase difference detector 408, the reset circuit 409, the signal generator 410, the frequency divider 411, the counter 412, and the controller 413 correspond to the phase difference detector 308, the reset circuit 309, the signal generator 310, the frequency divider 311, the counter 312, and the controller 313 in FIG. 30 respectively. The horizontal sync stabilizer 422 generates a horizontal sync signal 416 locked in phase and frequency to the horizontal sync signal 406. The horizontal sync stabilizer 422 outputs the horizontal sync signal 416 to the display 414 and the processing circuit 418.

The phase difference detector 408 in the horizontal sync stabilizer 422 feeds the processing circuit 418 with a signal representing whether or not the phases of the horizontal sync signals 406 and 416 are substantially equal.

The video signal 404 is fed from the TV tuner 403 to the image condition detector 417. The image condition detector 417 serves to estimate a quality (a condition) of an image represented by the video signal 404 for every field related to the video signal 404. Specifically, the image condition detector 417 serves to detect delayed wave components of the video signal 404 for every field.

Figure 39:
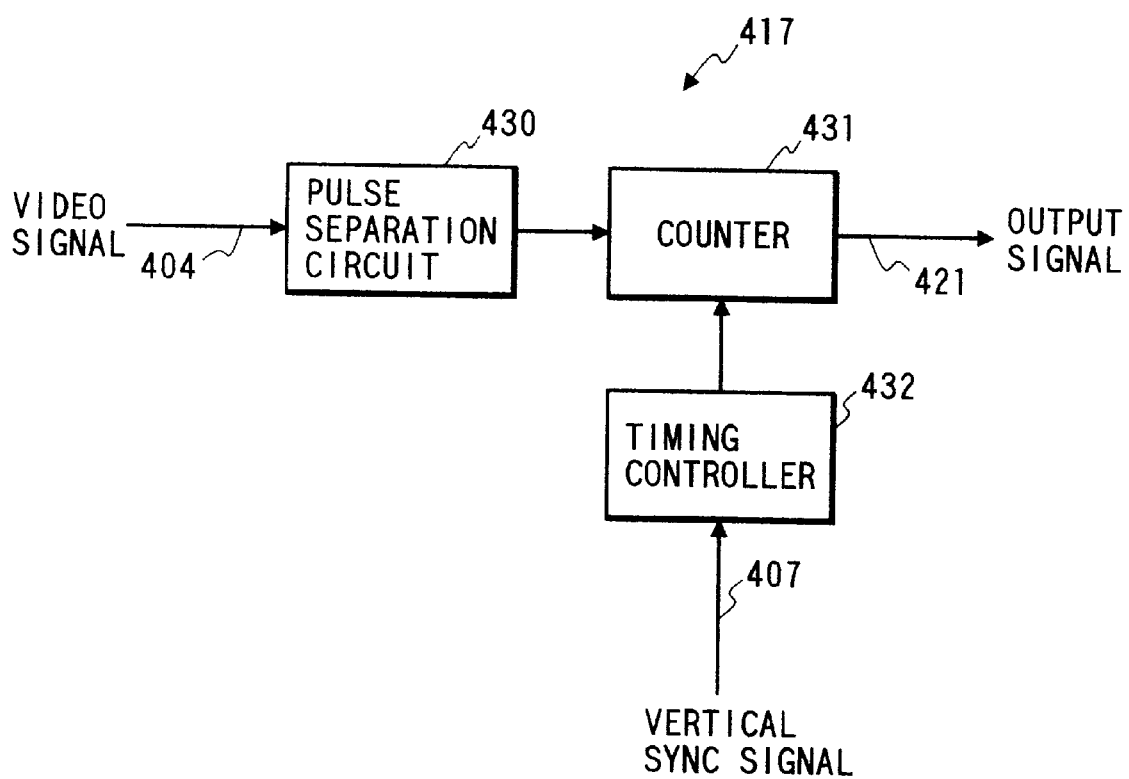
FIG. 39 is a block diagram of an image condition detector in FIG. 38.

As shown in FIG. 39, the image condition detector 417 includes a pulse separation circuit 430, a counter 431, and a timing controller 432. The pulse separation circuit 430 receives the video signal 404, and separates horizontal sync pulses from the video signal 404. The counter 431 receives the horizontal sync pulses from the pulse separation circuit 430. The timing controller 432 receives the vertical sync signal 407 from the sync separation circuit 405 (see FIG. 38). The timing controller 432 periodically generates a count enabling signal in response to the vertical sync signal 407. The timing controller 432 outputs the count enabling signal to the counter 431. The counter 431 counts the horizontal sync pulses during a predetermined period of time within every field in response to the count enabling signal fed from the timing controller 432. The counter 431 outputs a signal 421 representing the counted pulse number as an output signal of the image condition detector 417.

When the intensity of delayed wave of the received RF TV signal is comparable with the intensity of direct wave thereof, the counter 431 responds to horizontal sync pulses in the delayed wave as well as horizontal sync pulses in the direct wave. Accordingly, the counted pulse number represented by the output signal 421 of the counter 431 indicates a condition of the delayed wave. This means that the image condition detector 417 detects a condition of the delayed wave.

With reference back to FIG. 38, the output signal 421 of the image condition detector 417 is applied to the processing circuit 418. The processing circuit 418 includes a programmable device such as a microcomputer, a CPU, or a digital signal processor (DSP). The processing circuit 418 is programmed to generate a memory control signal 423 in response to the output signal 421 of the image condition detector 417, the vertical sync signal 407, and the horizontal sync signal 416. The processing circuit 418 includes a combination of an I/O port, a processing section, a RAM, and a ROM. The processing circuit 418 operates in accordance with a control program stored in the ROM. The processing circuit 418 outputs the memory control signal 423 to a memory unit 420.

The video signal 404 is fed from the TV tuner 403 to the memory unit 420. The memory unit 420 temporarily stores the video signal 404, and outputs the stored video signal to the display 414.

Figure 40:
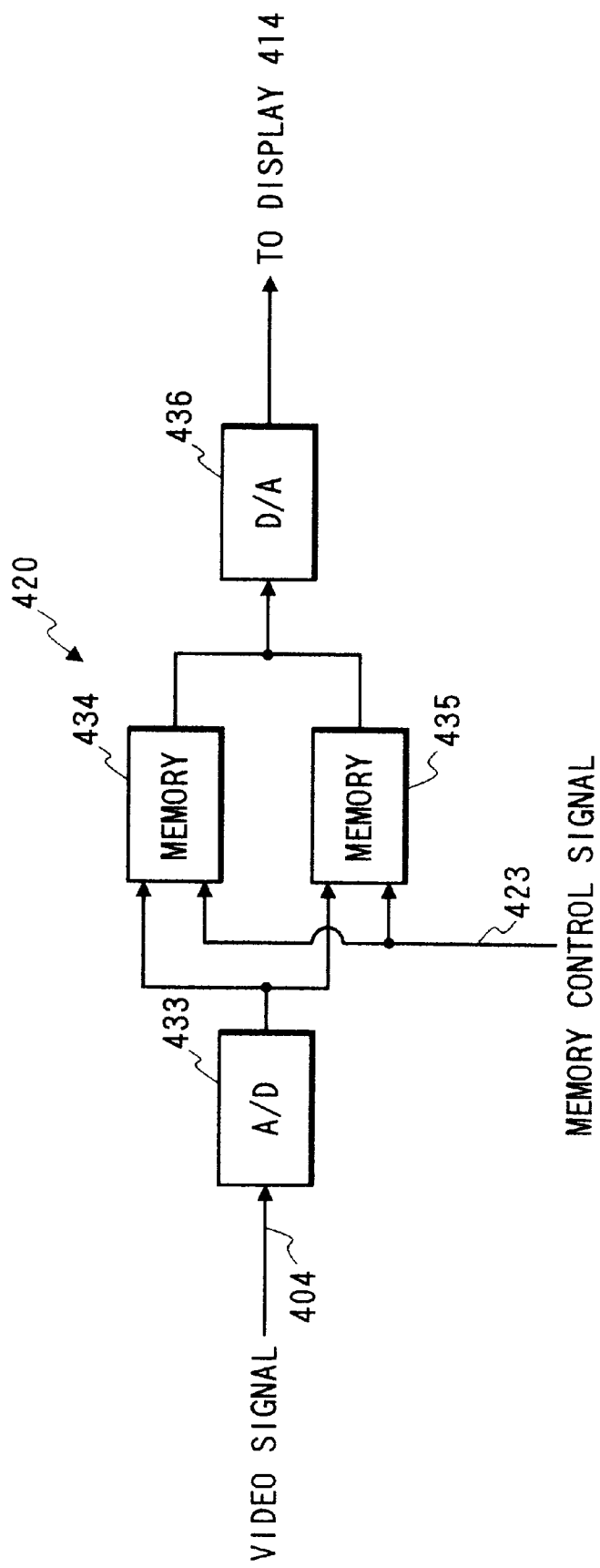
FIG. 40 is a block diagram of a memory unit in FIG. 38.

As shown in FIG. 40, the memory unit 420 includes an A/D converter 433, memories 434 and 435, and a D/A converter 436. The A/D converter 433 changes the video signal 404 into a corresponding digital video signal. The A/D converter 433 outputs the digital video signal to the memories 434 and 435. The memory control signal 423 is fed to the memories 434 and 435 from the processing circuit 418 (see FIG. 38). Operation of the memories 434 and 435 is changed between a normal mode and a still-image mode in response to the memory control signal 423. During the normal mode of operation, the digital video signal is alternately written into the memories 434 and 435 while the digital video signal is alternately read out from the memories 434 and 435. In this case, one of the memories 434 and 435 undergoes a signal writing process while the other memory undergoes a signal reading process. For example, the digital video signal representing every even-numbered field is assigned to the memory 434, and the digital video signal representing every odd-numbered field is assigned to the memory 435. During the normal mode of operation, an image represented by the digital video signal read out from the memories 434 and 435 can change frame by frame (or field by field). During the still-image mode of operation, the updating of the digital video signal in the memories 434 and 435 remains inhibited while the previously-written digital video signal is alternately and periodically read out from the memories 434 and 435. In other words, during the still-image mode of operation, writing the digital video signal into the memories 434 and 435 remains suspended while the previously-written digital video signal is alternately and periodically read out from the memories 434 and 435. In this case, the digital video signal read out from the memories 434 and 435 continues to represent a still image. During the normal mode of operation and also the still-image mode of operation, the digital video signal read out from the memories 434 and 435 is applied to the D/A converter 436. The D/A converter 436 returns the digital video signal to the original analog video signal. The D/A converter 436 outputs the analog video signal to the display 414 (see FIG. 38).

With reference back to FIG. 38, the display 414 visualizes the video signal outputted from the memory unit 420 on its screen in response to the vertical sync signal 407 and the horizontal sync signal 416 fed from the sync separation circuit 405 and the horizontal sync stabilizer 422 respectively.

Figure 41:
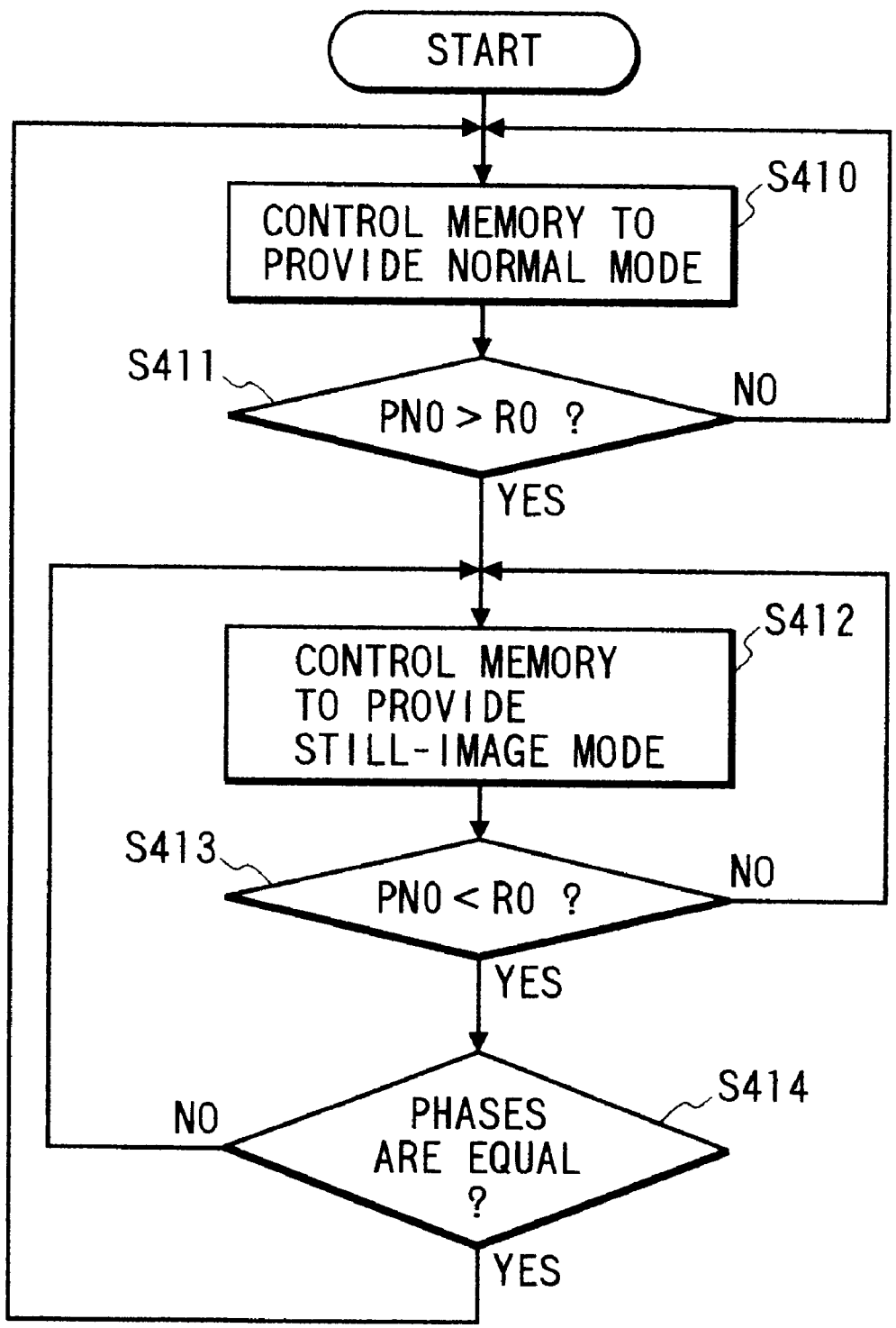
FIG. 41 is a flowchart of a control program for a processing circuit in FIG. 38.

As previously explained, the processing circuit 418 operates in accordance with a control program stored in its internal ROM. FIG. 41 is a flowchart of the program.

As shown in FIG. 41, a first step S410 of the program controls the memory unit 420 so that the memories 434 and 435 therein will operate in the normal mode.

A step S411 following the step S410 compares the counted pulse number PN0 represented by the output signal 421 of the image condition detector 417 with a predetermined reference number R0. When the counted pulse number PN0 is greater than the predetermined reference number R0, the program advances from the step S411 to a step S412. Otherwise, the program returns from the step S411 to the step S410.

The step S412 controls the memory unit 420 so that the memories 434 and 435 therein will operate in the still-image mode.

A step S413 following the step S412 compares the counted pulse number PN0 represented by the output signal 421 of the image condition detector 417 with the predetermined reference number R0. When the counted pulse number PN0 is smaller than the predetermined reference number R0, the program advances from the step S413 to a step S414. Otherwise, the program returns from the step S413 to the step S412.

The step S414 decides whether or not the phases of the horizontal sync signals 406 and 416 are substantially equal by referring to the output signal of the phase difference detector 408 in the horizontal sync stabilizer 422 (see FIG. 38). When the phases of the horizontal sync signals 406 and 416 are substantially equal, the program returns from the step S414 to the step S410. Otherwise, the program returns from the step S414 to the step S412.

The processing circuit 418 responds to the vertical sync signal 407 so that one of the steps S410 and S412 in FIG. 41 will be executed once during every field.

In a modification, for every field, count is given of horizontal scanning periods during which the phases of the horizontal sync signals 406 and 416 are substantially equal. In the case where the counted pulse number exceeds a given number, the change of the operation of the memory unit 420 from the still-image mode to the normal mode is allowed. On the other hand, in the case where the counted pulse number does not exceed the given number, the still-image mode of the operation of the memory unit 420 is maintained.

The antenna 401 may be replaced by plural antennas. In this case, a diversity unit for antenna selection is provided between the antennas and the TV tuner 403.

Eighteenth Embodiment

Figure 42:
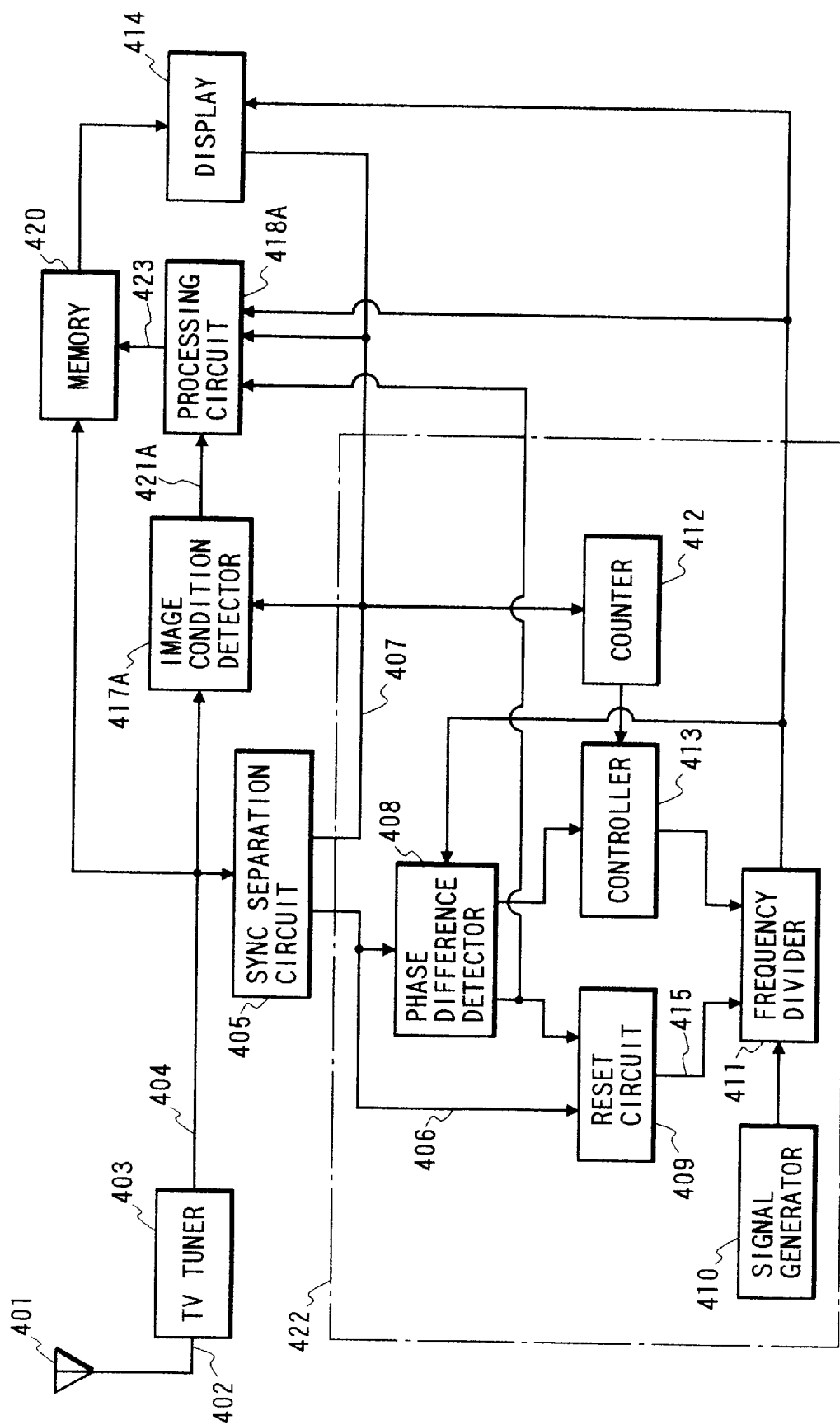
FIG. 42 is a block diagram of a mobile television receiver according to an eighteenth embodiment of this invention.

FIG. 42 shows an eighteenth embodiment of this invention which is similar to the embodiment of FIGS. 38–41 except for the following design changes. The embodiment of FIG. 42 includes an image condition detector 417A instead of the image condition detector 417 (see FIG. 39). The embodiment of FIG. 42 includes a processing circuit 418A instead of the processing circuit 418 in FIG. 38.

Figure 43:
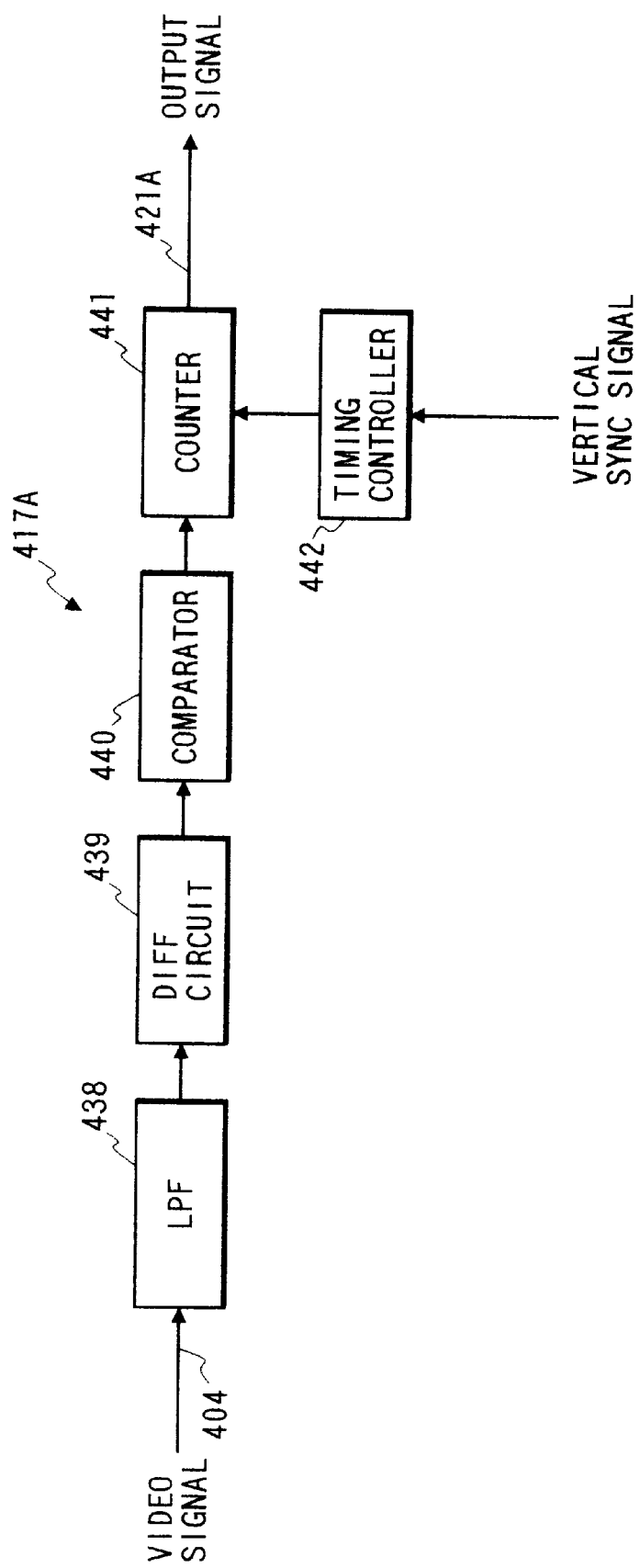
FIG. 43 is a block diagram of an image condition detector in FIG. 42.

The image condition detector 417A serves to estimate a quality (a condition) of an image represented by the video signal 404 for every field related to the video signal 404. The image condition detector 417A is designed to use an equalizing pulse in the video signal 404 for every field. As shown in FIG. 43, the image condition detector 417A includes a low pass filter 438, a differentiating circuit 439, a comparator 440, a counter 441, and a timing controller 442.

The timing controller 442 receives the vertical sync signal 407 from the sync separation circuit 405 (see FIG. 42). The timing controller 442 periodically generates a count timing signal in response to the vertical sync signal 407. The timing controller 442 outputs the count timing signal to the counter 441. Specifically, the timing controller 442 serves as a means for resetting the counter 441.

The low pass filter 438 receives the video signal 404. The low pass filter 438 removes high-frequency noise components from the video signal 404. The differentiating circuit 439 differentiates the output signal of the low pass filter 438 with respect to a time base.

The comparator 440 compares the level of the output signal of the differentiating circuit 439 with a predetermined reference level. When the level of the output signal of the differentiating circuit 439 exceeds the predetermined reference level, the comparator 440 outputs an H-level signal to the counter 441. Otherwise, the comparator 440 outputs an Level signal to the counter 441.

The counter 441 operates in response to the count timing signal fed from the timing controller 442, and thereby provides the following processes during a given period of time in every field which corresponds to an equalizing pulse in the video signal 404. The counter 441 counts pulses of a fixed-frequency signal while the output signal of the comparator 440 remains in the H-level state. The counter 441 does not respond to pulses of the fixed-frequency signal when the output signal of the comparator 440 is in the Level state. The counter 441 outputs a signal 421A representing the result of the count. The output signal 421A of the counter 441 is used as an output signal of the image condition detector 417A.

With reference back to FIG. 42, the processing circuit 418A is programmed to periodically calculate a mean value M0 among the values represented by the output signal 421A of the image condition detector 417A which occur for a given number of successive fields.

Figure 44:
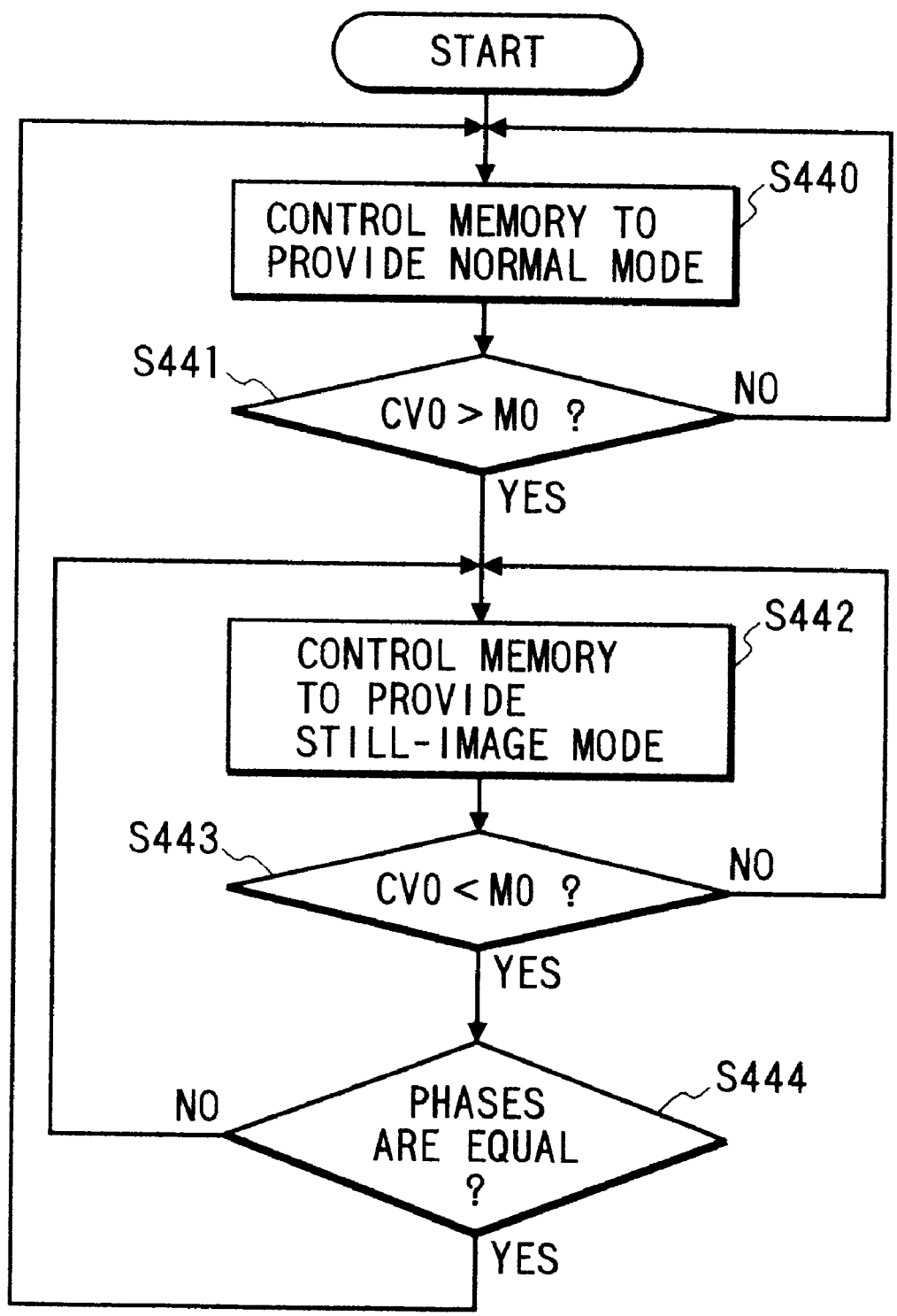
FIG. 44 is a flowchart of a control program for a processing circuit in FIG. 42.

FIG. 44 is a flowchart of a segment of a control program for the processing circuit 418A which relates to control of the memory unit 420. As shown in FIG. 44, a first step S440 of the program segment controls the memory unit 420 so that the memories 434 and 435 therein will operate in the normal mode.

A step S441 following the step S440 compares the current value CV0 represented by the output signal 421A of the image condition detector 417A with the mean value M0. When the current value CV0 is greater than the mean value M0, the program advances from the step S441 to a step S442. Otherwise, the program returns from the step S441 to the step S440.

The step S442 controls the memory unit 420 so that the memories 434 and 435 therein will operate in the still-image mode.

A step S443 following the step S442 compares the current value CV0 represented by the output signal 421A of the image condition detector 417A with the mean value M0. When the current value CV0 is smaller than the mean value M0, the program advances from the step S443 to a step S444. Otherwise, the program returns from the step S443 to the step S442.

The step S444 decides whether or not the phases of the horizontal sync signals 406 and 416 are substantially equal by referring to the output signal of the phase difference detector 408 in the horizontal sync stabilizer 422 (see FIG. 42). When the phases of the horizontal sync signals 406 and 416 are substantially equal, the program returns from the step S444 to the step S440. Otherwise, the program returns from the step S444 to the step S442.

In a modification, for every field, count is given of horizontal scanning periods during which the phases of the horizontal sync signals 406 and 416 are substantially equal. In the case where the counted pulse number exceeds a given number, the change of the operation of the memory unit 420 from the still-image mode to the normal mode is allowed. On the other hand, in the case where the counted pulse number does not exceed the given number, the still-image mode of the operation of the memory unit 420 is maintained.

It should be noted that the mean value M0 used in the steps S441 and S443 may be replaced by an adjustable value.

The image condition detector 417 (see FIG. 39) may be additionally provided. In this case, the output signals 421 and 421A of the image condition detectors 417 and 417A are weighted, and the weighting-resultant signals are added to form an image condition signal fed to the processing circuit 418A.

Nineteenth Embodiment

Figure 45:
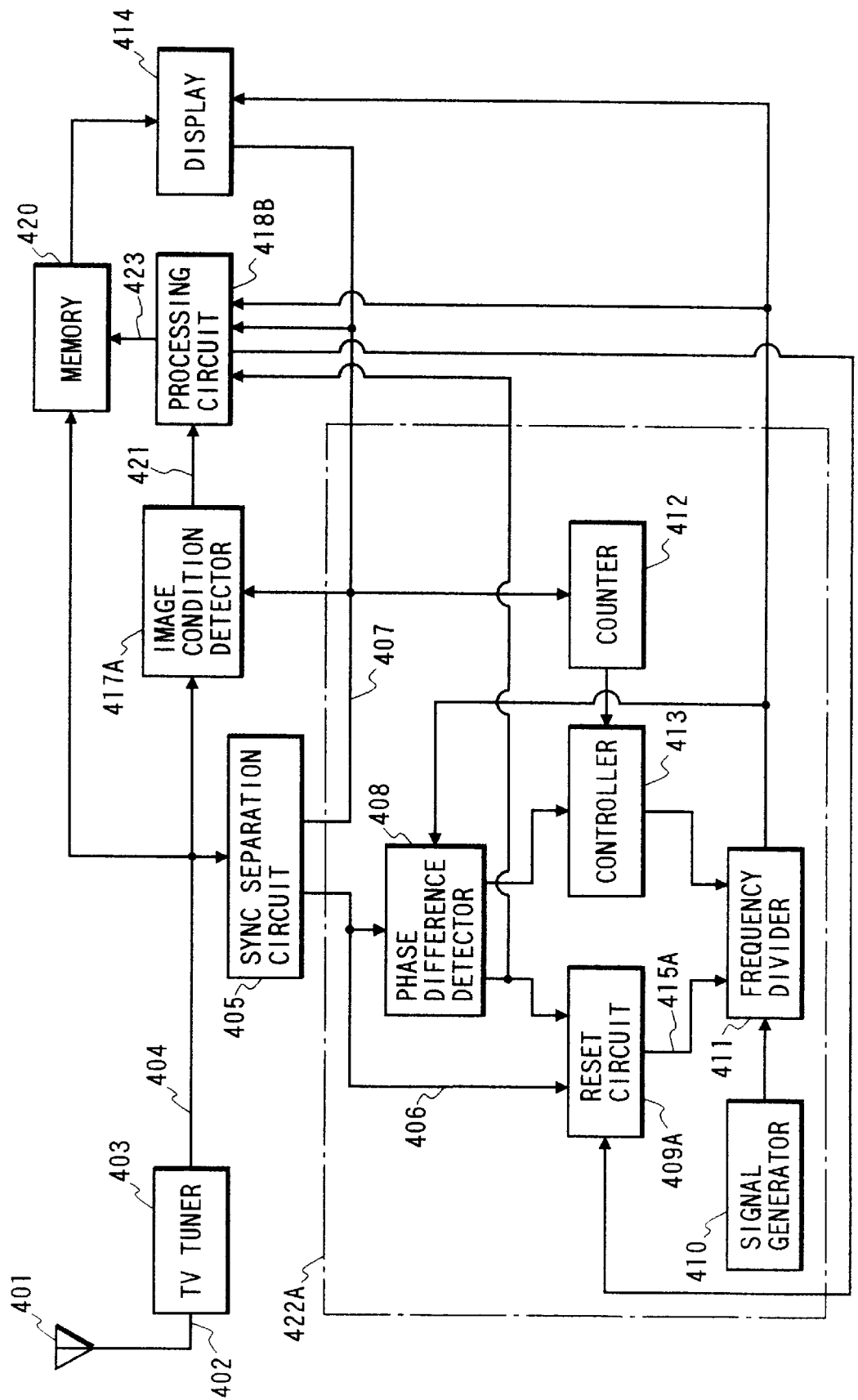
FIG. 45 is a block diagram of a mobile television receiver according to a nineteenth embodiment of this invention.

FIG. 45 shows a nineteenth embodiment of this invention which is similar to the embodiment of FIGS. 38–41 except for the following additional arrangement. The embodiment of FIG. 45 includes a processing circuit 418B and a horizontal sync stabilizer 422A instead of the processing circuit 418 and the horizontal sync stabilizer 422 in FIG. 38 respectively. The embodiment of FIG. 45 includes the image condition detector 417A of FIG. 43 instead of the image condition detector 417 in FIG. 38. The horizontal sync stabilizer 422A includes a reset circuit 409A instead of the reset circuit 409 in FIG. 38.

The processing circuit 418B is connected to the reset circuit 409A. The processing circuit 418B is programmed to control the reset circuit 409A.

The reset circuit 409A receives the horizontal sync signal 406 from the sync separation circuit 405. The reset circuit 409A receives the phase difference signal from the phase difference detector 408. The reset circuit 409A includes a comparator which detects whether or not the phase difference between the horizontal sync signals 406 and 416 is in a given range. The reset circuit 409A includes a deciding section which determines whether or not the phase difference remains outside the given range during at least a given number of successive fields. The reset circuit 409A includes a gate which allows the horizontal sync signal 406 to be fed to the frequency divider 411 for a given time as a reset pulse signal 415A in the case where the phase difference remains outside the given range during at least the given number of successive fields. Also, the gate in the reset circuit 409A allows the horizontal sync signal 406 to be fed to the frequency divider 411 for the given time as the reset pulse signal 415A in the case where an H-level control signal is fed from the processing circuit 418B. The frequency divider 411 is reset by the reset pulse signal 415A so that the phase of the horizontal sync signal 416 will be equalized to the phase of the horizontal sync signal 406.

In a modification, for every field, count is given of horizontal scanning periods during which the phases of the horizontal sync signals 406 and 416 are substantially equal. Only in the case where the counted pulse number is smaller than a given number during at least the given number of successive fields, the reset circuit 409A outputs the reset pulse signal 415A to the frequency divider 411.

The processing circuit 418B is programmed to periodically calculate a mean value M0 among the values represented by the output signal 421A of the image condition detector 417A which occur for a given number of successive fields.

Figure 46:
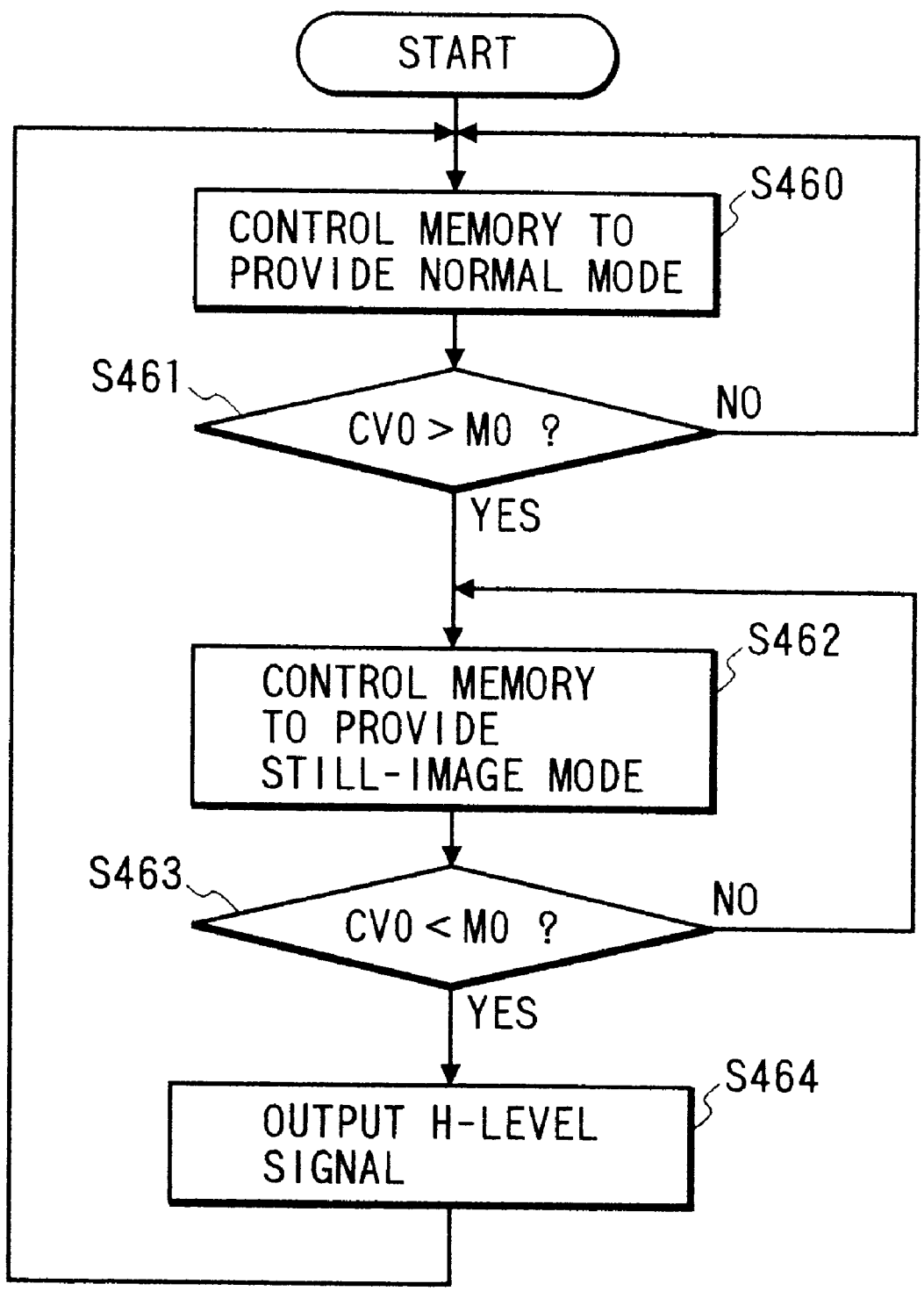
FIG. 46 is a flowchart of a control program for a processing circuit in FIG. 45.

FIG. 46 is a flowchart of a control program for the processing circuit 418B which relates to control of the memory unit 420. As shown in FIG. 46, a first step S460 of the program segment controls the memory unit 420 so that the memories 434 and 435 therein will operate in the normal mode.

A step S461 following the step S440 compares the current value CV0 represented by the output signal 421A of the image condition detector 417A with the mean value M0. When the current value CV0 is greater than the mean value M0, the program advances from the step S461 to a step S462. Otherwise, the program returns from the step S461 to the step S460.

The step S462 controls the memory unit 420 so that the memories 434 and 435 therein will operate in the still-image mode.

A step S463 following the step S462 compares the current value CV0 represented by the output signal 421A of the image condition detector 417A with the mean value M0. When the current value CV0 is smaller than the mean value M0, the program advances from the step S463 to a step S464. Otherwise, the program returns from the step S463 to the step S462.

The step S464 changes the control signal, fed to the reset circuit 409A, from an L level to an H level. In response to the H-level control signal fed from the processing circuit 418B, the reset circuit 409A controls the frequency divider 411 and thereby equalizes the phase of the horizontal sync signal 416 to the phase of the horizontal sync signal 406. Then, the step S464 returns the control signal, fed to the reset circuit 409A, from the H level to the L level. After the step S464, the program returns to the step S460.

As understood from the previous explanation, the step S464 equalizes the phase of the horizontal sync signal 416 to the phase of the horizontal sync signal 406 before operation of the memory unit 420 is changed from the still-image mode to the normal mode.

Twentieth Embodiment

Figure 47:
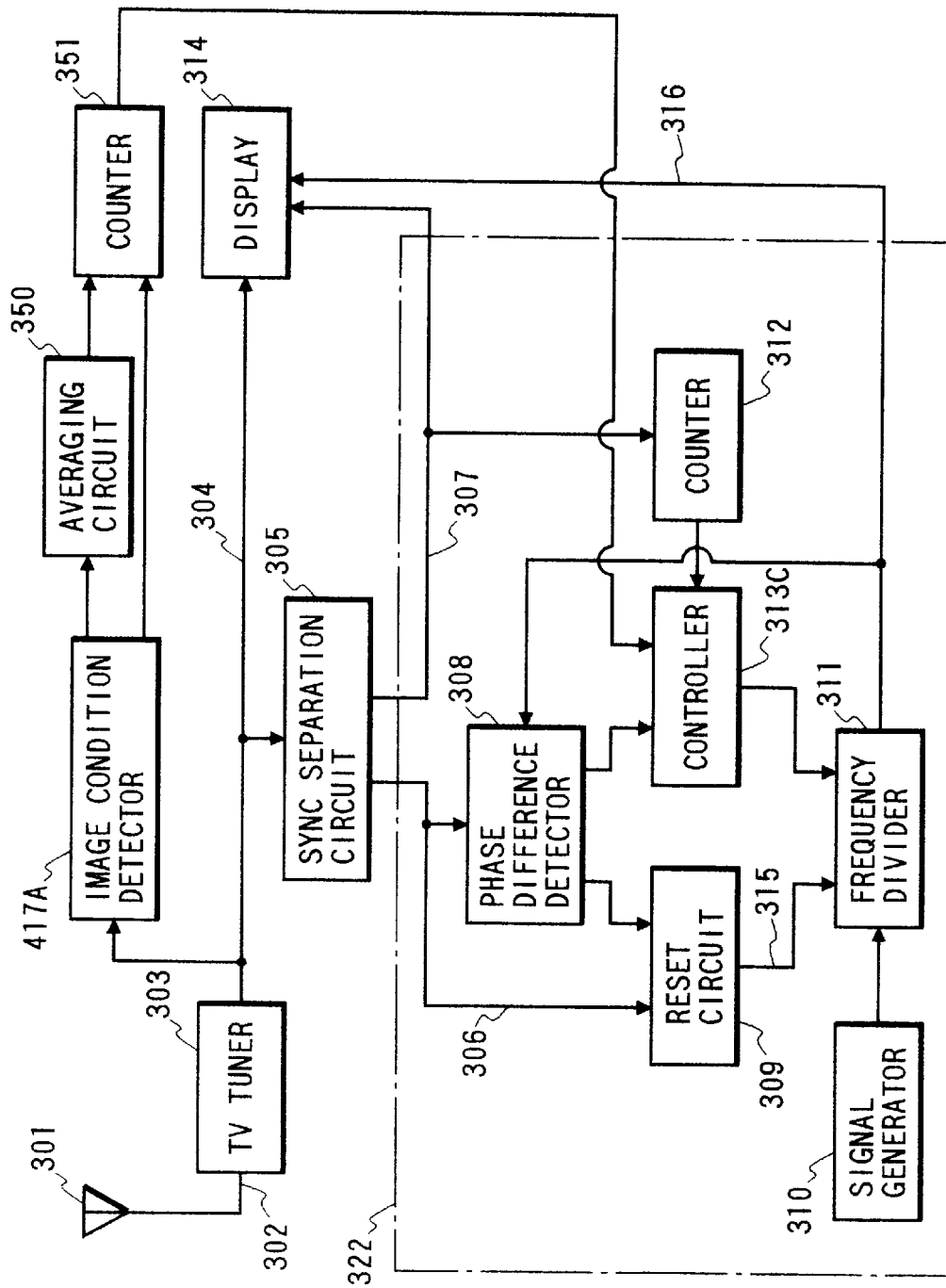
FIG. 47 is a block diagram of a mobile television receiver according to a twentieth embodiment of this invention.

FIG. 47 shows a twentieth embodiment of this invention which is similar to the embodiment of FIGS. 30–32 except for the following additional arrangement. The embodiment of FIG. 47 includes a controller 313C instead of the controller 313 in FIG. 30. The embodiment of FIG. 47 includes the image condition detector 417A of FIG. 43. The embodiment of FIG. 47 includes an averaging circuit 350 and a counter 351.

The image condition detector 417A receives the video signal 304 from the TV tuner 303. The image condition detector 417A receives the vertical sync signal 307 from the sync separation circuit 305. The image condition detector 417A generates and outputs an image condition signal in response to the video signal 304 and the vertical sync signal 307. The output signal of the image condition detector 417A indicates a value reflecting a condition (a quality) of an image represented by the video signal 304.

The averaging circuit 350 receives the output signal of the image condition detector 417A. The averaging circuit 350 periodically calculates a mean value M0 among the values represented by the output signal of the image condition detector 417A during a given number of successive fields. The averaging circuit 350 generates and outputs a signal representing the calculated mean value M0.

The counter 351 receives the output signal of the image condition detector 417A. The counter 351 also receives the output signal of the averaging circuit 350. The counter 351 compares the value represented by the output signal of the image condition detector 417A with the mean value M0, and counts each time the value represented by the output signal of the image condition detector 417A crosses the mean value M0 during a given number of successive fields. The counter 351 generates and outputs a signal representing the count result. The output signal of the counter 351 is applied to the controller 313C.

Figure 48:
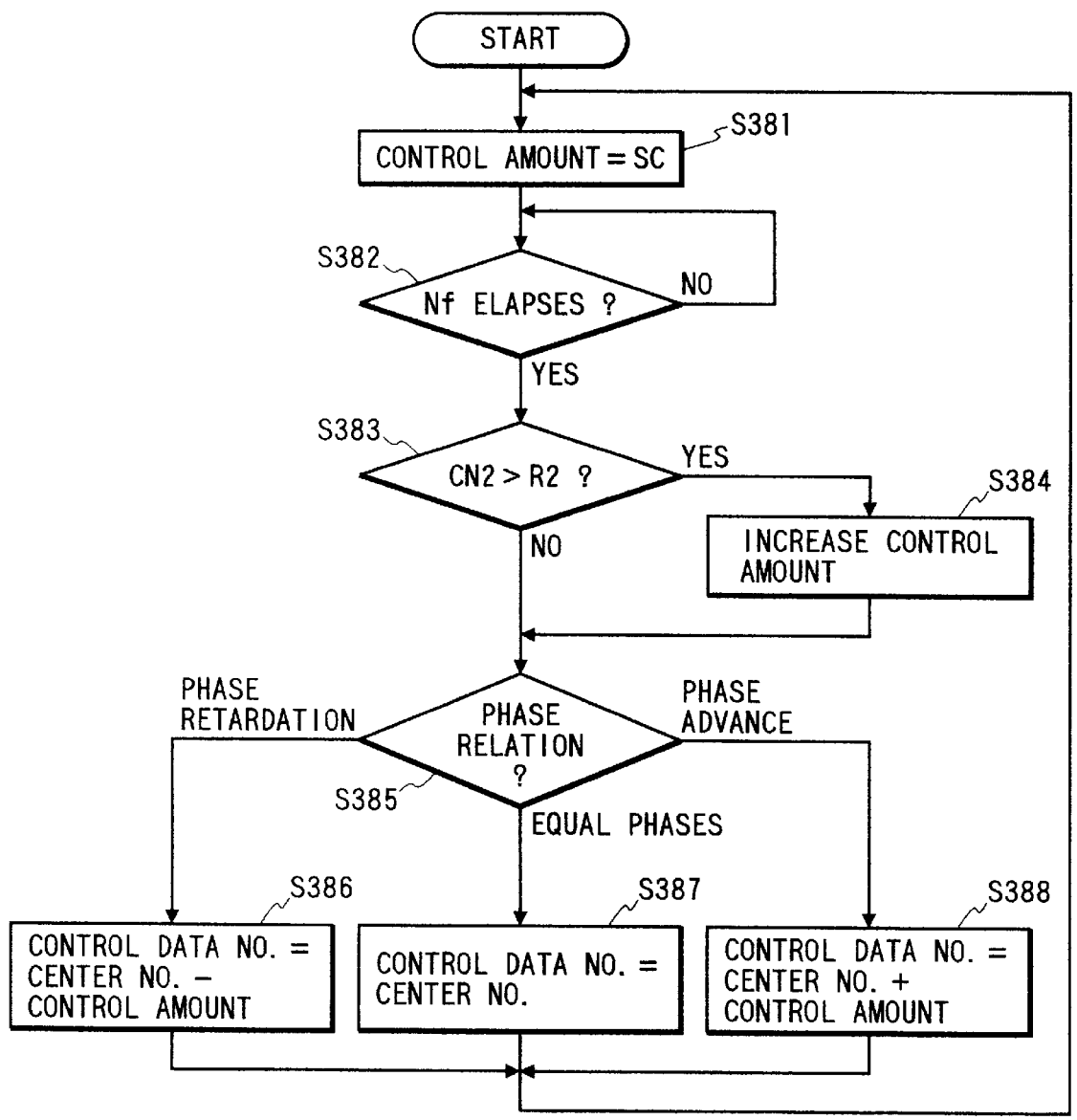
FIG. 48 is a flowchart of a program related to operation of a controller in FIG. 47.

FIG. 48 is a flowchart of a segment of a program for the controller 313C. As shown in FIG. 48, a first step S381 of the program segment sets the control amount to a prescribed amount SC. After the step S381, the program advances to a step S382.

The step S382 decides whether or not a time corresponding to the predetermined number Nf of successive fields has elapsed. When the time corresponding to the predetermined number Nf of successive fields has elapsed, the program advances from the step S382 to a step S383. Otherwise, the step S382 is repeated. Thus, the step S382 serves to wait the time corresponding to the predetermined number Nf of successive fields.

The step S383 compares the count result number CN2 represented by the output signal of the counter 351 with a predetermined reference number R2. When the count result number CN2 is greater than the predetermined reference number R2, the program advances from the step S383 to a step S384. Otherwise, the program jumps from the step S383 to a step S385.

The step S384 increases the control amount by a predetermined increment. The resultant control amount is equal to the prescribed amount SC plus the predetermined increment. After the step S384, the program advances to the step S385.

The step S385 decides the phase relation between the horizontal sync signals 306 and 316 by referring to the output signal of the phase difference detector 308. When the phase of the horizontal sync signal 306 retards from the phase of the horizontal sync signal 316, the program proceeds from the step S385 to a step S386. When the phase of the horizontal sync signal 306 is substantially equal to the phase of the horizontal sync signal 316, the program proceeds from the step S385 to a step S387. When the phase of the horizontal sync signal 306 advances from the phase of the horizontal sync signal 316, the program proceeds from the step S385 to a step S388.

The step S386 sets a control data number equal to the center number minus the control amount. After the step S386, the program returns to the step S381.

The step S387 sets the control data number equal to the center number. After the step S387, the program returns to the step S381.

The step S388 sets the control data number equal to the center number plus the control amount. After the step S388, the program returns to the step S381.

The step S384 may be modified so that the control amount will increase in proportion to the count result number CN2 represented by the output signal of the counter 351.

What is claimed is:

1. A mobile television receiver comprising:

a TV tuner demodulating an incoming TV signal into a first video signal;

first means for separating a first horizontal sync signal from the first video signal generated by the TV tuner;

second means for detecting a quality of an image represented by the first video signal generated by the TV tuner;

third means for generating a second horizontal sync signal, for detecting a difference between a phase of the first horizontal sync signal generated by the first means and a phase of the second horizontal sync signal, and for controlling the phase of the second horizontal sync signal in response to the detected phase difference between the first horizontal sync signal and the second horizontal sync signal to lock the second horizontal sync signal in phase and frequency to the first horizontal sync signal;

a memory unit for storing the first video signal generated by the TV tuner in response to a memory control signal, and for outputting the stored first video signal as a second video signal;

fourth means for generating the memory control signal in response to the image quality detected by the second means, and for feeding the memory control signal to the memory unit; and fifth means for displaying the second video signal outputted from the memory unit in response to the second horizontal sync signal generated by the third means.

2. A mobile television receiver comprising:

a TV tuner demodulating an incoming TV signal into a first video signal;

first means for separating a first horizontal sync signal from the first video signal generated by the TV tuner;

second means for detecting a quality of an image represented by the first video signal generated by the TV tuner for every field related to the first video signal;

third means for calculating a mean quality among the image qualities detected by the second means during a plurality of successive fields;

fourth means for comparing the image quality detected by the second means with the mean quality calculated by the third means, for deciding that the image quality detected by the second means is good when the image quality detected by the second means is equal to or greater than the mean quality calculated by the third means, and for deciding that the image quality detected by the second means is poor when the image quality detected by the second means is smaller than the mean quality calculated by the third means;

fifth means for generating a second horizontal sync signal, for detecting a difference between a phase of the first horizontal sync signal generated by the first means and a phase of the second horizontal sync signal, and for controlling the phase of the second horizontal sync signal in response to the detected phase difference between the first horizontal sync signal and the second horizontal sync signal to lock the second horizontal sync signal in phase and frequency to the first horizontal sync signal;

sixth means for deciding whether or not the phase difference detected by the fifth means is in a predetermined range;

a memory unit changeable between a normal mode of operation and a still-image mode of operation, the memory unit periodically storing the first video signal generated by the TV tuner and periodically outputting the stored first video signal as a second video signal when being in the normal mode of operation, the memory unit stopping periodically storing the first video signal generated by the TV tuner but executing periodically outputting the last stored first video signal as the second video signal when being in the still-image mode of operation;

seventh means for changing the memory unit from the still-image mode of operation to the normal mode of operation when the fourth means decides that the image quality is good and the sixth means decides that the phase difference is in the predetermined range, and for changing the memory unit from the normal mode of operation to the still-image mode of operation when the fourth means decides that the image quality is poor; and eighth means for displaying the second video signal outputted from the memory unit in response to the second horizontal sync signal generated by the fifth means.

3. A mobile television receiver as recited in claim 2, wherein the memory unit comprises:

an A/D converter for converting the first video signal into a corresponding digital video signal;

memories for storing the digital video signal generated by the A/D converter, and for outputting the stored digital video signal; and a D/A converter for converting the digital video signal outputted from the memories into the second video signal.

4. A mobile television receiver as recited in claim 2, wherein the third means comprises means for weighting the image qualities detected by the second means during the plurality of successive fields, and means for generating the mean quality from the weighting-resultant image qualities.

5. A mobile television receiver as recited in claim 2, further comprising:

ninth means for counting successive fields during which the memory unit is in the still-image mode of operation;

tenth means for generating an offset value in response to a number of the successive fields counted by the ninth means; and eleventh means for changing the mean quality calculated by the third means in response to the offset value generated by the tenth means.

6. A mobile television receiver as recited in claim 2, further comprising:

ninth means for comparing the image quality detected by the second means with a predetermined reference image quality to decide whether or not a strength of the incoming TV signal is smaller than a reference strength;

tenth means for counting fields during which the ninth means decides that the strength of the incoming TV signal is smaller than the reference strength; and eleventh means for forcing the memory unit into the normal mode of operation in cases where a number of the fields counted by the tenth means during a given number of successive fields exceeds a predetermined number.

7. A mobile television receiver as recited in claim 2, wherein the second means comprises:

an A/D converter for converting the first video signal into a digital signal during a presence of an equalizing pulse in the first video signal;

averaging means for periodically generating a mean value among a given number of samples of the digital signal generated by the A/D converter;

differential means for generating a difference between a current mean value and an immediately-preceding means value generated by the averaging means;

binarizing means for comparing the difference generated by the differential means with a predetermined value, and for generating a binary signal in response to a result of the comparing; and an adder for accumulating the binary signal generated by the binarizing means, wherein a result of the accumulating represents the detected image quality.

8. A mobile television receiver as recited in claim 2, wherein the second means comprises:

an A/D converter for converting the first video signal into a digital signal during a presence of an equalizing pulse in the first video signal;

averaging means for periodically generating a mean value among a given number of samples of the digital signal generated by the A/D converter;

differential means for generating a difference between a current mean value and an immediately-preceding means value generated by the averaging means;

binarizing means for comparing an absolute value of the difference generated by the differential means with a predetermined value, and for generating a binary signal in response to a result of the comparing; and an adder for accumulating the binary signal generated by the binarizing means, wherein a result of the accumulating represents the detected image quality.

9. A mobile television receiver as recited in claim 2, further comprising:

ninth means for counting pulses in the first horizontal sync signal separated by the first means;

tenth means for forcing the memory unit in the still-image mode of operation in cases where a number of the pulses counted by the ninth means during one field exceeds a predetermined number; and eleventh means for forcing the memory unit in the normal mode of operation in cases where the number of the pulses counted by the ninth means during one field does not exceed the predetermined number and the fourth means decides that the image quality detected by the second means is good.

10. A mobile television receiver as recited in claim 9, further comprising:

twelfth means for counting successive fields during which the memory unit is in the still-image mode of operation;

thirteenth means for generating an offset value in response to a number of the successive fields counted by the twelfth means; and fourteenth means for changing the predetermined number used by the tenth means in response to the offset value generated by the thirteenth means.

11. A mobile television receiver as recited in claim 9, further comprising:

twelfth means for changing the memory unit from the still-image mode of operation to the normal mode of operation in cases where the fourth means decides that the image quality detected by the second means is good and the sixth means decides that the phase difference detected by the fifth means is in the predetermined range, and the number of the pulses counted by the ninth means during one field does not exceed the predetermined number; and thirteenth means for changing the memory unit from the normal mode of operation to the still-image mode of operation when the fourth means decides that the image quality detected by the second means is poor or the number of the pulses counted by the ninth means during one field exceeds the predetermined number.

12. A mobile television receiver comprising:

a TV tuner demodulating an incoming TV signal into a first video signal;

first means for separating a first horizontal sync signal from the first video signal generated by the TV tuner;

second means for detecting a quality of an image represented by the first video signal generated by the TV tuner at a given timing in every field related to the first video signal;

third means for comparing the image quality detected by the second means with a predetermined threshold quality, for deciding that the image quality detected by the second means is good when the image quality detected by the second means is equal to or greater than the predetermined threshold quality, and for deciding that the image quality detected by the second means is poor when the image quality detected by the second means is smaller than the predetermined threshold quality;

fourth means for generating a second horizontal sync signal;

fifth means for detecting a difference between a phase of the first horizontal sync signal generated by the first means and a phase of the second horizontal sync signal generated by the fourth means;

sixth means for changing the phase of the second horizontal sync signal by a predetermined phase control amount in response to the phase difference detected by the fifth means to lock the second horizontal sync signal in phase and frequency to the first horizontal sync signal;

seventh means for deciding whether or not the phase difference detected by the fifth means is in a predetermined range;

eighth means for deciding whether or not the phase of the first horizontal sync signal and the phase of the second horizontal sync signal are different during a given number of successive fields;

ninth means for controlling the sixth means in response to the first horizontal sync signal to equalize the phase of the second horizontal sync signal to the phase of the first horizontal sync signal in cases where the eighth means decides that the phase of the first horizontal sync signal and the phase of the second horizontal sync signal are different during the given number of successive fields;

a memory unit changeable between a normal mode of operation and a still-image mode of operation, the memory unit periodically storing the first video signal generated by the TV tuner and periodically outputting the stored first video signal as a second video signal when being in the normal mode of operation, the memory unit stopping periodically storing the first video signal generated by the TV tuner but executing periodically outputting the last stored first video signal as the second video signal when being in the still-image mode of operation;

tenth means for changing the memory unit from the normal mode of operation to the still-image mode of operation when the third means changes to decide that the image quality is poor, for changing the memory unit from the still-image mode of operation to the normal mode of operation when the third means changes to decide that the image quality is good in cases where the seventh means decides that the phase difference is in the predetermined range, and for holding the memory unit in the still-image mode of operation when the third means changes to decide that the image quality is good in cases where the seventh means decides that the phase difference is not in the predetermined range; and eleventh means for displaying the second video signal outputted from the memory unit in response to the second horizontal sync signal controlled by the sixth means.

13. A mobile television receiver as recited in claim 12, further comprising:

twelfth means for separating a first vertical sync signal from the first video signal generated by the TV tuner;

thirteenth means for generating a second vertical sync signal, for detecting a difference between a phase of the first vertical sync signal generated by the twelfth means and a phase of the second vertical sync signal, and for controlling the phase of the second vertical sync signal in response to the detected phase difference between the first vertical sync signal and the second vertical sync signal to lock the second vertical sync signal in phase and frequency to the first vertical sync signal;

fourteenth means for deciding whether or not the phase of the first vertical sync signal and the phase of the second vertical sync signal are different during a given number of successive fields;

fifteenth means for controlling the thirteenth means in response to the first vertical sync signal to equalize the phase of the second vertical sync signal to the phase of the first vertical sync signal in cases where the fourteenth means decides that the phase of the first vertical sync signal and the phase of the second vertical sync signal are different during the given number of successive fields; and sixteenth means for controlling the eleventh means in response to the second vertical sync signal generated by the thirteenth means.

14. A mobile television receiver as recited in claim 13, further comprising seventeenth means for controlling the memory unit in response to the second vertical sync signal generated by the thirteenth means.

15. A mobile television receiver as recited in claim 13, further comprising seventeenth means for controlling the second means in response to the second vertical sync signal generated by the thirteenth means.

16. A mobile television receiver as recited in claim 12, wherein the tenth means comprises means for controlling the sixth means in response to the first horizontal sync signal to equalize the phase of the second horizontal sync signal to the phase of the first horizontal sync signal and then changing the memory unit from the still-image mode of operation to the normal mode of operation when the third means changes to decide that the image quality is good in cases where the seventh means decides that the phase difference is not in the predetermined range.

17. A mobile television receiver as recited in claim 12, further comprising:

twelfth means for counting successive fields during which the memory unit is in the sill-image mode of operation; and thirteenth means for holding the memory unit in the still-image mode of operation as long as a number of the fields counted by the twelfth means does not exceed a predetermined limit number.

18. A mobile television receiver as recited in claim 12, further comprising:

twelfth means for counting successive fields during which the memory unit is in the sill-image mode of operation; and thirteenth means for changing the memory unit from the still-image mode of operation to the normal mode of operation when a number of the fields counted by the twelfth means exceeds a predetermined limit number.

19. A mobile television receiver as recited in claim 12, further comprising twelfth means for allowing the sixth means to control the phase of the second horizontal sync signal in response to the detected phase difference between the first horizontal sync signal and the second horizontal sync signal when the third means decides that the image quality is good.

20. A mobile television receiver as recited in claim 12, wherein the second means comprises:
means for separating horizontal sync pulses from the first video signal generated by the TV tuner; and
means for counting the separated horizontal sync pulses during a given period of time in every field to detect a quality of an image represented by the first video signal generated by the TV tuner.

21. A mobile television receiver as recited in claim 15, wherein the second means comprises:
a low pass filter for removing high-frequency components from the first video signal generated by the TV tuner;
a differentiator for differentiating an output signal of the low pass filter;
a comparator for comparing an output signal of the differentiator with a reference signal representative of a predetermined reference level to convert the output signal of the differentiator into a binary signal;
a counter for counting pulses of the binary signal generated by the comparator to detect a quality of an image represented by the first video signal generated by the TV tuner; and
means for resetting the counter at a given timing in every frame in response to the second vertical sync signal.

22. A mobile television receiver as recited in claim 12, further comprising:
twelfth means for detecting a quality of an image represented by the first video signal generated by the TV tuner at a given timing in every field related to the first video signal, the twelfth means having an image-quality detecting characteristic different from an image-quality detecting characteristic of the second means;
thirteenth means for comparing an AGC voltage generated in the TV tuner with a predetermined reference voltage; and
fourteenth means for selecting one of the second means and the twelfth means in response to a result of the comparing by the thirteenth means, and for allowing the image quality detected by the twelfth means to be used instead of the image quality detected by the second means when the twelfth means is selected.

23. A mobile television receiver as recited in claim 12, further comprising:
twelfth means for counting a number of times where a phase of a pulse of the first horizontal sync signal and a phase of a corresponding pulse of the second horizontal sync signal are substantially equal during every field;
thirteenth means for deciding whether or not the number counted by the twelfth means is smaller than a predetermined reference number during a given number of successive fields; and
fourteenth means for controlling the sixth means in response to the first horizontal sync signal to equalize the phase of the second horizontal sync signal to the phase of the first horizontal sync signal in cases where the thirteenth means decides that the counted number is smaller than the predetermined reference number during the given number of successive fields.

24. A mobile television receiver as recited in claim 12, further comprising:
twelfth means for detecting a difference between a phase of a pulse of the first horizontal sync signal and a phase of a corresponding pulse of the second horizontal sync signal;
thirteenth means for deciding whether or not the phase difference detected by the twelfth means is in a given range;
fourteenth means for counting a number of times where the thirteenth means decides that the phase difference is in the given range; and
fifteenth means for changing the memory unit from the still-image mode of operation to the normal mode of operation when the third means changes to decide that the image quality is good in cases where the number counted by the fourteenth means exceeds a predetermined reference number, and for holding the memory unit in the still-image mode of operation when the third means changes to decide that the image quality is good in cases where the number counted by the fourteenth means does not exceed a predetermined reference number.

25. A mobile television receiver as recited in claim 12, further comprising:
twelfth means for counting pulses of the first horizontal sync signal which have phases retarding from phases of corresponding pulses of the second horizontal sync signal during every field;
fourteenth means for counting pulses of the first horizontal sync signal which have phases advancing from phases of corresponding pulses of the second horizontal sync signal during every field;
fifteenth means for comparing a number of the pulses counted by the twelfth means and a number of the pulses counted by the fourteenth means; and
sixteenth means for controlling the sixth means in response to a result of the comparing by the fifteenth means.

26. A mobile television receiver comprising:
a TV tuner demodulating an incoming TV signal into a video signal;
first means for separating a first horizontal sync signal and a vertical sync signal from the video signal generated by the TV tuner;
a clock oscillator for generating a clock signal having a given frequency;
a frequency divider for dividing the frequency of the clock signal by a controllable frequency division factor to convert the clock signal into a second horizontal sync signal;
second means for detecting a difference between a phase of the first horizontal sync signal generated by the first means and a phase of the second horizontal sync signal generated by the frequency divider;
third means for deciding whether or not the phase difference detected by the second means is outside a predetermined range during a predetermined number of successive fields;
fourth means for counting pulses of the vertical sync signal generated by the first means to generate a count signal having a cycle corresponding to a given number of fields;

fifth means for controlling the frequency division factor in response to the phase difference detected by the second means a controllable number of times during every cycle of the count signal;

sixth means for controlling the number of times of the control by the fifth means in response to the phase difference detected by the second means;

seventh means for controlling the frequency divider in response to the first horizontal sync signal to equalize the phase of the second horizontal sync signal to the phase of the first horizontal sync signal in cases where the third means decides that the phase difference is outside the predetermined range during the predetermined number of successive fields; and eighth means for displaying the video signal generated by the TV tuner in response to the second horizontal sync signal generated by the frequency divider and the vertical sync signal generated by the first means.

27. A mobile television receiver comprising:

a TV tuner demodulating an incoming TV signal into a first video signal;

first means for separating a first horizontal sync signal and a vertical sync signal from the first video signal generated by the TV tuner;

second means for detecting a quality of an image represented by the first video signal generated by the TV tuner at a given timing in every field related to the first video signal;

third means for comparing the image quality detected by the second means with a predetermined threshold quality, for deciding that the image quality detected by the second means is good when the image quality detected by the second means is equal to or greater than the predetermined threshold quality, and for deciding that the image quality detected by the second means is poor when the image quality detected by the second means is smaller than the predetermined threshold quality;

a clock oscillator for generating a clock signal having a given frequency;

a frequency divider for dividing the frequency of the clock signal by a controllable frequency division factor to convert the clock signal into a second horizontal sync signal;

fourth means for detecting a difference between a phase of the first horizontal sync signal generated by the first means and a phase of the second horizontal sync signal generated by the frequency divider;

fifth means for deciding whether or not the phase difference detected by the fourth means is outside a predetermined range during a predetermined number of successive fields;

sixth means for counting pulses of the vertical sync signal generated by the first means to generate a count signal having a cycle corresponding to a given number of fields;

seventh means for controlling the frequency division factor in response to the phase difference detected by the fourth means a controllable number of times during every cycle of the count signal;

eighth means for controlling the number of times in response to the phase difference detected by the fourth means;

ninth means for controlling the frequency divider in response to the first horizontal sync signal to equalize the phase of the second horizontal sync signal to the phase of the first horizontal sync signal in cases where the fifth means decides that the phase difference is outside the predetermined range during the predetermined number of successive fields;

a memory unit changeable between a normal mode of operation and a still-image mode of operation, the memory unit periodically storing the first video signal generated by the TV tuner and periodically outputting the stored first video signal as a second video signal when being in the normal mode of operation, the memory unit stopping periodically storing the first video signal generated by the TV tuner but executing periodically outputting the last stored first video signal as the second video signal when being in the still-image mode of operation;

tenth means for changing the memory unit from the normal mode of operation to the still-image mode of operation when the third means changes to decide that the image quality is poor, and for changing the memory unit from the still-image mode of operation to the normal mode of operation when the third means changes to decide that the image quality is good; and eleventh means for displaying the second video signal outputted from the memory unit in response to the second horizontal sync signal generated by the frequency divider and the vertical sync signal generated by the first means.

28. A mobile television receiver as recited in claim 27, further comprising:

twelfth means for estimating a strength of the incoming TV signal for every field;

thirteenth means for calculating a mean strength among the strengths estimated by the twelfth means during a given number of fields;

fourteenth means for deciding whether or not the strength estimated by the twelfth means is lower than the mean strength calculated by the thirteenth means;

fifteenth means for deciding whether or not the phase of the first horizontal sync signal and the phase of the second horizontal sync signal are substantially equal by referring to the phase difference detected by the fourth means; and sixteenth means for changing the memory unit from the normal mode of operation to the still-image mode of operation when the fourteenth means decides that the estimated strength is lower than the mean strength, and for changing the memory unit from the still-image mode of operation to the normal mode of operation when the fourteenth means decides that the estimated strength is not lower than the mean strength in cases where the fifteenth means decides that the phase of the first horizontal sync signal and the phase of the second horizontal sync signal are substantially equal.

29. A mobile television receiver as recited in claim 27, further comprising:

twelfth means for estimating a strength of the incoming TV signal for every field;

thirteenth means for calculating a mean strength among the strengths estimated by the twelfth means during a given number of fields;

fourteenth means for deciding whether or not the strength estimated by the twelfth means is lower than the mean strength calculated by the thirteenth means;

fifteenth means for deciding whether or not the phase of the first horizontal sync signal and the phase of the second horizontal sync signal are substantially equal by referring to the phase difference detected by the fourth means; and sixteenth means for changing the memory unit from the normal mode of operation to the still-image mode of operation when the fourteenth means decides that the estimated strength is lower than the mean strength, for changing the memory unit from the still-image mode of operation to the normal mode of operation when the fourteenth means decides that the estimated strength is not lower than the mean strength in cases where the fifteenth means decides that the phase of the first horizontal sync signal and the phase of the second horizontal sync signal are substantially equal, and for controlling the frequency divider in response to the first horizontal sync signal to equalize the phase of the second horizontal sync signal to the phase of the first horizontal sync signal and then changing the memory unit from the still-image mode of operation to the normal mode of operation when the fourteenth means decides that the estimated strength is not lower than the mean strength in cases where the fifteenth means decides that the phase of the first horizontal sync signal and the phase of the second horizontal sync signal are not substantially equal.

30. A mobile television receiver as recited in claim 27, wherein the second means comprises:

means for separating horizontal sync pulses from the first video signal generated by the TV tuner; and means for counting the separated horizontal sync pulses during a given period of time in every field to detect a quality of an image represented by the first video signal generated by the TV tuner.

31. A mobile television receiver as recited in claim 27, wherein the second means comprises:

a low pass filter for removing high-frequency components from the first video signal generated by the TV tuner;

a differentiator for differentiating an output signal of the low pass filter;

a comparator for comparing an output signal of the differentiator with a reference signal representative of a predetermined reference level to convert the output signal of the differentiator into a binary signal;

a counter for periodically counting a high-level state of the binary signal generated by the comparator at given intervals to detect a quality of an image represented by the first video signal generated by the TV tuner; and means for resetting the counter at a given timing in every frame in response to the second vertical sync signal.

32. A mobile television receiver as recited in claim 27, further comprising:

twelfth means for generating a second vertical sync signal, for detecting a difference between a phase of the first vertical sync signal generated by the first means and a phase of the second vertical sync signal, and for controlling the phase of the second vertical sync signal in response to the detected phase difference between the first vertical sync signal and the second vertical sync signal to lock the second vertical sync signal in phase and frequency to the first vertical sync signal; and thirteenth means for controlling the second means in response to the second vertical sync signal generated by the twelfth means.

33. A mobile television receiver as recited in claim 26, further comprising:

a second frequency divider for dividing the frequency of the clock signal by a controllable frequency division factor to convert the clock signal into a second vertical sync signal;

ninth means for detecting a difference between a phase of the first vertical sync signal generated by the first means and a phase of the second vertical sync signal generated by the second frequency divider;

tenth means for deciding whether or not the phase of the first vertical sync signal and the phase of the second vertical sync signal are different during a predetermined number of successive fields;

eleventh means for controlling the frequency division factor in the second frequency divider in response to the phase difference detected by the ninth means to lock the second vertical sync signal in phase and frequency to the first vertical sync signal;

twelfth means for controlling the eleventh means in response to the first vertical sync signal to equalize the phase of the second vertical sync signal to the phase of the first vertical sync signal when the tenth means decides that the phase of the first vertical sync signal and the phase of the second vertical sync signal are different during the predetermined number of successive fields; and thirteenth means for controlling the eighth means in response to the second vertical sync signal.

34. A mobile television receiver as recited in claim 26, further comprising:

ninth means for counting pulses of the first horizontal sync signal which have phases retarding from phases of corresponding pulses of the second horizontal sync signal during every field;

tenth means for counting pulses of the first horizontal sync signal which have phases advancing from phases of corresponding pulses of the second horizontal sync signal during every field;

eleventh means for comparing a number of the pulses counted by the ninth means and a number of the pulses counted by the tenth means; and twelfth means for controlling the number of times of the control by the fifth means in response to a result of the comparing by the eleventh means.

35. A mobile television receiver as recited in claim 26, further comprising:

ninth means for counting successive pulses of the first horizontal sync signal which have phases retarding from phases of corresponding pulses of the second horizontal sync signal during every field;

tenth means for counting successive pulses of the first horizontal sync signal which have phases advancing from phases of corresponding pulses of the second horizontal sync signal during every field;

eleventh means for deciding whether or not one of a number of the pulses counted by the ninth means and a number of the pulses counted by the tenth means exceeds a predetermined number; and twelfth means for changing the number of times of the control by the fifth means when the eleventh means decides that one of the number of the pulses counted by the ninth means and the number of the pulses counted by the tenth means exceeds the predetermined number.

36. A mobile television receiver as recited in claim 26, further comprising:

a vehicle speed sensor for detecting a speed of the vehicle; and ninth means for controlling the number of times of the control by the fifth means in response to the vehicle speed detected by the vehicle speed sensor.

37. A mobile television receiver as recited in claim 26, further comprising:

ninth means for estimating a strength of the incoming TV signal for every field;

tenth means for calculating a mean strength among the strengths estimated by the ninth means during a given number of fields;

eleventh means for counting a number of times where the strength estimated by the ninth means crosses the mean strength calculated by the tenth means; and twelfth means for controlling the number of times of the control by the fifth means in response to the number counted by the eleventh means.

38. An apparatus comprising:

first means for detecting an amount of noise in a first video signal during a presence of an equalizing pulse in the first video signal for every field related to the first video signal;

second means for comparing the noise amount detected by the first means with a predetermined reference amount;

a memory unit changeable between a normal mode of operation and a still-image mode of operation, the memory unit periodically storing the first video signal and periodically outputting the stored first video signal as a second video signal when being in the normal mode of operation, the memory unit stopping periodically storing the first video signal but executing periodically outputting the last stored first video signal as the second video signal when being in the still-image mode of operation; and third means for changing the memory unit between the normal mode of operation and the still-image mode of operation in response to a result of the comparing by the second means.

39. An apparatus as recited in claim 38, further comprising fourth means for displaying the second video signal outputted from the memory unit.

* * * * *

UNITED STATES PATENT AND TRADEMARK OFFICE
CERTIFICATE OF CORRECTION

PATENT NO.    : 5,986,720
DATED         : November 16, 1999
INVENTOR(S)   : Takaaki Kishigami et al.

It is certified that error appears in the above-identified patent and that said Letters Patent is hereby corrected as shown below:

<u>Title page,</u>
The following section should be added:
-- [30]   Foreign Application Priority Data
   May 9, 1996        [JP]   Japan .... .... .... 8-114532
   Nov. 19, 1996    [JP]   Japan .... .... .... 8-307684
   Jan. 24, 1997    [JP]   Japan .... .... .... 9-010867 --

Signed and Sealed this

Eleventh Day of June, 2002

*Attest:*

JAMES E. ROGAN
*Director of the United States Patent and Trademark Office*

*Attesting Officer*